(12) United States Patent
Strong et al.

(10) Patent No.: US 7,640,870 B2
(45) Date of Patent: *Jan. 5, 2010

(54) PORTABLE FOLDING TABLE WITH LOCKING HINGE

(75) Inventors: L. Curtis Strong, Clearfield, UT (US); Jacob Kearl, Plain City, UT (US); Thayne B. Haney, Syracuse, UT (US); Ray Adams, Clearfield, UT (US); Ed VanNimwegen, North Ogden, UT (US); David C. Winter, Layton, UT (US)

(73) Assignee: Lifetime Products, Inc., Clearfield, UT (US)

( * ) Notice: Subject to any disclaimer, the term of this patent is extended or adjusted under 35 U.S.C. 154(b) by 733 days.

This patent is subject to a terminal disclaimer.

(21) Appl. No.: 10/843,037

(22) Filed: May 10, 2004

(65) Prior Publication Data

US 2005/0005826 A1    Jan. 13, 2005

Related U.S. Application Data

(63) Continuation-in-part of application No. 10/408,914, filed on Apr. 8, 2003, now Pat. No. 7,096,799, and a continuation-in-part of application No. 29/180,752, filed on Apr. 29, 2003, now Pat. No. Des. 489,557.

(60) Provisional application No. 60/371,486, filed on Apr. 9, 2002.

(51) Int. Cl.
   *A47B 3/00*    (2006.01)

(52) U.S. Cl. .................................. 108/132; 108/129

(58) Field of Classification Search .................. 108/35, 108/36, 38, 115, 168, 167, 166, 169, 170, 108/171, 172, 173, 174, 132, 131, 130, 129, 108/133

See application file for complete search history.

(56) References Cited

U.S. PATENT DOCUMENTS

| 429,458 A | 6/1890 | Kraemer |
| 493,441 A | 3/1893 | Munz |
| 643,511 A | 2/1900 | Lloyd |

(Continued)

FOREIGN PATENT DOCUMENTS

CN    2414667 Y    12/2000

OTHER PUBLICATIONS

U.S. Appl. No. 29/219,893, filed Dec. 22, 2004.

(Continued)

*Primary Examiner*—José V Chen
(74) *Attorney, Agent, or Firm*—Workman Nydegger

(57) ABSTRACT

A foldable table includes a table top having collapsible legs connected thereto. The table top includes a first table top section and a second table top section. A first hinge assembly hingedly connecting the first table top section to the second table top section such that the table top can selectively move between a folded position and an unfolded position. A latch engages with the first hinge assembly so as to releasably lock the first hinge assembly when the table top is in the unfolded position. In alternative embodiments, portions of the table top sections can interlock when the table is in the unfolded position. A handle can project from between the table top sections when the table is in the folded position.

43 Claims, 22 Drawing Sheets

U.S. PATENT DOCUMENTS

| | | | |
|---|---|---|---|
| 1,514,917 A | 11/1924 | Lotz | |
| 1,614,187 A | 1/1927 | Coggins | |
| 1,639,367 A | 8/1927 | Seward | |
| 1,765,766 A | 6/1930 | Lyon | |
| 1,907,111 A | 5/1933 | Holland et al. | |
| 1,976,140 A | 10/1934 | Paul | |
| 2,086,463 A | 7/1937 | Bram | |
| 2,542,394 A | 2/1951 | Cohen et al. | |
| 2,596,250 A | 5/1952 | Klinger | |
| 2,619,394 A | 11/1952 | Mahr | |
| 2,730,418 A | 1/1956 | Blink | |
| 2,747,957 A | 5/1956 | Lencioni | |
| 2,871,076 A | 1/1959 | Mell | |
| 2,872,259 A | 2/1959 | Thorpe | |
| 3,143,982 A | 8/1964 | Blink et al. | |
| 3,187,373 A | 6/1965 | Fisher | |
| 3,304,891 A * | 2/1967 | Rachman | 108/36 |
| 3,368,504 A | 2/1968 | Cohen | |
| D212,123 S | 8/1968 | Foote | |
| 3,415,208 A | 12/1968 | Thoresen et al. | |
| D222,234 S | 10/1971 | Imber | |
| 3,656,439 A | 4/1972 | Domin | |
| 3,731,971 A | 5/1973 | Sjogren | |
| 3,823,938 A | 7/1974 | Unno | |
| 3,860,995 A | 1/1975 | Lautenschlager | |
| 3,866,913 A | 2/1975 | Zimmers et al. | |
| 4,005,898 A | 2/1977 | Way | |
| 4,027,600 A * | 6/1977 | Mueller | 108/169 |
| D247,080 S | 1/1978 | Robinson | |
| 4,089,522 A | 5/1978 | Rock | |
| 4,133,271 A | 1/1979 | Carlson | |
| 4,286,353 A | 9/1981 | Roche | |
| 4,371,202 A | 2/1983 | Freeman | |
| 4,489,661 A | 12/1984 | Fitzgerald | |
| D281,949 S | 12/1985 | Hartmann | |
| 4,567,835 A | 2/1986 | Reese et al. | |
| 4,569,545 A | 2/1986 | Hartmann | |
| 4,653,804 A | 3/1987 | Yoo et al. | |
| 4,841,877 A | 6/1989 | Virtue | |
| 4,883,314 A | 11/1989 | Sakong | |
| 4,911,085 A | 3/1990 | Pencoske | |
| 5,009,170 A | 4/1991 | Spehar | |
| 5,154,441 A | 10/1992 | White et al. | |
| 5,251,359 A | 10/1993 | Finkl | |
| 5,357,872 A | 10/1994 | Wilmore | |
| 5,377,601 A | 1/1995 | Cashen | |
| 5,381,740 A | 1/1995 | Johnston | |
| 5,421,272 A | 6/1995 | Wilmore | |
| 5,501,157 A | 3/1996 | Westerburgen | |
| 5,647,107 A | 7/1997 | Brewster | |
| D392,175 S | 3/1998 | Beck | |
| 5,730,066 A | 3/1998 | Auten et al. | |
| 5,857,650 A | 1/1999 | Lin | |
| D407,624 S | 4/1999 | Ehrig | |
| D414,626 S | 10/1999 | Collins et al. | |
| 5,983,807 A | 11/1999 | Tarnay et al. | |
| 6,000,345 A | 12/1999 | Gillotti | |
| D420,527 S | 2/2000 | Pinch | |
| 6,032,585 A | 3/2000 | Pinch | |
| 6,058,853 A | 5/2000 | Pinch | |
| 6,112,674 A | 9/2000 | Stanford | |
| 6,334,400 B1 | 1/2002 | Nien | |
| 6,454,357 B1 | 9/2002 | Foulger | |
| D468,135 S | 1/2003 | Ashby et al. | |
| D478,495 S | 8/2003 | Votruba et al. | |
| D479,778 S | 9/2003 | Haney et al. | |
| 6,684,426 B1 | 2/2004 | Lin | |
| 6,708,532 B2 | 3/2004 | Winland | |
| D489,557 S | 5/2004 | Strong et al. | |
| 6,752,091 B2 * | 6/2004 | Glover et al. | 108/168 |
| 6,842,923 B1 | 1/2005 | Castellani | |
| 6,848,731 B2 | 2/2005 | Khubani | |
| 6,905,166 B2 | 6/2005 | Zhurong et al. | |
| 7,278,361 B2 * | 10/2007 | Zhurong et al. | 108/168 |
| 7,475,641 B2 | 1/2009 | Jin | |
| 2002/0092445 A1 | 7/2002 | Glover et al. | |
| 2004/0094076 A1 | 5/2004 | Jin | |
| 2004/0187749 A1 | 9/2004 | Zhurong et al. | |
| 2005/0078272 A1 | 4/2005 | Quehin | |
| 2005/0241550 A1 | 11/2005 | Neunzert | |
| 2005/0241551 A1 | 11/2005 | Neunzert | |
| 2005/0274302 A1 * | 12/2005 | Jin et al. | 108/126 |

OTHER PUBLICATIONS

U.S. Appl. No. 29/230,220, filed May 18, 2005.
Notice of Allowance dated Apr. 5, 2007 cited in U.S. Appl. No. 29/230,220.
Office Action dated Aug. 4, 2006 cited in U.S. Appl. No. 29/230,220.
Notice of Allowance dated Oct. 10, 2006 cited in U.S. Appl. No. 29/219,893.
Notice of Allowance dated Jan. 10, 2006 cited in U.S. Appl. No. 29/219,893.
Notice of Allowance dated Nov. 17, 2008 cited in U.S. Appl. No. 11/112,810.
Office Action dated Apr. 24, 2008 cited in U.S. Appl. No. 11/112,810.
Office Action dated Nov. 23, 2007 cited in U.S. Appl. No. 11/112,810.
Office Action dated Mar. 15, 2007 cited in U.S. Appl. No. 11/112,810.

* cited by examiner

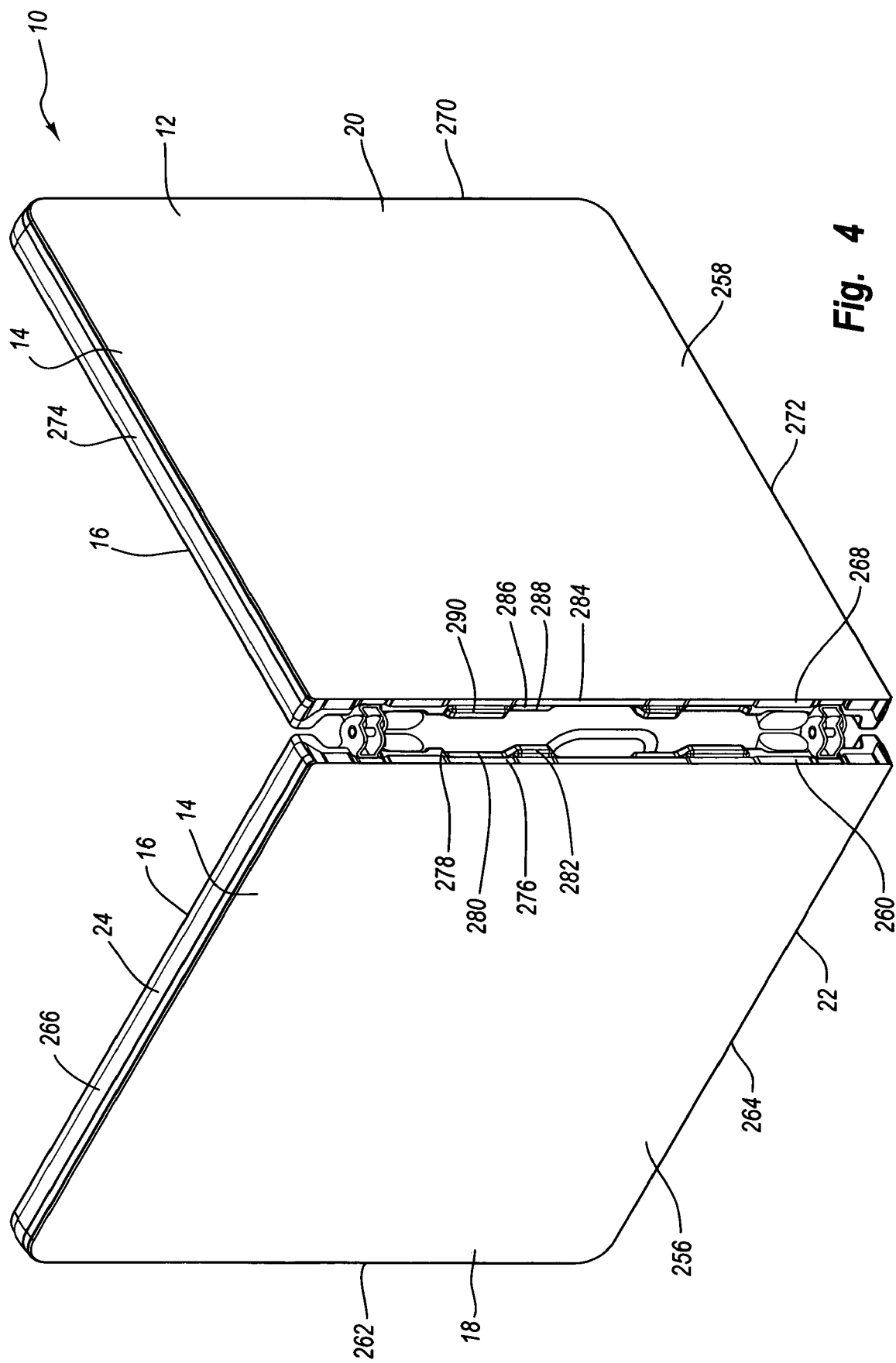

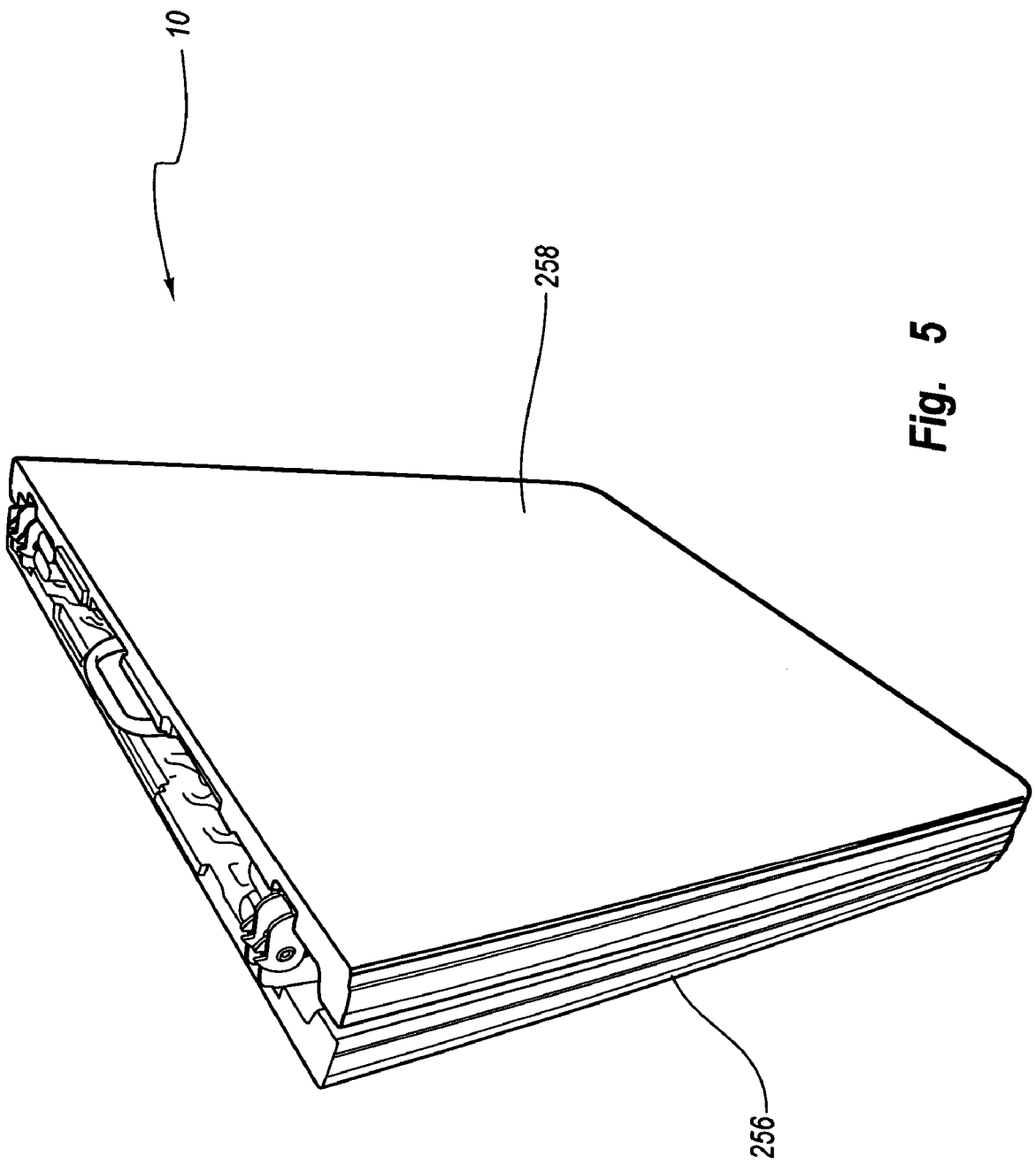

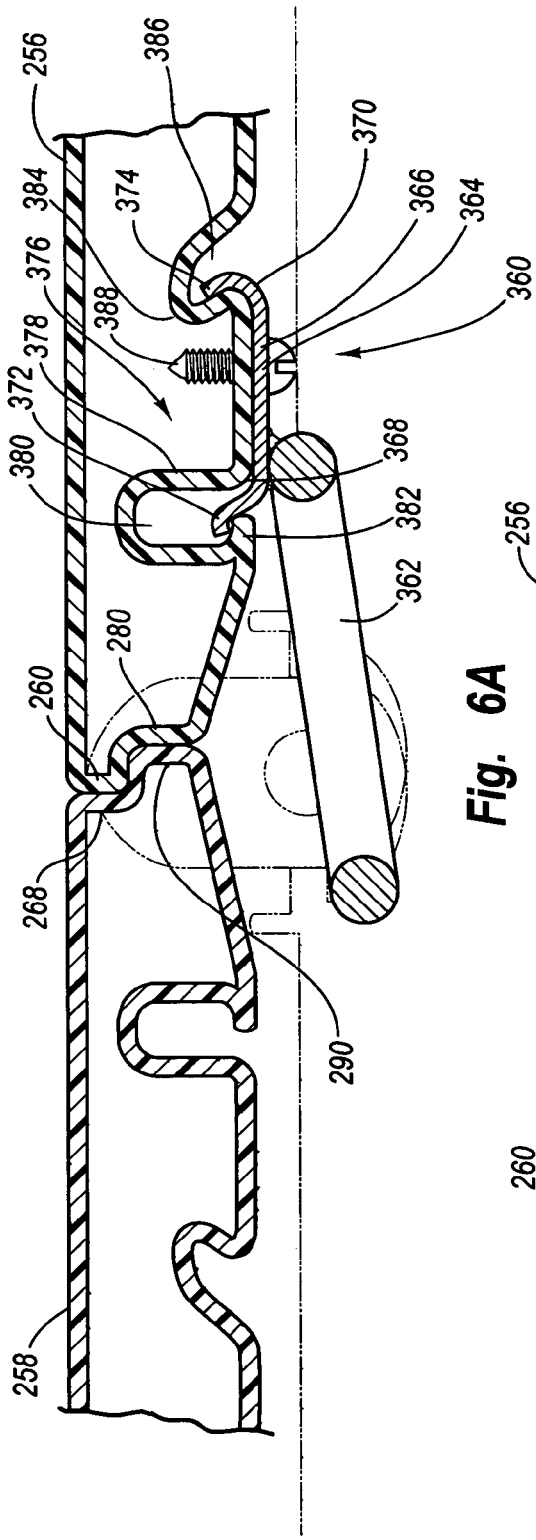
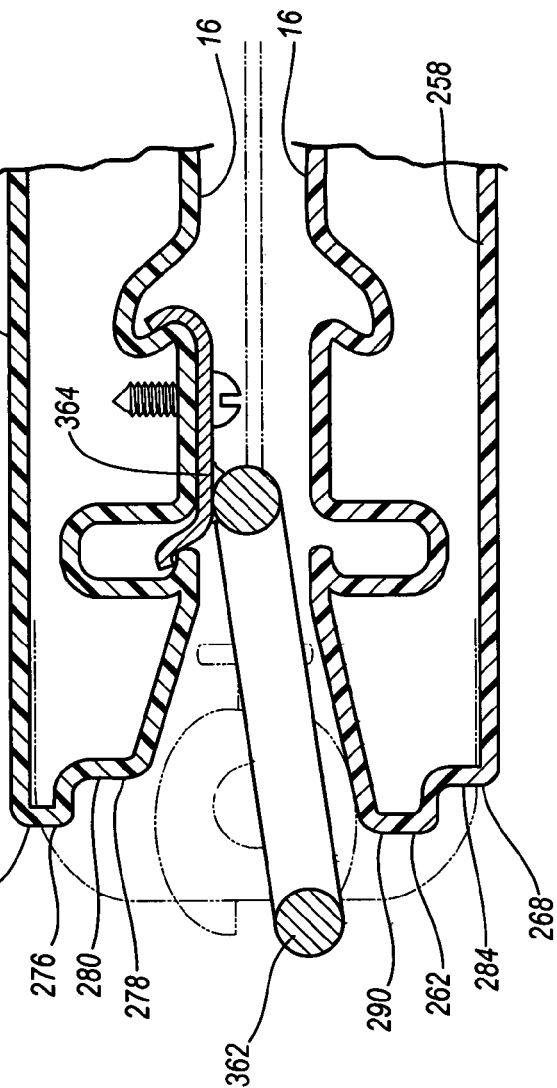

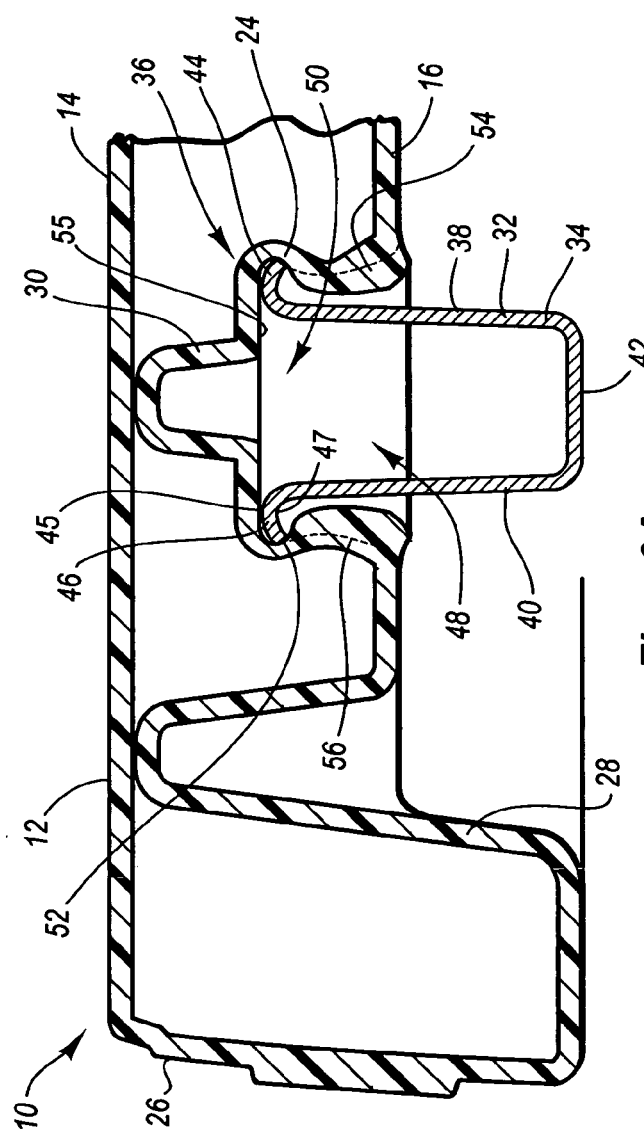
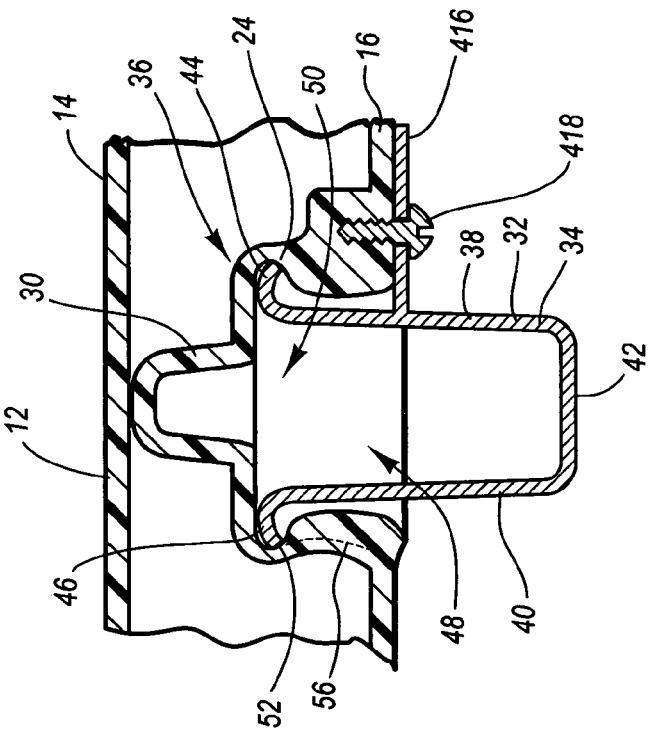
Fig. 9A
Fig. 9B

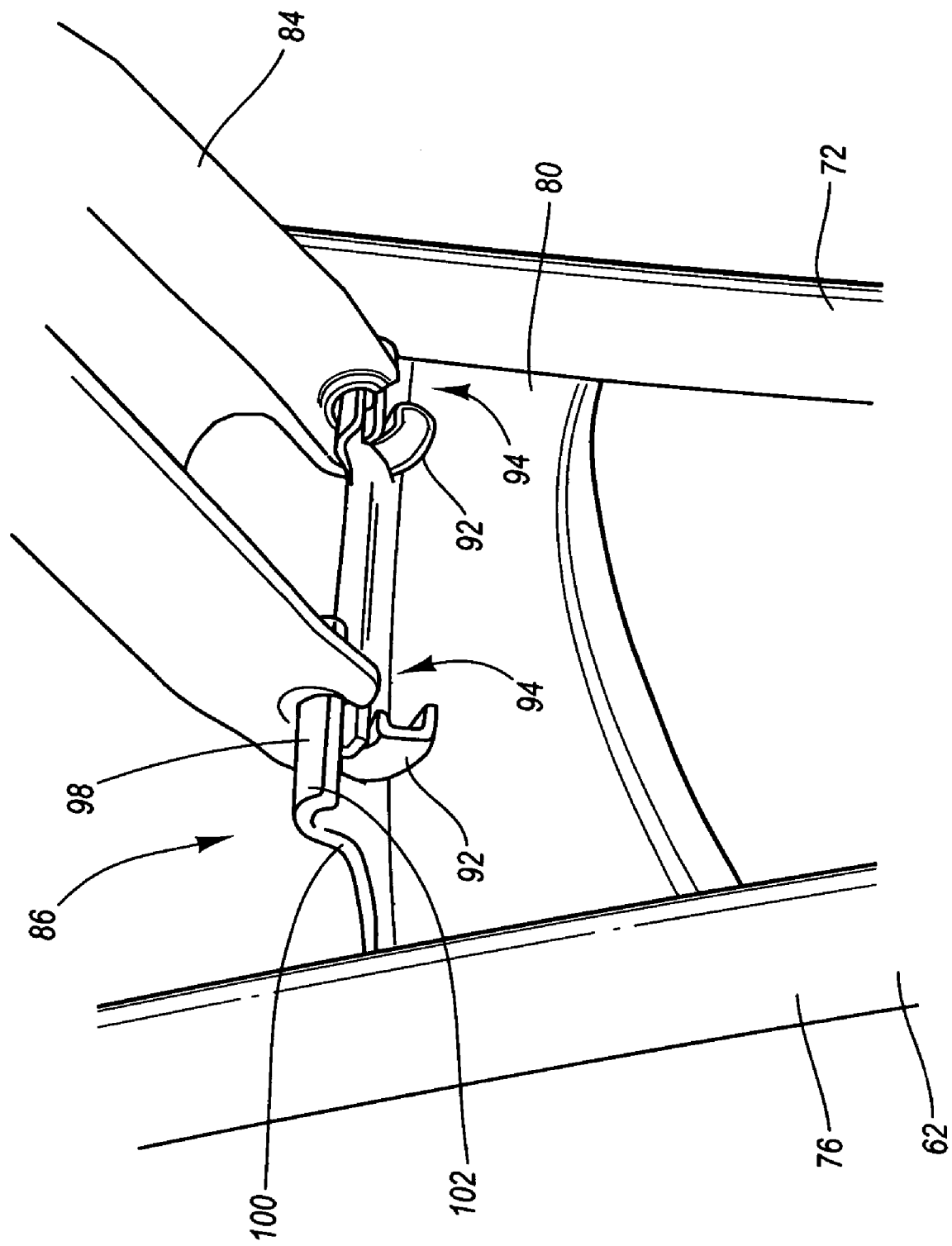

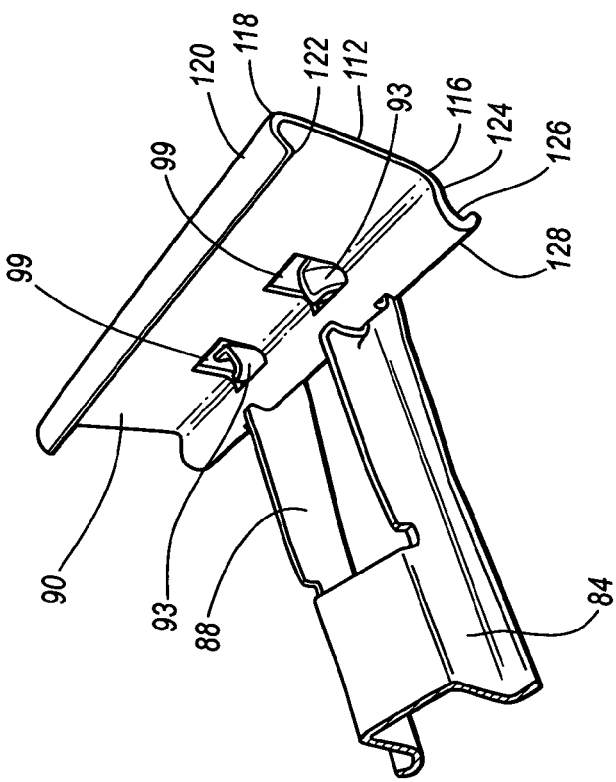
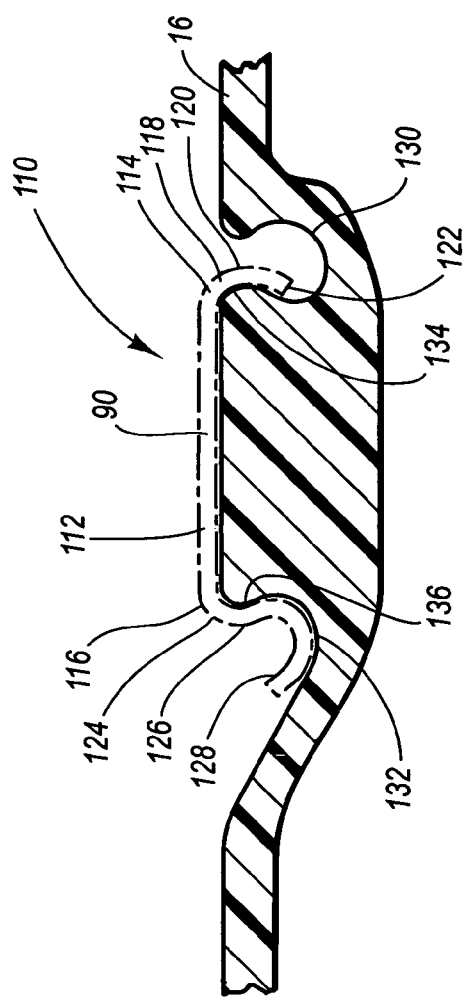
Fig. 17
Fig. 18

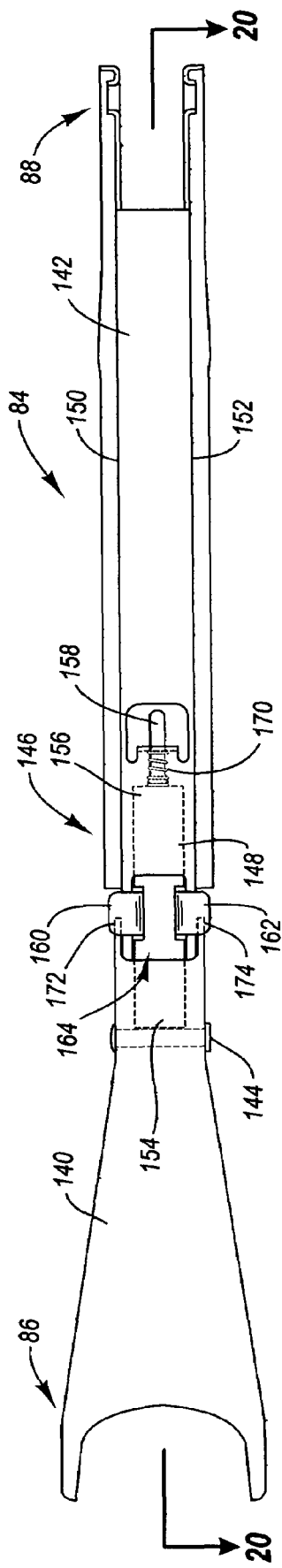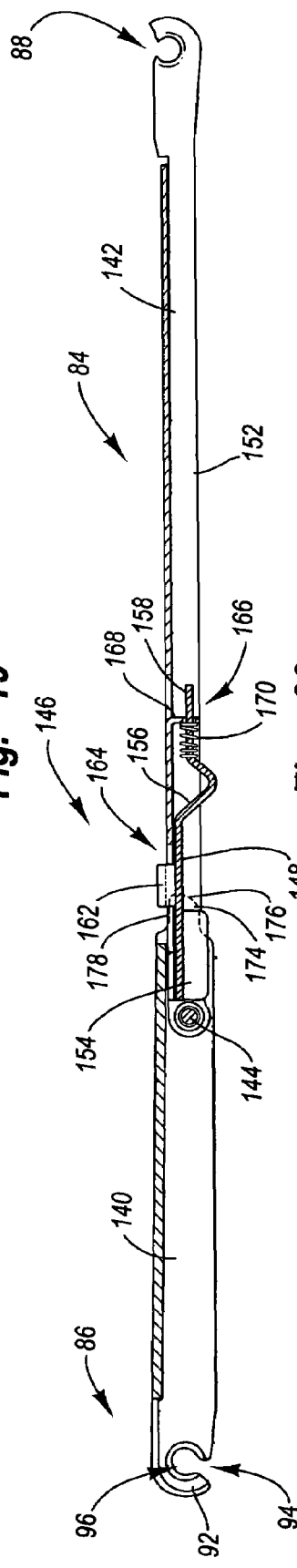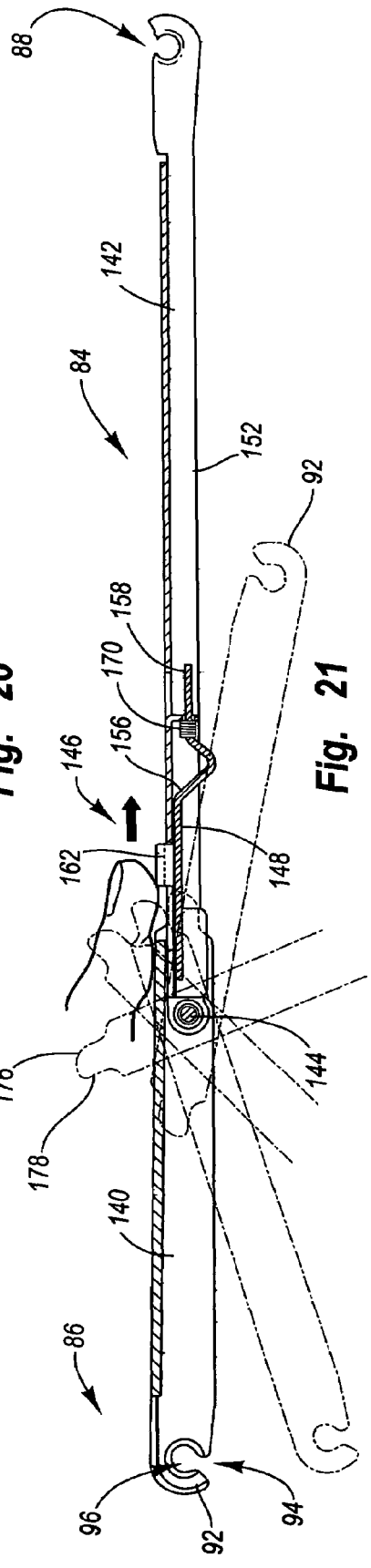

PORTABLE FOLDING TABLE WITH LOCKING HINGE

CROSS-REFERENCE TO RELATED APPLICATIONS

The present application is a continuation-in-part of U.S. patent application Ser. No. 10/408,914, filed Apr. 8, 2003 now U.S. Pat. No. 7,096,799 which claims priority to and the benefit of U.S. Provisional Patent Application Ser. No. 60/371,486, filed on Apr. 9, 2002 and is a continuation-in-part of U.S. patent application Ser. No. 29/180,752, filed Apr. 29, 2003 now U.S. Pat. No. D489557 which applications are hereby incorporated by reference in their entirety.

BACKGROUND OF THE INVENTION

The present invention is generally related to tables and, in particular, to foldable tables.

Description of Related Art

Many different types of tables are well known and used for a variety of different purposes. For example, conventional tables may include legs that are pivotally attached to the table top and the legs may be movable between a use position in which the legs extend outwardly from the table top and a storage position in which the legs are folded against the table top. Large, portable tables with folding legs are often referred to as "banquet tables" and these tables are often used in assembly halls, banquet halls, convention centers, hotels, schools, churches, and other locations where large groups of people meet. Because the tables are portable, the tables can be positioned in an assortment of different configurations and used in a variety of settings. When the tables are no longer needed, the tables can be moved or stored.

The ability to collapse the legs on a banquet table allows the table to be more conveniently stored. Even when the legs are collapsed, however, the table top for the table retains its size and shape. For example, many banquet tables have a length in a range between about six to eight feet and a width of about four feet. As a result, the storage of banquet tables even with the legs collapsed still requires a relative large storage area. This required large storage area may not be a problematic for large facilities such as hotels, schools, and churches. It is often desirable, however, to have one or more banquet tables at smaller facilities such as restaurants, offices, or homes where the tables may be used less frequently for special occasions. Conventional banquet tables, even when the legs are folded, are too large and obstructive to be conveniently stored at such smaller facilities. As a result, it is often necessary to rent or borrow the banquet tables for other locations when needed. This process can be inconvenient, time consuming, and costly.

Furthermore, transporting conventional banquet tables can be problematic. That is, because of the length of the banquet tables, they are difficult to move by a single person. As such, two or more people are often required. In addition, the extended length of the banquet tables precludes them from being transported in the trunk or back seat of a car. Rather, they are typically limited to being transported in the bed of a truck or trailer. Again, this can be problematic for those not having access to a truck or trailer.

Tables have been designed wherein the tabletop is foldable between a folded an unfolded position. Many tables having a foldable tabletop, however, are highly unstable. For example, the table can be weak along the hinge joint causing the table top to sag. To prevent this, foldable table tops are typically made out of stronger and thicker material. As a result, however, the weight of the table increases making them more difficult to carry and move. Tables with foldable tabletops are also more difficult to move and store in that the tabletops often unintentionally swing between the folded and unfolded position as an individual is trying to move, place and/or stack the tables. This is true for attempts to move both a folded and unfolded table. Likewise, tables which have been moved into the folded position can often be difficult to carry in that there no convenient handholds. To exacerbate this problem, attempting to pick the table up in the wrong way can cause the table to unintentionally unfold.

An additional shortcoming of some tables with foldable tabletops is that the hinges are connected to the table top sections using a plurality of screws that are bored into the table top. Disadvantageously, the structural integrity of the table top may be decreased by the holes created by the plurality of screws, and this may allow the table to collapse and fail. In addition, because the screws are typically individually attached to the table top, that may significantly increase the amount of the time required to construct the table.

BRIEF SUMMARY OF THE INVENTION

A need therefore exists for a table that eliminates the above-described disadvantages and problems.

One aspect of the invention is a table including a table top and legs wherein the legs can be selectively collapsed and the table top can be selectively moved between a folded and unfolded position. Advantageously, when the table is in the unfolded position, the table top and legs create a strong, sturdy and secure table that can be used to support a wide variety of objects and the table can be used for many different purposes.

Furthermore, because the table top can be selectively moved between the folded and unfolded position, the table can be easily moved by a single person, stored in a much smaller area than conventional tables, and transported in the backseat or trunk of an automobile.

In one embodiment the table top is constructed from blow-molded plastic to allow a lightweight table to be constructed. Significantly, if the table top is constructed from blow-molded plastic, it can easily be formed into any desired configuration, shape, size and design depending, for example, upon the intended use and/or configuration of the table. The blow-molded table top is also generally weather resistant and temperature insensitive, which allows the table to be used in a wide variety of locations and environments. In addition, the blow-molded table top is durable, long-lasting, and it generally does not corrode, rust or otherwise deteriorate over time. Further, because the blow-molded table top is relatively strong, it can be used to support a relatively large amount of weight. Significantly, the blow-molded table top may form a structural member of the table, or the table top maybe supported by a frame.

Advantageously, the blow-molded plastic table top is relatively strong because it includes two or more opposing walls or surfaces that are separated by a given distance. The opposing walls help create a high-strength, rigid table top. In addition, because the interior portion of the table top is generally hollow, that creates a lightweight table top. Thus, the blow-molded table top is both lightweight and strong.

In another aspect of one embodiment of the table, the foldable table top comprises a first table top section and a second table top section that each have an inside edge that bound a central fold joint. Each inside edge has a tongue or groove that aligns with a tongue or groove on the other inside edge. The table top sections are configured so that the tongues and grooves interlock when the table top is in the unfolded position. As a result, the table top has increased strength along the fold joint when the table top is in the unfolded position. Due to the increased strength resulting form the interlocking features, the table top can be made of a lighter material without sacrificing strength or integrity.

In another embodiment of the present invention, a handle can be mounted on the bottom surface of the table top such that the handle projects between the inside edges of the table top sections when the table top is in the folded position. In this configuration, a single individual can easily gasp the projecting handle to carry the table. Because of the position of the handle, there is no problem with the table unintentionally unfolding while the table is being carried. Furthermore, the handle is out of the way and thus not obstructive when the table is in the unfolded position. In other embodiments, the handle can be placed at other locations.

Another aspect is that the table may be easily assembled and/or disassembled because it does not include any heavy or complex mechanisms to attach the legs to the table top or to connect the table top sections. In contrast, the table preferably includes a frame that can be attached to the table top by a snap, friction or interference fit. Specifically, the frame preferably includes two elongated side rails that are connected to frame mounting portions that are integrally formed in the table top. Significantly, no bolts, screws or other mechanical fasteners are required to attach the frame to the table top, but fasteners may be used if desired. Because mechanical fasteners are not required to attach the frame to the table top, fewer parts are required to assemble the table and no decrease in the structural integrity or strength of the table is created.

Still another aspect is that the table can be manufactured quickly and easily. In particular, because the frame can be connected to the table top by a snap, friction or interference fit, no fasteners are required to attach the frame to the table top. This may allow the table to be assembled with less time than conventional tables. In addition, because the frame may be simply and easily connected to the table top, fewer workers may be required to assemble the table. Further, the straight forward design and attachment of the frame to the table top may allow the table to be shipped either assembled or unassembled, and it may allow retailers or consumers to assemble the table if desired.

Further to the above, in yet another embodiment hinge assemblies are directly mounted to the side rails of the frame so as to hingedly connect the table top sections. The hinge assemblies enable the table top to move between the folded and unfolded positions. Because the hinge assemblies are mounted directly to the side rails, the hinge assemblies do not have to be separately mounted directly to the table top by screws or other fasteners. The hinge assemblies are thus designed to help achieve the benefits as discussed above with regard to the frame.

In still another embodiment, a latch can be movably mounted to one of the hinge assemblies. The latch is designed to selectively lock the hinge assembly when the table top is in the unfolded position. As a result the table top is stable and can be easily moved when in the unfolded position without risk of unintentionally folding. In one embodiment, the latch is spring biased so that the latch automatically locks when the table top is moved into the unfolded position.

A further aspect of the table is that the legs may be attached to the frame. In particular, the side rails of the frame may include openings that are sized and configured to receive a cross member that allows the legs to pivot between a use position and a storage position relative to the table top. The openings preferably have a non-circular configuration and the cross member also has a non-circular cross-sectional configuration. In particular, the openings and the cross member may have oval, elliptical, oblong or egg-shaped configurations. The openings and cross member are preferably configured such that when the legs are positioned in the folded or stored position, the cross member is relatively loosely held within the openings in the frame. On the other hand, when the legs are in the extended or use position, the cross member is held tightly within the openings in the frame.

In yet another embodiment of the present invention, a retainer is mounted on a first one of the cross members. The retainer engages with the second cross member on the opposing end of the table top when the table top is moved into the folded position. The retainer helps to retain the table in the folded position so that the table does not unintentionally unfold when the folded table is being carried, transported and/or stored. The retainer is configured to automatically engage with the opposing cross member so as to simplify the engagement process. Furthermore, the retainer is slidably mounted on the first cross member so as to simply the manufacturing process and eliminate the need for separate mechanical fasteners.

These and other aspects, features and advantages of the present invention will become more fully apparent from the following detailed description of preferred embodiments and appended claims.

BRIEF DESCRIPTION OF THE DRAWINGS

The appended drawings contain figures of preferred embodiments to further illustrate and clarify the above and other aspects, advantages and features of the present invention. It will be appreciated that these drawings depict only preferred embodiments of the invention and are not intended to limits its scope. The invention will be described and explained with additional specificity and detail through the use of the accompanying drawings in which:

FIG. 4 is a perspective view of the table shown in FIG. 1 is a partially folded position;

FIG. 5 is a perspective view of the table shown in FIG. 1 is a fully folded position;

FIG. 17 is a cross sectional side view of the mounting bracket shown in FIG. 16 mounted to the bottom of the table top;

FIG. 18 is an enlarged, top perspective view of a portion of the table shown in FIG. 1, illustrating the connection of the support brace to the mounting bracket;

FIG. 19 is an enlarged top view of a portion of the table shown in FIG. 1, illustrating the support brace in the extended position and a locking mechanism in a locked position;

FIG. 20 is an enlarged, cross-sectional side view along lines 20-20 of the portion of the table shown in FIG. 19, illustrating the locking mechanism in a locked position;

FIG. 21 is an enlarged, cross-sectional side view of the portion of the table shown in FIG. 20, illustrating the locking mechanism in an unlocked position and the support brace moving from the extended to the collapsed position;

DETAILED DESCRIPTION OF THE PREFERRED EMBODIMENTS

The present invention is generally directed towards foldable tables having one or more hinges. In one embodiment at least one of the hinges can be selectively locked when the table is in an unfolded position. The principles of the present invention, however, are not limited to tables. It will be understood that, in light of the present disclosure, the hinges and locking features disclosed herein can be successfully used in connection with other types of furniture and structures.

Additionally, to assist in the description of the table, words such as top, bottom, front, rear, right and left are used to describe the accompanying figures. It will be appreciated, however, that the table can be located in a variety of desired positions—including various angles, sideways and even upside down. A detailed description of the table with hinge now follows.

Figure 1:
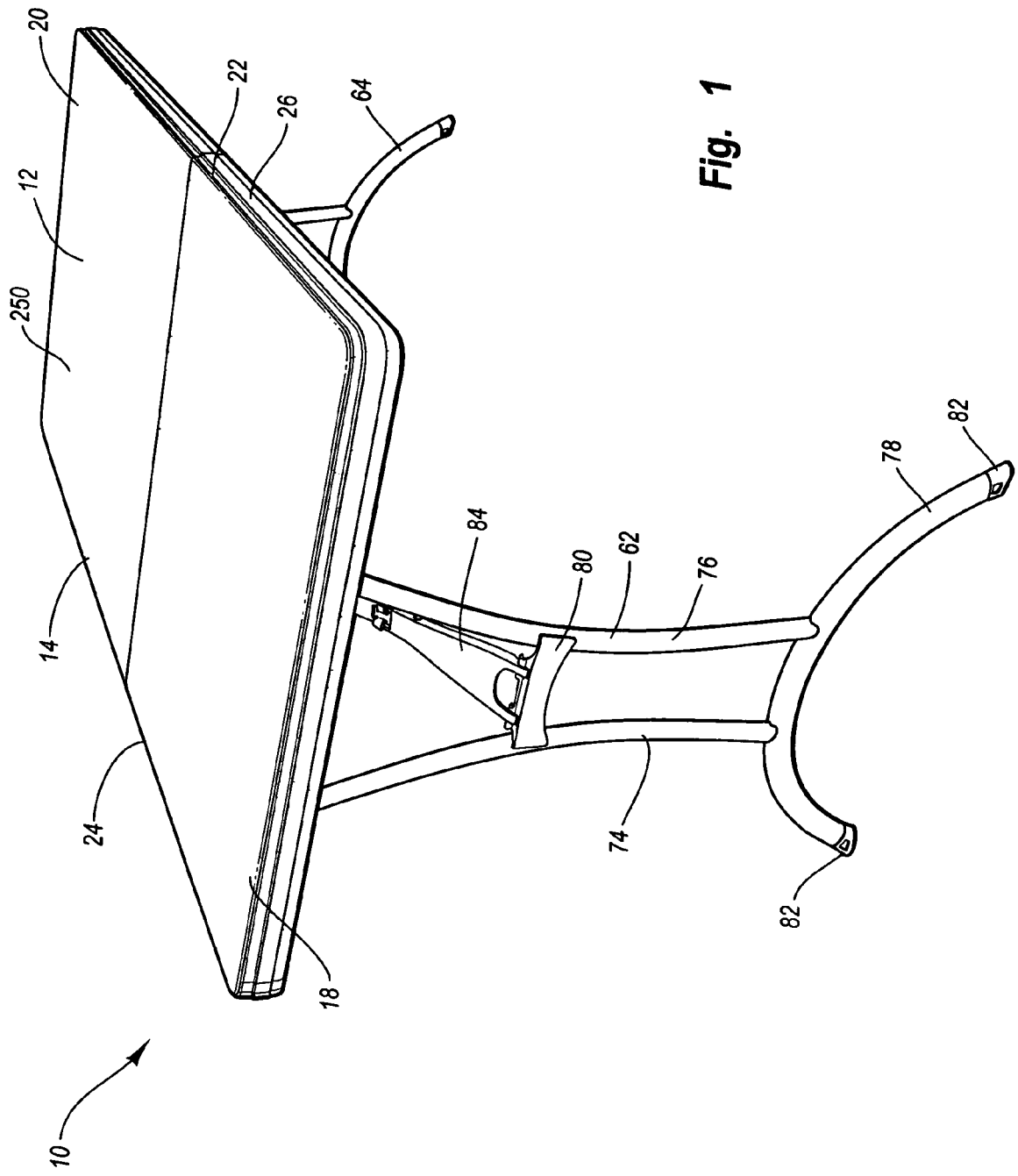
FIG. 1 is a perspective view of a foldable table in accordance with one embodiment of the present invention, illustrating the legs in an extended position.

Depicted in FIG. 1 is one embodiment of an inventive table 10 incorporating features of the present invention. As shown in FIGS. 1 and 2, the table 10 includes a table top 12 with an upper surface 14, a lower surface 16, a first end 18, a second end 20, a front side 22 and a rear side 24. The upper surface 14 of the table top 12 is preferably generally planar to create a smooth, flat working surface, but the upper surface could also be textured and have other suitable configurations depending, for example, upon the intended use of the table 10. The table top 12 may also include an edge 26 that is disposed about the outer perimeter or periphery of the table top. All or a portion of the edge 26 may be beveled, sloped or rounded to, for example, increase the comfort and safety of the user.

The table top 12 may also include a downwardly extending lip 28 (FIG. 3) disposed near or at the outer portion of the table top. The lip 28 preferably extends downwardly beyond the lower surface 16 of the table top 12 and the lip may be aligned with or form a part of the edge 26 of the table top. It will be appreciated that the lip 28 may also be spaced inwardly from the edge 26 of the table top 12. Various embodiments of a lip that may be used in conjunction with the table top 12 are disclosed in Assignee's U.S. patent application Ser. No. 10/096,814, entitled Portable Folding Utility Table with Integral Table Top and Lip, which is hereby incorporated by reference in its entirety.

The table top 12 preferably has a generally rectangular configuration with rounded corners and slightly rounded edges 26. Desirably, the table top 12 has a relatively large size and it is configured for use as a banquet style table. In particular, the table top 12 may have a length of about five feet (or about sixty inches) and a width of about two and one-half feet (or about thirty inches), but the table top can be larger or smaller. For example, the table top 12 could be six or eight feet in length, and the table top could be two or three feet in width. One skilled in the art will appreciate that the table top 12 can be larger or smaller according, for example, to the intended use of the table 10. Additionally, the table top 12 may have other suitable shapes and configurations such as square, circular, oval, and the like depending, for example, upon the intended use of the table 10. In addition, the corners and edges 26 of the table top 12 do not have to rounded and, in contrast, the corners and edges could have any desirable configuration, but the rounded features may increase the comfort and/or safety of the user. Further, the table top 12 could be sized and configured for use with other types of tables such as utility tables, card tables, personal-sized tables, and the like.

The table top 12 is preferably constructed from a lightweight material and, more preferably, the table top is constructed from plastic, such as high density polyethylene. The plastic table top 12 is desirably formed by a blow-molding process because, for example, it allows a strong, lightweight, rigid and sturdy table top to be quickly and easily manufactured. Other conventional molding processes, such as rotational molding and injection molding, can also be used. Advantageously, the blow-molded plastic table top 12 is lighter weight that conventional table tops constructed from wood or metal. The blow-molded plastic table top 12 is lightweight because it is substantially hollow. It will be appreciated that the substantially hollow table top 12 can include table tops that are generally hollow or completely hollow.

Furthermore, table top 12 is preferably constructed from blow-molded plastic because blow-molded plastic table tops are relatively durable, weather resistant, temperature insensitive, corrosion resistant, rust resistant, and blow-molded plastic generally does not deteriorate over time. One skilled in the art, however, will appreciate that the table top 12 does not have to be constructed from blow-molded plastic and other suitable materials and/or processes can be used to construct the table top such as other types of plastics, polymers and synthetic materials. In addition, the table top 12 may be constructed from other materials with sufficient strength and desirable characteristics such as plywood, particle board, solid wood, wood slates, metal alloys, fiberglass, ceramics, graphite, and the like.

The upper surface 14 and the lower surface 16 of the table top 12 are spaced apart a given distance and these two spaced apart surfaces help create a rigid and strong table top 12. Preferably, the upper surface 14 and the lower surface 16 are separated by a generally constant distance so that the surfaces are generally aligned in parallel planes. In one embodiment table top 12 is solid so that upper surface 14 and lower surface 16 are directly connected over the entire area of table top 12.

Figure 3:
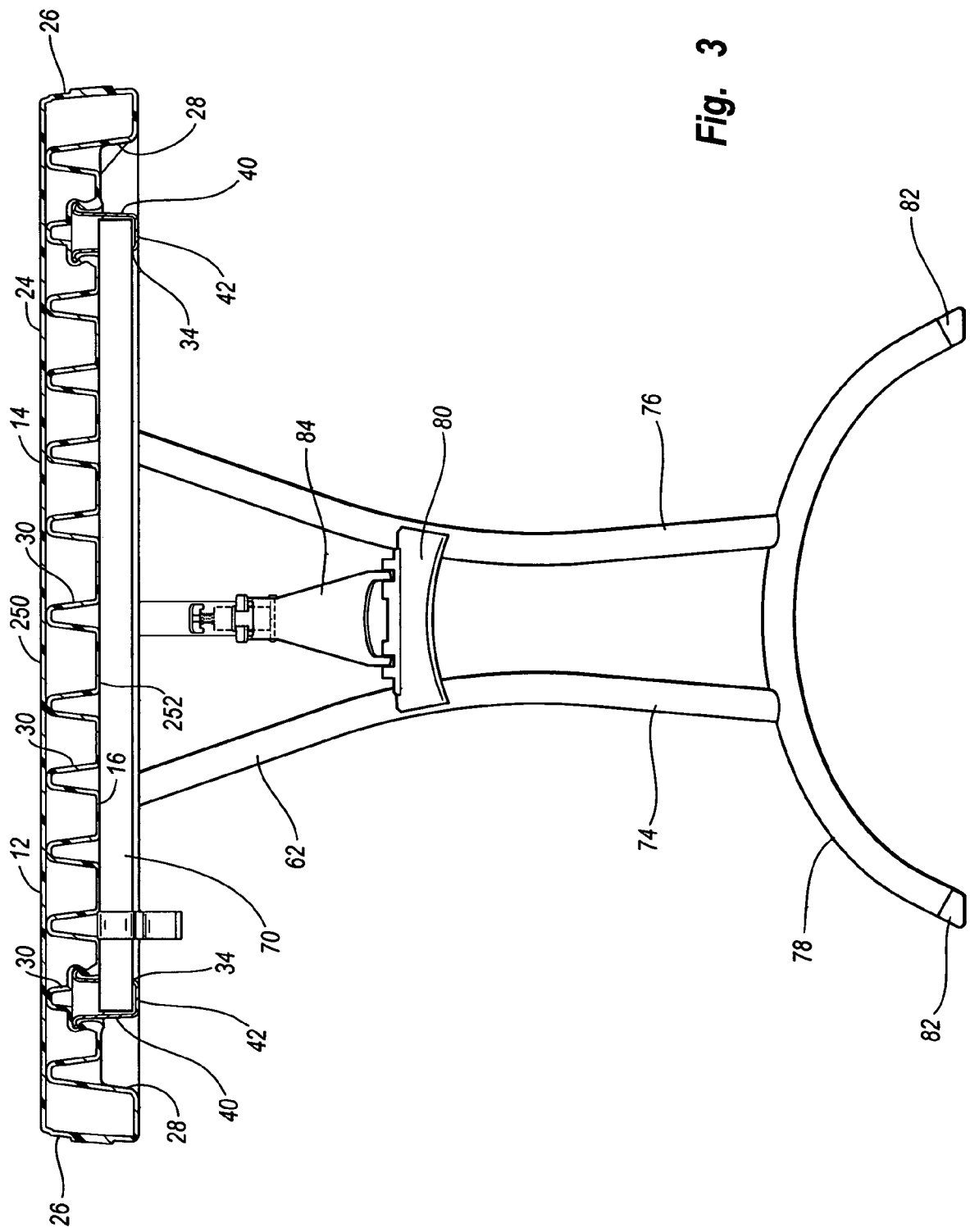
FIG. 3 is an enlarged, cross-sectional side view of a portion of the table shown in FIG. 1, illustrating the leg in an extended position and the cross tube connected to the side rails of the frame.

In the embodiment depicted in FIG. 3, such as when table top 12 is blow-molded, table top 12 can be substantially hollow so that upper surface 14 and lower surface 16 are separated by a gap. For example, table top 12 can comprises an upper wall 250 which includes upper surface 14 and a spaced apart lower wall 252 which includes lower surface 16. Upper wall 250 and lower wall 252 are connected together around their perimeter edges by edge 26. Furthermore, the upper and lower walls 250, 252 of the table top 12 may also be interconnected by one or more tack-offs, kiss-offs or depressions 30, or other reinforcement structures, which may be sized and configured to further increase the strength and rigidity of the table top 12. The depressions 30 and/or other reinforcement structures can be integrally formed as part of table top 12, such as during the blow-molding or other molding processes, or can be formed or attached separately.

Figure 2A:
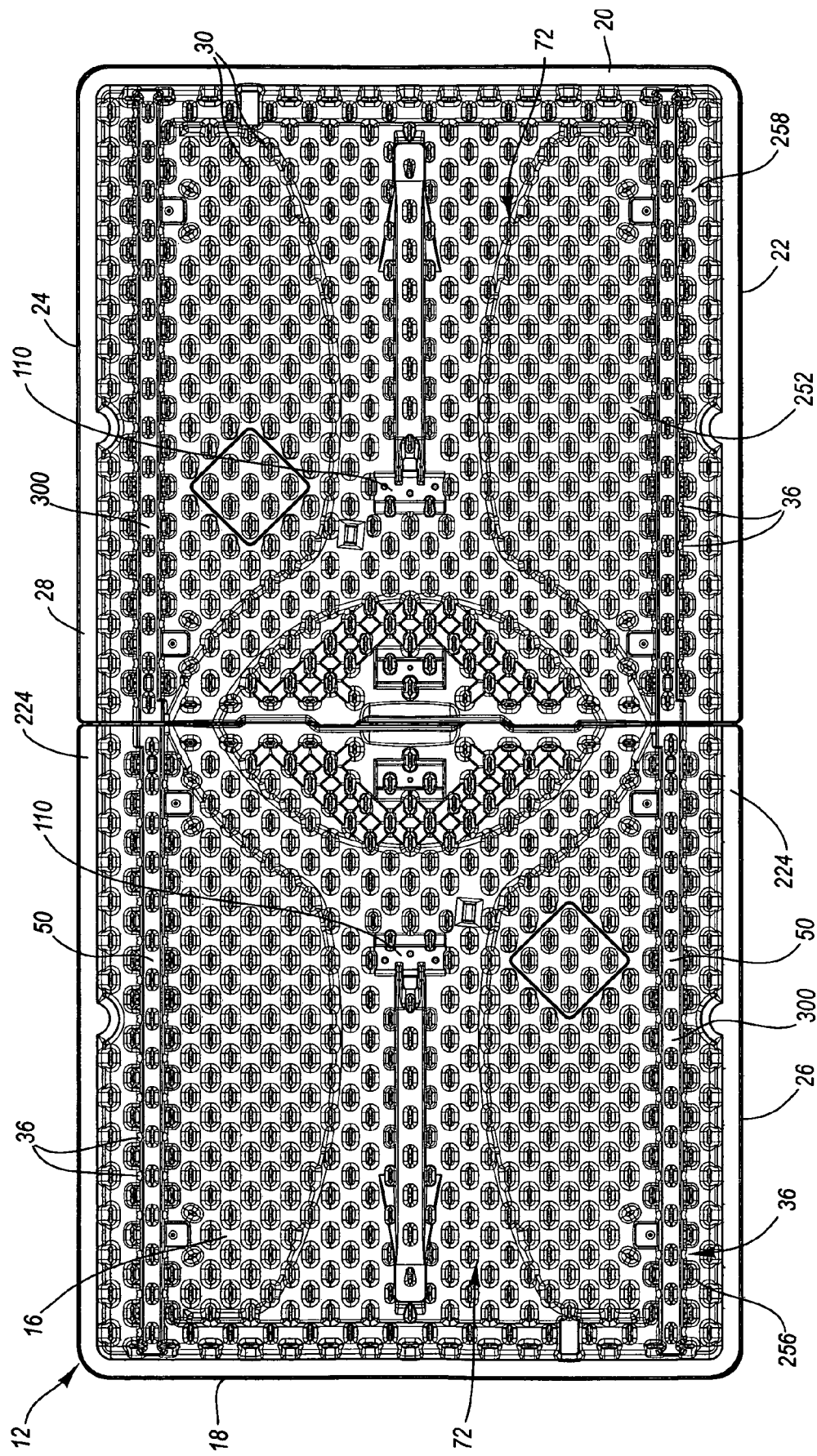
FIG. 2A is a bottom view of the table top of the table shown in FIG. 1.

The depressions 30 are preferably located in the lower wall 252 of table top 12 and the depressions are preferably sized and configured to increase the strength and structural integrity of the table top 12. The depressions 30 preferably extend towards the upper wall 250 of the table top 12 and the ends of the depressions 30 may contact or engage a bottom surface upper wall 250 or the ends of the depressions may be spaced from the upper surface of the table top 12. As shown in FIG. 2A, the depressions 30 preferably cover substantially the entire lower surface 16 of the table top 12, but it will be appreciated that the depressions may cover only a portion of the table top. Additionally, while the depressions 30 are shown and described as being located in the lower wall 252 of the table top 12, it will be appreciated that the depressions could be formed in any desired portion of the table top 12. For example, it will be appreciated that one or more depressions 30 may be formed in the upper wall 250 of the table top 12 and one or more depressions may be formed in the lower wall 252 of the table top 12, and these opposing depressions may be generally aligned. At least a portion of these opposing depressions 30 may contact or engage each other, but the opposing depressions do not have to touch or engage.

As discussed above, the depressions 30 can be arranged into a predetermined pattern or array in order to increase the strength and structural integrity of the table top 12. In particular, the depressions 30 are preferably spaced closely together in a predetermined pattern such that the distance between the depressions is minimized. Advantageously, minimizing the distance between the depressions 30 may minimize the unsupported areas of the upper wall 250 of the table top 12, which may increase the smoothness of the upper surface 14 of the table top. In addition, minimizing the distance between the depressions 30 may increase the structural integrity and strength of the table top 12. Thus, the depressions 30 are desirably closely spaced on the lower wall 252 of the table top 12 such that the depressions are separated by a minimum distance in order to create a table top with greater strength, structural integrity, and an upper surface 14 with increased smoothness.

Advantageously, the increased structural integrity and strength of the table top 12 may allow the thickness of upper wall 250 and lower wall 252 of the table top 12 to be decreased, which may allow less plastic to be used to construct the table 10. Because less plastic may be required to construct the table top 12, that may allow the cost of the table 10 to be decreased. In addition, the blow-molded table top 12 may cool more quickly during the manufacturing process because of the thinner upper and lower wall. This allows the table top 12 to be removed from the manufacturing mold more quickly and it may allow the table top to be removed at a higher temperature because it dissipates heat much more rapidly. Significantly, because the cycle time required to construct the table top 12 may be decreased, the manufacturing efficiency may be increased.

The depressions 30 are also preferably arranged in a predetermined pattern with a generally constant and uniform spacing so that the table top 12 has generally uniform characteristics. In particular, the depressions 30 are preferably arranged into a uniform pattern across the entire surface of the table top 12 so that the strength, structural integrity and/or other characteristics of the table top are generally uniform throughout the table top. Thus, the table top 12 has fewer, if any, weak or unsupported portions which decrease the strength and structural integrity of the table top. Thus, the depressions 30 may be used to create a table top 12 with generally uniform characteristics throughout the table top.

Desirably, other features formed in the table top 12 are sized and configured such that they do not significantly disturb or disrupt the desired pattern of depressions 30. Additional details regarding the size, shape and configuration of depressions that are suitable for use in connection with the table top 12 are disclosed in Assignee's U.S. patent application Ser. No. 10/409,000, filed Apr. 8, 2003 entitled High-Strength, Lightweight Blow-molded Plastic Structures, which is hereby incorporated by reference in its entirety. In alternative embodiments, it is again appreciated that depressions 30 and or other reinforcing structures can be eliminated. As such, lower surface 16 can be substantially flat.

Figure 2B:
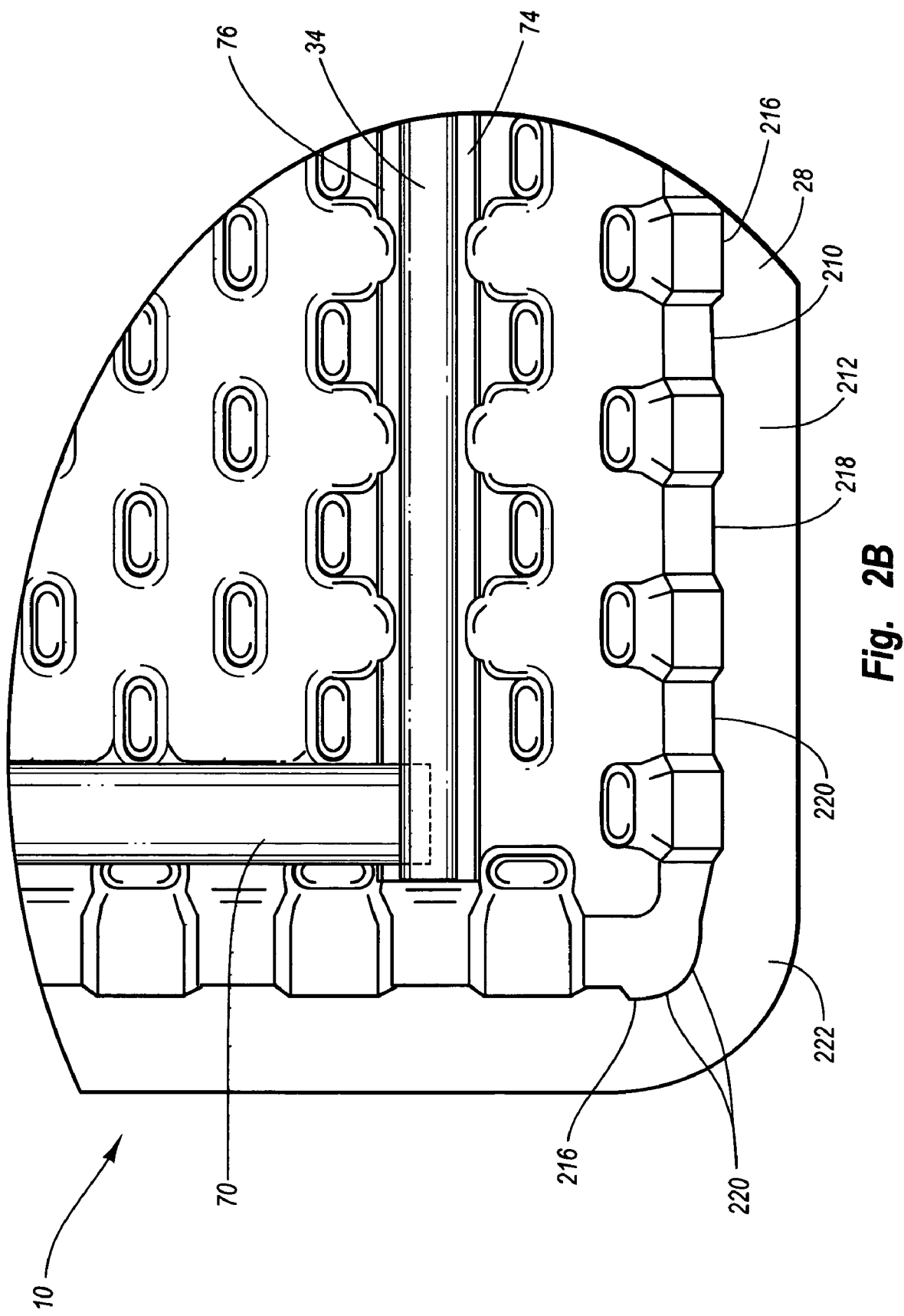
FIG. 2B is an enlarge bottom view of a portion of the table top shown in FIG. 2A, illustrating an inner surface of the lip and corner with one or more strengthening members.

As shown in FIGS. 2A, 2B, and 3, the lip 28 is preferably disposed near or at the outer portion of the table top 12. As discussed above, the lip 28 preferably extends downwardly beyond the lower surface 16 of the table top 12 and the lip may be aligned with or form part of the edge 26 of the table top, but the lip may also be spaced inwardly from the edge of the table top 12. As best seen in FIG. 2B, the lip 28 includes an inner surface 210 and a lower surface 212, and the lip preferably has a generally hollow interior. Advantageously, the lip 28 may be integrally formed during the blow-molding process as part of table top 12. It will be appreciated, however, that the lip 28 does not have to be formed as a unitary component of the table top 12.

The lower surface 212 of the lip 28 desirably has a smooth, planar surface that facilitates stacking of the tables 10. The inner surface 210 of the lip 28, however, includes a number of serrations, notches, ribs, and/or struts that are sized and configured to increase the strength, rigidity and/or flexibility of the lip 28. In particular, the inner surface 210 of the lip 28 may include a number of notches, indentations, grooves or other inwardly extending portions 216 to form an uneven or saw-tooth type surface. The inner surface 210 may also include a number of bumps, humps, protrusions or other outwardly extending portions 218 to form an uneven or saw-tooth type surface. The inner surface 210 of the lip 28 may also contain a combination of inwardly and outwardly portions 216, 218 to form the uneven or saw-tooth type surface.

Advantageously, the uneven inner surfaces 210 of the lip 28 may increase the strength, rigidity and/or flexibility of the lip 28, which may increase the strength, rigidity and/or flexibility of the outer portions of the table top 12. For example, the uneven inner surfaces 210 of the lip 28 may allow the outer portions of the table top 12 to absorb more energy or larger impacts than conventional planar surfaces. Additionally, the uneven inner surfaces 210 of the lip 28 may absorb more energy without deforming and the uneven inner surfaces 210 may flex or deflect more without breaking or permanently deforming. Further, the uneven inner surfaces 210 may be more likely to resiliently return to there original configurations. Thus, the serrated inner surfaces 210 of the lip 28 may form a more durable and longer-lasting outer portion of the table top 12.

The lip 28 may also include one or more ribs 220 that increase the wall thickness of the inner surface 210 of the lip. Advantageously, the ribs 220 may also increase the strength, rigidity and/or flexibility of the outer portions of the table top 12. The ribs 220 preferably extend from the lower surface 16 of the table top 12 to the lower surface 212 of the lip 28 and the ribs are preferably generally vertically aligned, but the ribs may have any suitable arrangement and configuration. It will be appreciated that the ribs 220 may be used in combination with the inwardly extending portions 216 and/or the outwardly extending portions 218 to increase the strength of the table top 12. Further, it will be appreciated that the inwardly extending portions 216, outwardly extending portions 218 and/or ribs 220 may be located in other suitable portions of the table top 12, such as the outer surfaces of the lip, the edge 22 of the table top 12, and/or the lower surface 212 of the lip. It will be understood, however, that the table top 12 does not require inwardly extending portions 216, outwardly extending portions 218 or ribs 220 be formed in the inner surface of the lip 28.

Significantly, the inwardly extending portions 216, outwardly extending portions 218 and/or ribs 220 may be positioned such that they are generally consistent with the pattern of depressions 30 formed in the lower surface 16 of the table top 12. That is, the inwardly extending portions 216, outwardly extending portions 218 and/or ribs 220 may be located so that they are aligned with the pattern of depressions 30 to create a table top 12 with more uniform characteristics. This may allow a table top 12 to be constructed with generally consistent strength and structural integrity.

Further, as seen in FIG. 2B, one or more of the corners 222 of the table top 12 may have one or more inwardly extending portions 216, outwardly extending portions 218 and/or ribs 220 to increase the strength and structural integrity of the corner. The inwardly extending portions 216, outwardly extending portions 218 and/or ribs 220 may be spaced closer together in the corners 222 than along the inner surface 210 of the lip 28, if desired, to further increase the strength and structural integrity of the table top. The inwardly extending portions 216, outwardly extending portions 218 and/or ribs 220 may be particularly advantageous in the corners 222 because the corners may be more likely to be damaged and the curved surfaces of the corners may have less strength than the straight edges of the table top 12.

In order to further increase the strength and structural integrity of the corners 222, the radius of the corners may be increased because the strength and structural integrity of the corners increases with a larger radius of curvature. Preferably, the radius of curvature of the inner surface of the corner 222 is increased and one or more inwardly extending portions 216, outwardly extending portions 218 and/or ribs 220 are formed in the corner for added strength. It will be appreciated that the inwardly extending portions 216, outwardly extending portions 218 and/or ribs 220 may also be formed on the outer surfaces of the corners 222 and/or the other edges of the table top 12. Other suitable embodiments for a table top with inwardly extending portions, outwardly extending portions and/or ribs are disclosed in Assignee's U.S. patent application Ser. No. 10/409,273 filed Apr. 8, 2003 entitled Edge and Corner for a Table Top, which is hereby incorporated by reference in its entirety.

Figure 7:
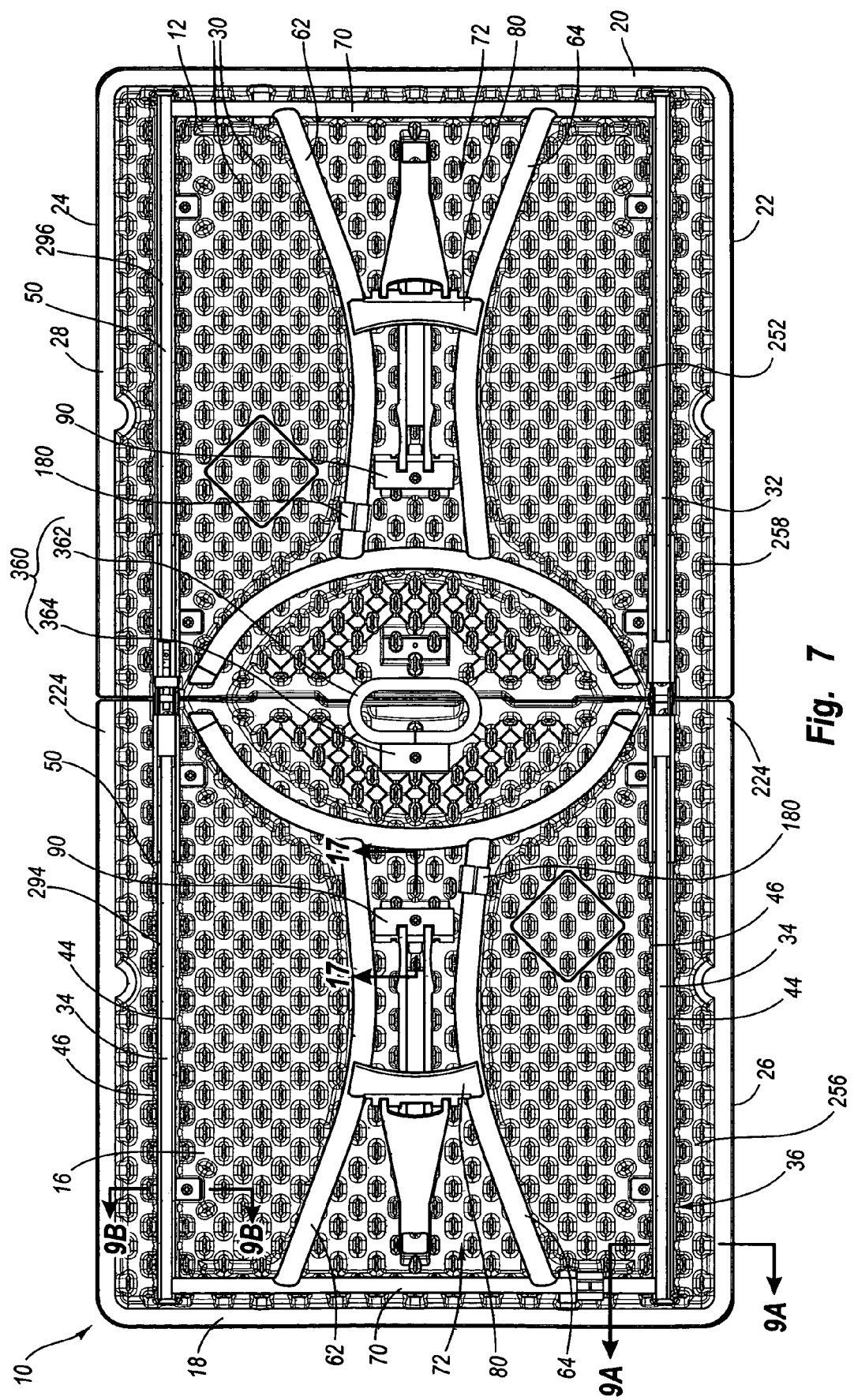
FIG. 7 is a bottom view of the table shown in FIG. 1, illustrating the frame attached to the lower surface of the table top and the legs in a collapsed position.

As seen in FIGS. 2A and 7, the inner surface 210 of lip 28 may also contain one or more handles 224 that are integrally formed in the table top 12. The handles 224 allow the table 10 to be easily carried when the legs 62, 64 are in the collapsed position. In particular, the handles 224 are preferably sized and configured to allow the user to grip the table 10 with one hand and the handles are preferably located at or near the center of the table top 12. The handles 224 are preferably integrally formed in the lip 28 of the table top 12 so that the generally consistent pattern of depressions 30 in the lower surface 16 of the table top is not disturbed, but the handles may be formed in any desired portion of the table top. Additionally, while the handles 224 are preferably integrally formed in the table top 12 as part of the blow-molded structure, the handles do not have to be integrally formed in the table top.

Significantly, the lip 28, inwardly extending portions 216, outwardly extending portions 218, ribs 220 and handles 224 may be integrally formed in the table top 12. Desirably, these features are integrally formed in the table top 12 during the blow-molding process. It will also be understood that other features of the table top 12 as discussed below in greater detail may also be integrally formed with table top 12. For example, the depressions 30 and the various mounting portions brackets, clips, and receiving portions as disclosed herein may be integrally formed with table top 12. Because these features may be integrally formed in the table top 12, that may expedite the manufacturing process. These features, however, do not have to be integrally formed in the table top 12 and they could be attached to the table top by any suitable methods or devices.

As depicted in FIG. 4, table top 12 comprises a first table top section 256 and a separate second table top section 258. First table top section 256 comprises an inside edge 260, an outside edge 262 and opposing side edges 264 and 266 extending therebetween. Similarly, second table top section 258 includes an inside edge 268, an outside edge 270, and opposing side edges 272 and 274 extending therebetween. Inside edges 260 and 268 are adjacently disposed. It is appreciated that the structures that are discussed above with regard to table top 12 generally, are also applicable to table top sections 256 and 258. In one embodiment, table top sections 256 and 258 are formed as separate and discrete members using the processes and materials as discussed above with regard to table top 12. In an alternative embodiment, table top 12 can initially be formed as a single table top that is subsequently severed.

Inside edge 260 of first table section 256 comprise an upper edge portion 276 which extends along upper surface 14 between side edges 264 and 266. Inside edge 260 also comprises a lower edge portion 278 which is disposed between upper edge portion 276 and lower surface 16 and which also extends between side edges 264 and 266. Upper edge portion 276 is substantially flat and linear. In contrast, lower edge portion 278 has a plurality of alternating grooves 280 recessed therein and tongues 282 projecting therefrom.

Inside edge 268 of second table top section 258 also includes an upper edge portion 284 and a lower edge portion 286 each extending between opposing sides 272 and 274. Again, upper edge portion 284 is substantially flat while lower edge portion 286 has a plurality of alternating grooves 288 recessed therein and tongues 290 projecting therefrom.

As will be discussed below in greater detail, first table top section 256 and second table top section 258 are hingedly coupled together so that they can be selectively moved between a folded position (FIG. 5) and an unfolded position (FIG. 1). Tongues 282 of first table top section 256 are aligned with corresponding grooves 288 of second table top section 258. Similarly, tongues 290 of second table top section 258 are aligned with corresponding grooves 280 of first table top section 256. As a result, when table 10 is moved into the folded position, tongues 282 and 290 are received within corresponding grooves 280 and 288, thereby interlocking table top sections 256 and 258 along inside edges 260 and 268. (See FIGS. 6A and 6B.) This interlocking provides increased rigidity along insides edges 260 and 268 so as to prevent unwanted bending.

In an alternative embodiment, instead of having both tongues and grooves along each of the insides edges 260 and 268, all of the tongues can be positioned on one of the inside edges while all of the grooves can be placed on the other inside edge. In yet other embodiments, it is appreciated that the plurality of short tongues and grooves can be replaced with one or two elongated tongues and grooves. Furthermore, it is appreciated that the tongues and grooves can be a variety of different sizes, shapes, and configurations. In still other embodiments, it is appreciated that the tongues and grooves can be eliminated. In this embodiment, insides edges 260 and 268 can simply be flat so as to bias against each other or to be slightly spaced apart.

Figure 9A:
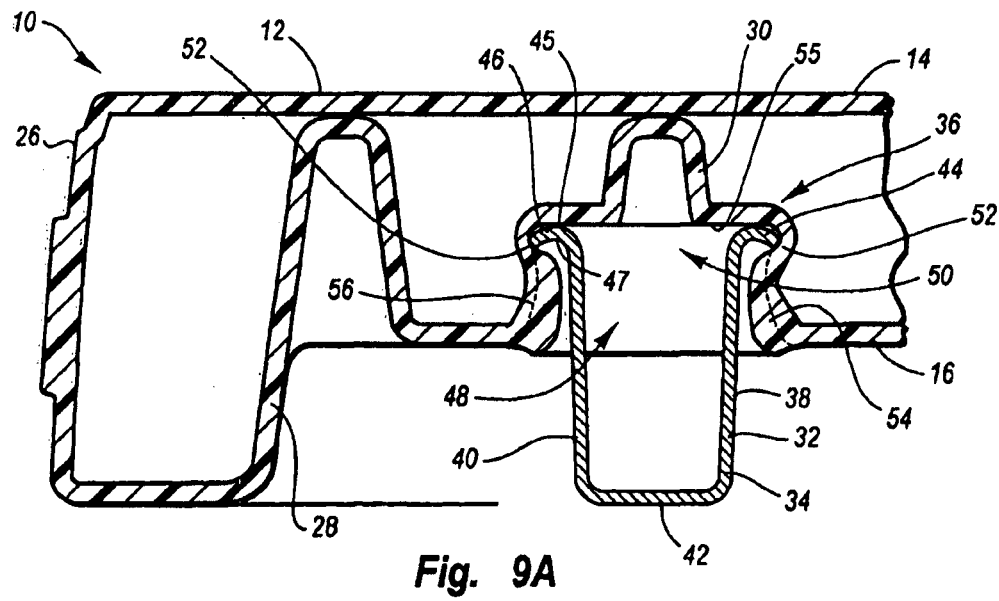
FIG. 9A is an enlarged, cross-sectional side view along lines 9A-9A of the table top shown in FIG. 7, illustrating a portion of the frame attached to the table top by a frame mounting portion and a downwardly extending lip.

As shown in FIG. 7, table 10 further comprises a frame 32 connected to the lower surface 16 of the table top 12. The frame 32 includes two side rails 34 that extend along the length of the table top 12. The side rails 34 are preferably positioned near opposing edges 26 of the table top. In particular, the side rails 34 are preferably disposed inwardly from the lip 28 such that there is a gap or space between the side rails and the lip (FIG. 9A). The side rails 34 preferably extend almost the entire length of the table top 12 to provide increased strength and rigidity for the table top 12. Alternatively, the side rails 34 may extend along only a portion of the length of the table top 12 and the side rails may not be required to provide increased strength or rigidity to the table top 12.

The frame 32 is desirably constructed from metal, which may easily be formed into the desired configuration by known operations such as stamping and bending, and the metal may be coated or painted as desired. The frame 32 may also include one or more end rails attached to the ends of the side rails 34 and the frame may provide attachment points for the legs, as discussed in more detail below. While the frame 32 preferably includes two side rails 34 that are generally aligned in a parallel configuration, it will be appreciated that the frame may have other suitable configurations and arrangements depending, for example, upon the size and shape of the table top 12 or the intended use of the table 10.

Figure 8:
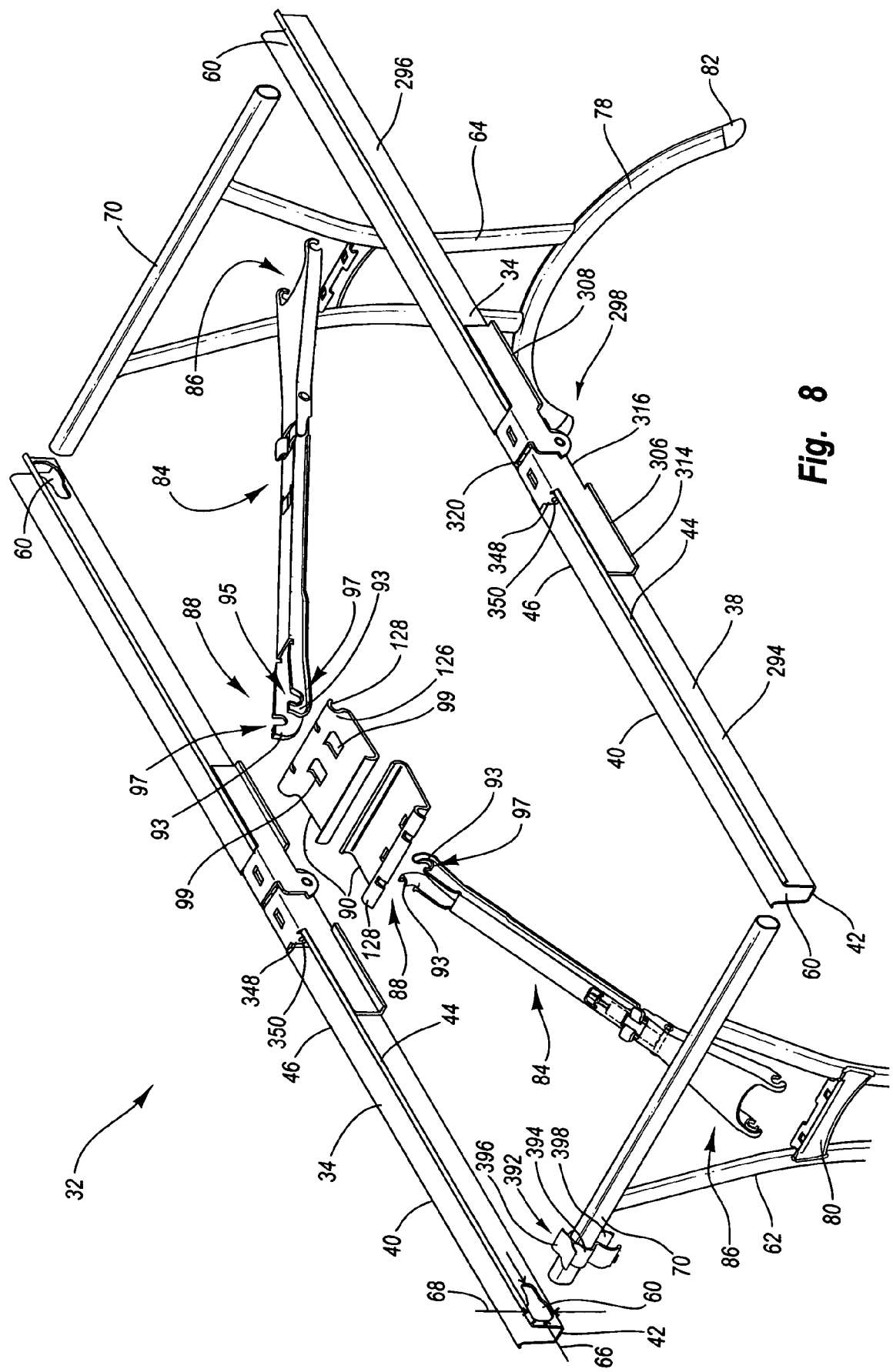
FIG. 8 is an exploded, perspective view of a portion of the table shown in FIG. 1, illustrating the legs, frame, support braces and brackets.

As depicted in FIG. 8, each side rail 34 comprises an elongated first rail portion 294 designed for mounting on first table top section 256, an elongated second rail portion 296 designed for mounting on second table top section 258, and a hinge assembly 298 extending between rail portions 294 and 296. In one embodiment, as seen in FIG. 9A, each rail portion 294 and 296 of each side rail 34 has a generally U-shaped transverse cross section. Specifically, each rail portion includes an elongated first side wall 38, an elongated second side wall 40, and a connecting portion 42 extending between the lower ends of side walls 38 and 40. An upper end of first side wall 38 terminates at an outwardly projecting engaging portion 44 while the upper end of second side wall 40 terminates at an outwardly projecting engaging portion 46.

In the embodiment depicted, the engaging portions 44, 46 simply comprise the ends of the first side wall 38 and second side wall 40 being bent outwardly over an angle in a range between about 90° to about 120°. Other angles can also be used. As a result, each engaging portion 44, 46 typically forms an inside angle less than about 90° relative to the first and second side walls 38 and 40, respectively. In the embodiment depicted, engaging portions 44, 46 are formed so as to have a substantially smooth, rounded top surface 45 and a cupped bottom surface 47 that terminates at a sharpened edge 52.

Rail portions 294 and 296 of frame 32 are desirably connected to the lower surface 16 of the table top sections 256 and 258 by one or more frame mounting portions 36. Frame mounting portions 36 allow the rail portions 294 and 296 to be connected to the table top by a snap, friction or interference fit. Advantageously, the connection of the frame 32 to the table top 12 does not require the use of mechanical fasteners such as bolts or screws, which desirably expedites the manufacturing or assembly process, but fasteners may be used if desired. Additionally, because screws, bolts and other types of mechanical fasteners are not required to attach the frame 32 to the table top 12, no holes or other types of stress concentrations are formed in the table top. Thus, the strength and structural integrity of the table top 12 is not compromised by drilling holes in the table top. In addition, because the frame 32 is preferably not bonded to the lower surface 16 of table top 12, the table top 12 is not weakened or damaged by adhesive. Thus, strength and integrity of the table top 12 may be retained because the frame 32 is not screwed, bolted or bonded directly to lower surface 16 of the table top. Further, the attachment of the frame 32 to the frame mounting portions 36 may reduce the likelihood of deformation or damage to the table top 12. Finally, the connection of the frame 32 to the table top 12 without using mechanical fasteners or adhesive may facilitate assembly of the table 10 by the retailer or consumer.

The frame mounting portions 36 are sized and configured to retain the rail portions 294 and 296 in a generally fixed position and to prevent the unintended removal of the frame 32 from the table top 12. The frame mounting portions 36 can be connected along the entire length of the side rails 34. Advantageously, any forces acting on the table top 12 and/or the frame 32 are distributed over a large area. In contrast, conventional tables that attached the frame to the table top by mechanical fasteners distributed forces over a much smaller area, which makes conventional tables much more likely to fail. Therefore, the frame mounting portions 36 may provide a very secure attachment of the frame 32 to the table top 12 even though mechanical fasteners are not required. In alternative embodiments it is appreciated that the frame mounting portions 36 can be spaced apart along side rails 34 or can be positioned only at desired locations so that only portions of the frame 32 are attached to the frame mounting portions 36.

As depicted in FIG. 2A, an elongated channel 50 is recessed on lower surface 16 of table top 12 adjacent to each side edges 26. Each channel 50 substantially extends the length of table top 12 and is adapted to receive a corresponding side rail 34. A plurality of frame mounting portion 36 are formed at incrementally spaced apart on location along channels 50. Returning to FIG. 9A, each mounting portion 36 comprises a pair of opposing projections 54 and 56 which project into channel 50 from opposing sides thereof. Each projection 54, 56 extends between an opening 48 of channel 50 to a floor 55 of channel 50. Each of projections 54 and 56 bow centrally inward such that the minimum distance between projections 54, 56 is less than the maximum width between engaging portions 44, 46 on rail portions 294 and 296.

During assembly, rail portions 294 and 296 of each side rail 34 are pressed into a corresponding channel 50 on a select one of table sections 256 and 258. (FIG. 7.) As depicted in FIG. 9A, as side rail 34 is pressed into channel 50, the rounded top surface 45 of engaging portions 44, 46 outwardly pushes or deflects projections 54 and 56 so that engaging portions 44, 46 can be advanced to floor 55. After engaging portions 44, 46 pass projections 54 and 56, the projections 54, 56 resiliently or elastically return to there respective original positions to secure engaging portions 44, 46 and thus rail portions 294, 296 within channels 50.

The engaging portions 44, 46 of the side rails 34 may engage one or more corresponding surfaces within the channels 50 to help secure the frame 32 to the table top 12. As seen in FIG. 9A, sharp edges 52 are sized and configured to engage corresponding projections 54, 56 of the channel 50. Advantageously, the sharp edges 52 engage and bite into the softer, blow-molded plastic material of the projections 54, 56 to allow the frame 32 to be securely connected to the table top 12. Significantly, the engagement of the engaging portions 44, 46 and the edges 52 to the projections 54, 56 and/or the wall bounding channel 50 provides a large contact area between the frame 32 and the frame mounting portions 36.

In one embodiment one or more depressions 30 are preferably formed in the lower portion of the channel 50 so that a generally consistent, uniform pattern of depressions is formed in the table top 12. Advantageously, this helps create a table top 12 with increased strength, structural integrity and generally uniform characteristics. One skilled in the art will appreciate that the depressions 30 could have other suitable arrangements and depressions do not have to be formed in the lower portion of the channel 50.

In addition, because at least a portion of the side rails 34 are inserted into the recesses 50, the side rails and the connecting portion 42 of the frame 32 do not extend a large distance away from the lower surface 16 of the table top 12. This may allow a table 10 with a low profile to be designed and manufactured. Significantly, if the height of the table top 12 is relatively small, then the tables 10 may be more easily stacked. This may assist in the shipping and storage of the tables 10. Additionally, the lip 28 may have a height that is larger than or equal to the distance that the side rails 34 extend from the lower surface 16 of the table top 12 so that the frame is generally hidden from view when the table 10 is viewed from a plane generally aligned with the upper surface 14 of the table top 12. Advantageously, because the frame 32 may be completely or generally hidden from view, the frame does not have to be finished and it may contain visible imperfections or flaws. In addition, because the frame 32 may be completely or generally hidden from view by the lip 28, a more aesthetically pleasing table 10 may be created. It will be appreciated, however, that the lip 28 does not have to hide all or a portion of the frame 32 from view.

As shown in the accompanying figures, the frame 32 engages or abuts several different frame mounting portions 36 to securely attach the frame 32 to the table top 12. The engagement of the side rails 34 to several different frame mounting portions 36 over an extended length of channel 50 allows any forces or loads on the table top 12 and the frame 32 to be distributed over a large area, which helps prevent failure of the table 10. Additionally, because the engaging portions 44, 46 of the side rails 34 preferably extend outwardly and are spaced wider apart than the opening 48 to the frame mounting portions 36, a secure snap, friction or interference connection of the frame 32 to the table top 12 may be established. Further, the side rails 34 and the frame mounting portions 36 are preferably generally symmetrical to help prevent undesirable twisting of the frame 32 and/or table top 12.

Advantageously, the frame 32 can be quickly and easily connected to the table top 12 by inserting the engaging portions 44, 46 of the side rails 34 into the channel 50 and thus between the frame mounting portions 36. As discussed above, mechanical fasteners such as screws or bolts are not required to connect the frame 32 to the table top 12, but such fasteners may be used if desired. In addition, the frame 32 can be more easily disconnected from the table top 12, if desired, because mechanical fasteners do not have to be removed. Other suitable embodiments for connecting a frame to a table top are disclosed in Assignee's U.S. patent application Ser. No. 10/409,259, filed Apr. 8, 2003 entitled Table with Frame That Can Be Attached to the Table Top without Mechanical Fasteners, which is hereby incorporated by reference in its entirety.

Figure 9B:
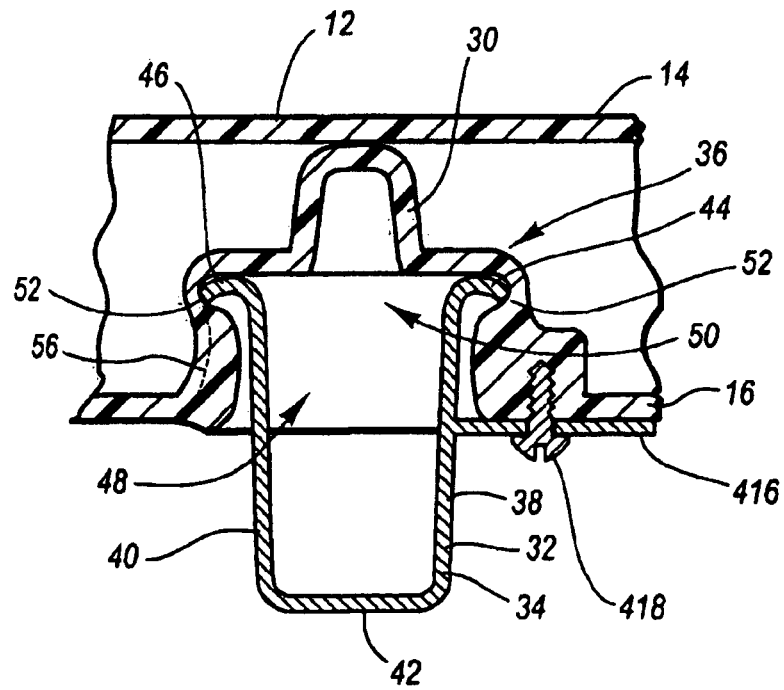
FIG. 9B is an enlarged, cross-sectional side view along lines 9B-9B of the table top shown in FIG. 7, illustrating a portion of a bracket attached to the table top by a bracket mounting portion.
Figure 11B:
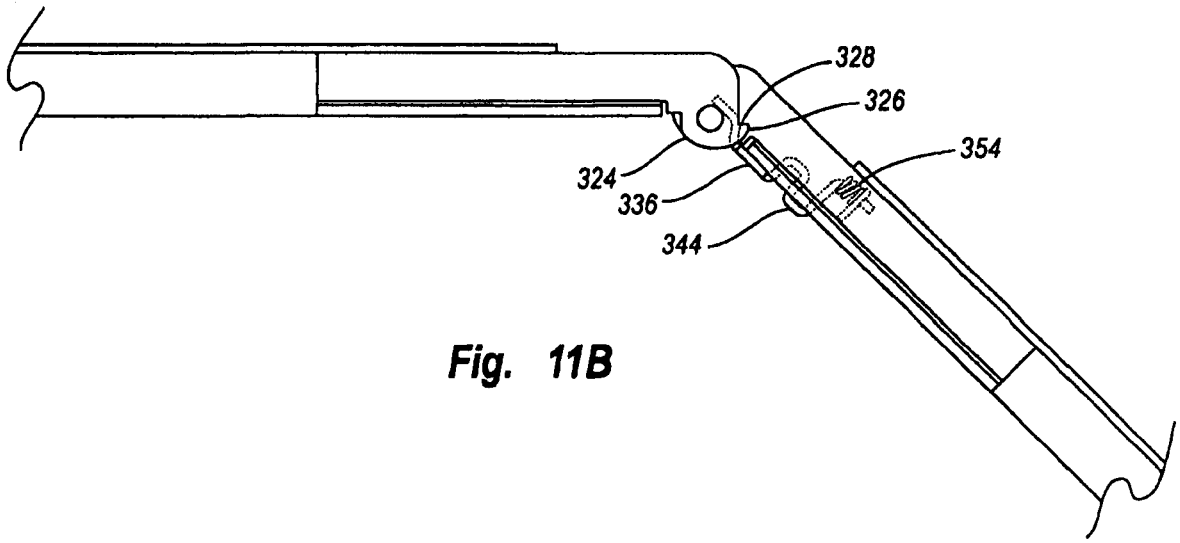
Figure 13:
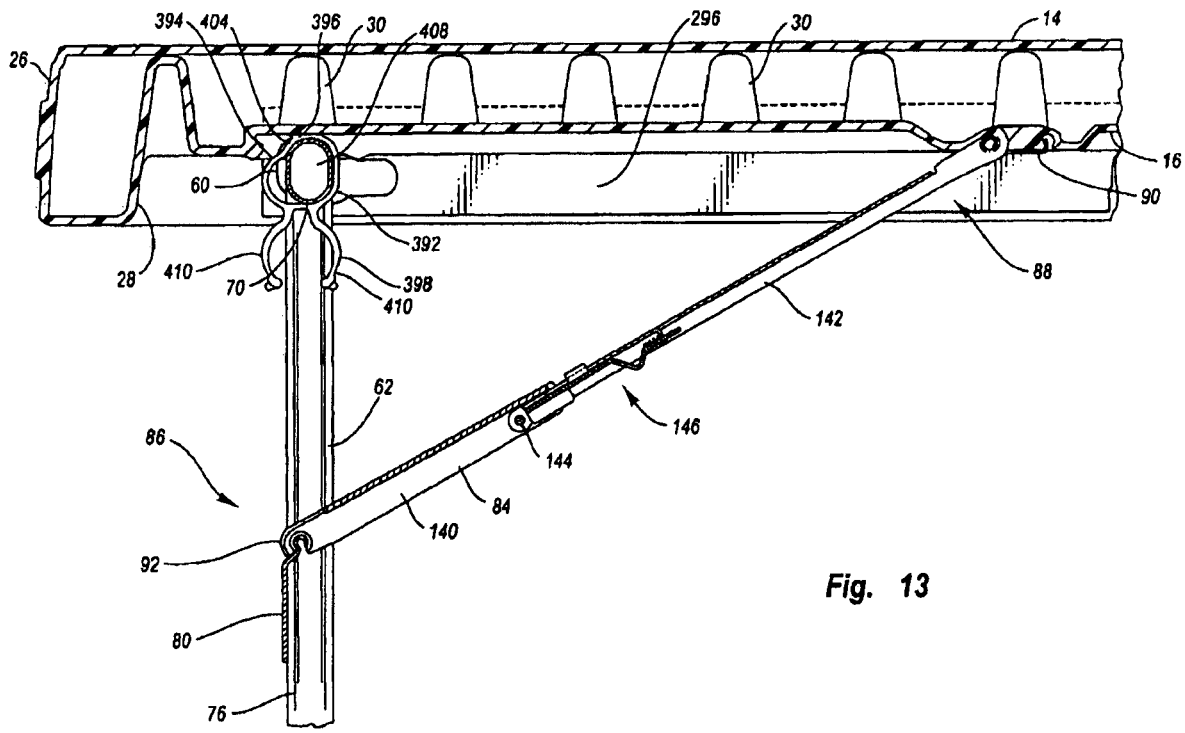

It is appreciated that frame 32 can be mounted to table top 12 in a variety of different configurations. For example, fewer or more frame mounting portions 36 can be used than what is illustrated. For example, in one embodiment one frame mounting portion 36 can be formed on each end of each channel 50. In yet another embodiment, each channel 50 can be formed as a single continuous frame mounting portion 36. In other embodiments, frame mounting portion 36 can be eliminated. Each channel 50 can be sized to freely receive a side rail 34. Mechanical fasteners such as screws, bolts, clamps and the like can then used to secure side rails 34 within channels 50. For example, as depicted in FIG. 9B, a flange 416 outwardly projects from side rail 34. A screw 418 extends through flange 416 and engages with lower surface 16 of table top 12. Flanges 416 can be used in conjunction with or separate from mounting portions 36. In yet other embodiments, channels 50 can be eliminated. Fastening techniques such as adhesive, press fitting, mechanical fasteners, or the like can then be used to directly secure side rails 34 to lower surface 16 of table top 12.

Figure 10:
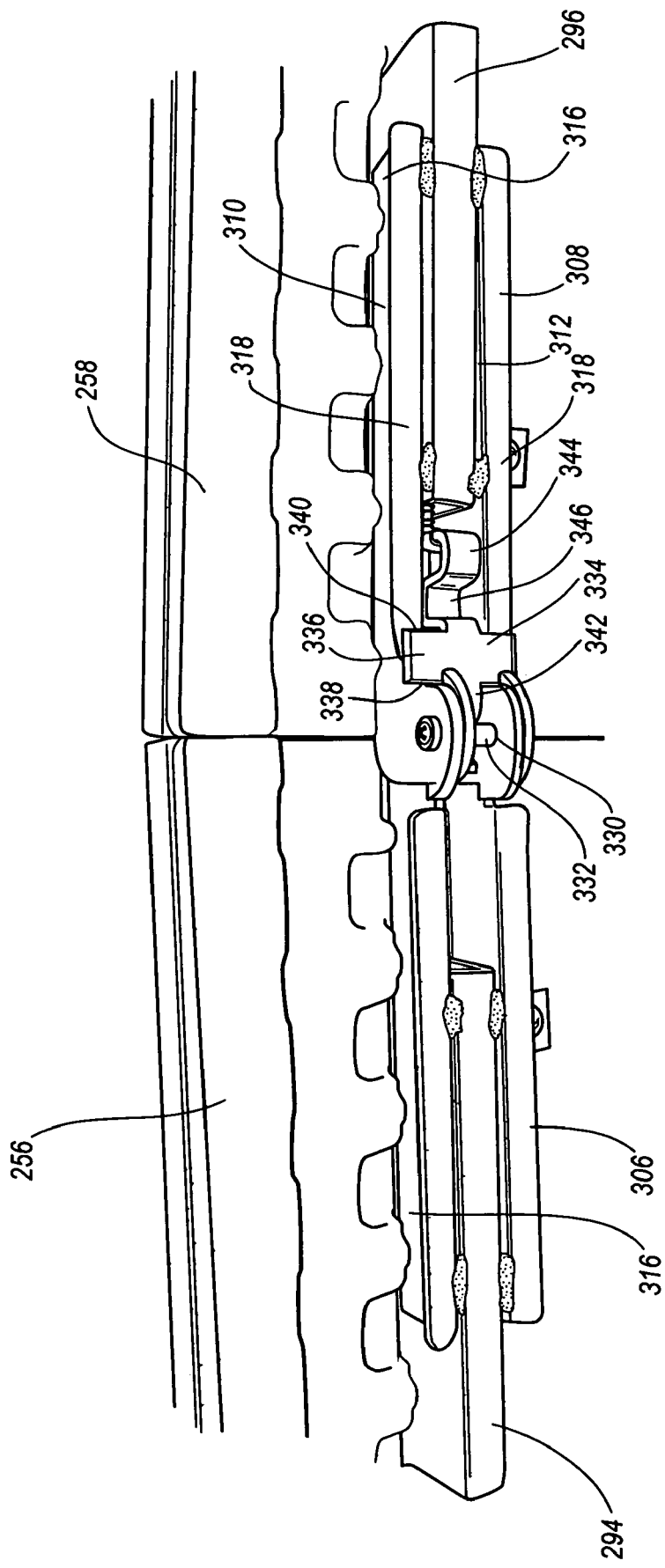
FIG. 10 is an enlarged perspective view of the hinge assembly of the frame shown in FIG. 8.
Figure 11A:
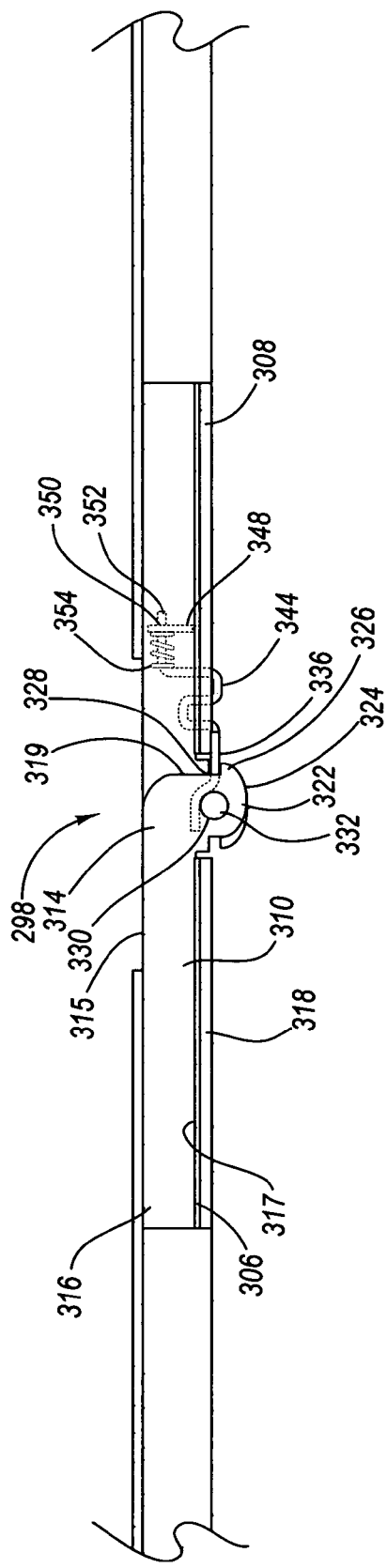
FIG. 11A is a side view of the hinge assembly shown in FIG. 10 in an unfolded position.
Figure 11B:
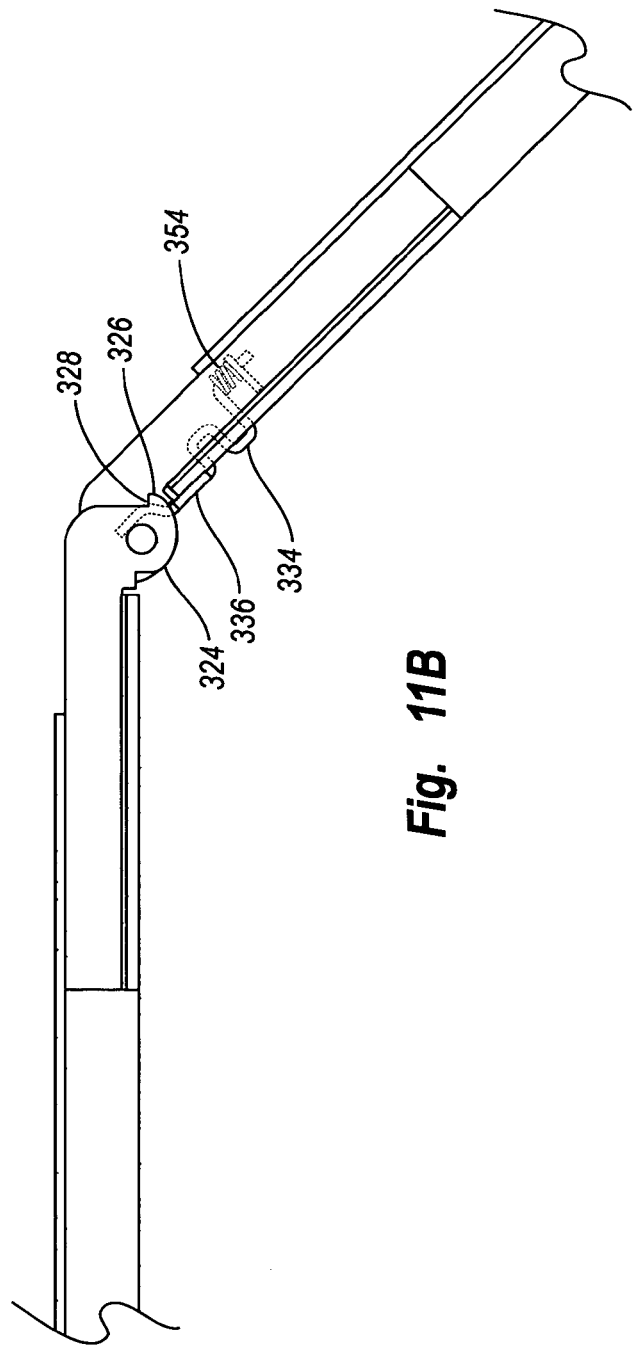
FIG. 11B is a side view of the hinge assembly shown in FIG. 11A in a partially folded position.

As discussed above with regard to FIG. 8, each side rail 34 also comprises a hinge assembly 298. Hinge assembly 298 comprises a first bracket 306 connected to the end of first rail portion 294 and a second bracket 308 connected to the end of second rail portion 296. Brackets 306 and 308 have substantially the same configurations. Specifically, as depicted in FIG. 10 second bracket 308 comprises an elongated first arm 310 and an elongated second arm 312 each comprised of a flat metal plate. Arms 310 and 312 are disposed in a spaced apart substantially parallel alignment. As depicted in FIGS. 11A and 11B, each arm 310 and 312 has an upper edge 315 and a lower edge 317 that each extend between a first end 314 and an opposing second end 316. First end 314 terminates at an end face 319. A flange 318 outwardly projects along a portion of lower edge 317 between opposing ends 314 and 316. Flange 318 is not required but increases the structural rigidity of arms 310, 312 so as to prevent unwanted bending or flexing of arms 310, 312.

As depicted in FIG. 8, a brace 320 extends between arms 310 and 312 along upper edges 315 at or toward first end 314. Brace 320 connects arms 310 and 312 together and further increases the structural integrity thereof. As will be discussed below in greater detail, a tab 348 projects from brace 320 between arms 310 and 312. Returning to FIGS. 11A and 11B, a hole 350 extends through tab 348. Furthermore, a latching head 322 downwardly projects from lower edge 317 at first end 314 of each arm 310 and 312. A hole 330 centrally extends through each latching head 322. Each latching head 322 terminates at a freely exposed, substantially semi-circular bearing surface 324. Latching head 322 includes a catch 326 that projects beyond end face 319 of each arm 310, 312. Catch 326 is configured so that an L-shaped notch 238 is formed at the intersection of latching head 322 and end face 319.

Depicted in FIG. 10, during assembly first bracket 306 and second bracket 308 are aligned end to end so that the latching heads 322 are overlapping and holes 330 extending through latching heads 322 are concentrically aligned. A pin 322 is then passed through each of holes 330 so as to hingedly connect brackets 306 and 308. Pin 322 can comprise a bolt, rivet, rod, or other conventional form of a pin. In the embodiment depicted, pin 322 comprises a rivet having opposing flared ends so as to retain the rivet in position. Second end 316 of arms 310 and 312 of first bracket 306 and second bracket 308 are mounted on opposing sides of first rail portion 294 and second rail portion 296, respectively. This mounting can be by welding, adhesive, crimping or various mechanical fasteners such as bolts, screws, or the like. In yet other embodiments, brackets 306 and 308 can be integrally formed with rail portions 294 and 296.

Hinge assemblies 298 enable table top 12 to be selectively moved between the folded and unfolded positions as previously discussed. Specifically, as a result of hinge assemblies 298, table top sections 256 and 258 can be independently rotated relative to the other so that table top sections 256 and 258 can be selectively moved between the folded and unfolded positions.

Depicted in FIGS. 10 and 11A, mounted to one of the hinge assemblies 298 is a latch 334. The latch 334 comprises a latch plate 336 having a front edge 338 and an opposing back edge 340. Latch plate 336 is slidably disposed on spaced apart flanges 318 of second bracket 308. An elongated finger 342 projects from front edge 338 of latch plate 336 and extends below pin 332. In part, finger 342 acts in conjunction with pin 332 to retain latch 334 connected to hinge assembly 298. Projecting from back edge 340 of latch plate 336 is a S-shaped handle 344. Handle 344 bounds a pocket 346 which enables an operator to easily manually engage handle 344. Handle 344 is disposed between arms 310 and 312 which function as guides for the latch 334. Finally, projecting from the end of handle 344 is a post 352. Post 352 extends through hole 350 in tab 348 of second bracket 308. A spring 354 encircles post 352 and is biased between tab 348 and handle 344.

In the above configuration, the latch 334 can be selectively moved between a retracted and advanced position. Specifically, by inserting a finger into pocket 346 of handle 344, an operator can manually pull pack handle 344, thereby compressing spring 354 and moving the latch 334 into the retracted position. When handle 344 is released, spring 354 resiliently biases the latch 334 back into the advanced position. In alternative embodiments, spring 354 can be replaced with other types of springs or other biasing members.

The latch 334 is used for rigidly locking together first table top section 256 and second table top section 258 when table 10 is in the unfolded position. Specifically, when table 10 is in the unfolded position, hinge assembly 298 is in the configuration shown in FIG. 11A. In this position, notch 328 which is formed on each latching heads 322 of bracket 306 is aligned with latch plate 336. Spring 354 thus biases latch plate 336 into each notch 328. In this position, the latch 334 prevents table 10 from being moved into the folded position. That is, attempts to move table 10 into the folded position is prevented as a result of catches 326 of latching heads 322 catching against latch plate 336. As a result, table 10 is selectively locked in the unfolded position. The latch 334 not only provides increased stability to table 10 during use but is also enable table 10 to be easily moved and manipulated while being retained in the unfolded position.

To move table 10 to the folded position, the latch 334 is moved to the retracted position, as discussed above and shown in FIG. 11B, thereby removing latch plate 336 from notches 328. In this position, table 10 can be moved to the folded position. It is noted that as soon as table 10 is at least partially folded, latch 334 can be released. Spring 354 now biases latch plate 336 against bearing surface 324. Due to the arched configuration of bearing surface 324, latch plate 336 freely slides along bearing surface 324 as table 10 is moved between the folded and unfolded positions. When table 10 is again moved to the fully unfolded position, latch plate 336 automatically snaps back into notches 328.

It is appreciated that hinge assemblies 298 can have a variety of different configurations. For example, in the depicted embodiment brackets 306 and 308 have substantially the same configuration for both hinge assemblies 298. This is done to facilitate ease in manufacturing and production of table 10. However, because latch 334 is only positioned on one of hinge assemblies 298, the other hinge assembly need not have the structural elements that are designed to engage with latch 334. For example, the latching heads 322 need not have the arched bearing surface 324 or catch 326. In an alternative embodiment, however, a latch 334 could be positioned on each hinge assembly 298. Furthermore, on the hinge assembly 298 having the latch 334, only the latching heads 322 on the bracket opposite of the latch 334 engage latch 324. As such, latching heads 322 on the bracket having latch 344 need not have the structural elements that are designed to engage with latch plate 336 of latch 334. In still other embodiments, it is appreciated that hinge assembly 298 can comprise only one latching head 322 against which the latch 334 locks.

In yet other embodiments, it is appreciated that latch 334 need not be spring biased. That is, the latch 334 can be designed to be manually moved between the latched and unlatched position. In this embodiment the latch 334 may not ride against bearing surface 324 of latching heads 322. As such, the perimeter surface of latching heads 322 can be any desired configuration. In addition, it is also appreciated that notch 328 need not be an L-shaped notch. In other embodiments, notch 328 can be U-shaped, V-shaped or have any other configuration in which latch plate 336 of latch 334 can be received. In this regard, it is appreciated that latch plate 336 can have a variety of different configurations that are designed to be received within notch 328.

In one embodiment of the present invention, means are provided for directly locking the hinge assembly when the table top 12 is in the unfolded position. One embodiment of such means comprises the latch 334. Alternative embodiments for such means includes the alternatives for latch 344 as discussed above.

As depicted in FIG. 7, table 10 also comprises a handle assembly 360 used in the handling and transport of table 10. Handle assembly 360 comprises a handle 362 having a bracket 364 mounted thereto. Handle 362 is depicted as comprising an oblong loop but can be any other desired configuration which can be easily grasped by a user. For example, rather than forming a loop, handle 362 can comprises a plate having a lip outwardly projecting therefrom.

Figure 6A:
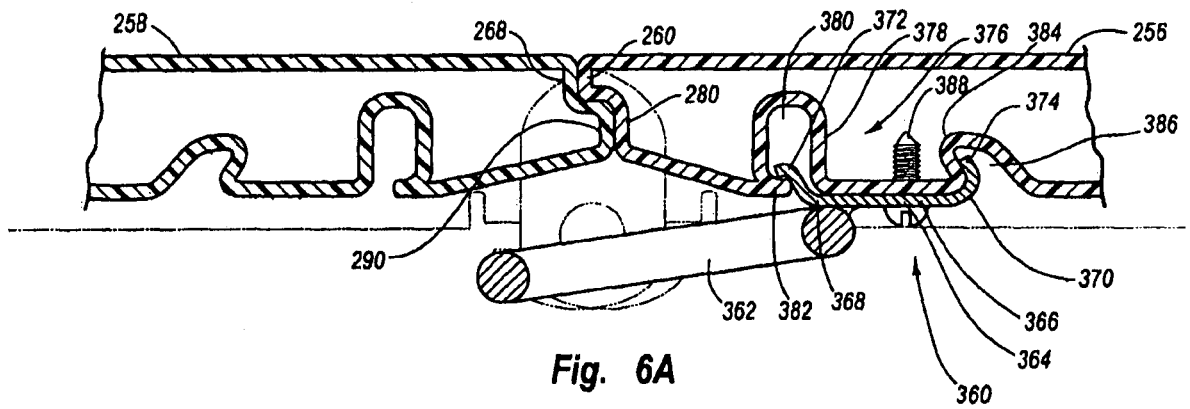
FIG. 6A is a cross-sectional side view of the central fold joint of the table top of the table shown in FIG. 1 with the table top being unfolded.

As depicted in FIG. 6A, bracket 364 comprises a base plate 366 having a forward end 368 and an opposing rearward end 370. A first flange 372 extends from along forward end 368. First flange 372 curves upward and forward. A Second flange 374 extends from along back edge 370. Second flange 374 curves upward and inward. A portion of bottom wall 252 of table 12 comprises a mounting portion 376 which engages with bracket 364. Mounting portion 376 is formed on bottom wall 252 of table top section 256 adjacent to inside edge 260. Specifically, mounting portion 376 has a first end 378 which is bounded by a first channel 380. A lip 382 projects into first channel 380 from a side opposite of mounting portion 376. Mounting portion 376 also has a rounded second end 384 bounded by a second channel 386.

During assembly, first flange 372 of bracket 364 is received within first channel 380 so that first flange 372 catches under lip 382. Second flange 374 is lipped around rounded second end 384 of mounting portion 376. A screw 388 is then screwed through base plate 366 of bracket 364 and into mounting portion 376, thereby securing bracket 364 to mounting portion 376 both by interlocking engagement and mechanical fastener. In alternative embodiments, screw 388 can be replaced with an adhesive or other type of fastener. Furthermore, mounting portion 376 can be eliminated and a substantially flat bracket 364 can simply be mounted to the bottom wall 252 of table top section 256 by one or more fasteners such as screws, bolts or the like.

Handle 362 is mounted to the forward end of base plate 366 such as by welding, fastener, or by being integrally formed with bracket 364. In yet other embodiments, handle 362 can be hingedly mounted to bracket 364. Handle 362 projects from bracket 364 at a slightly downward incline relative to a horizontally disposed upper surface 14 of table top 12. The angle is selected so as to ensure that handle 362 does not interfere with table top section 258 when table 10 is moved into the folded position. In an alternative embodiment, depending on the configuration of lower surface 16, handle 362 can also project in substantially parallel alignment with upper surface 14.

Figure 6B:
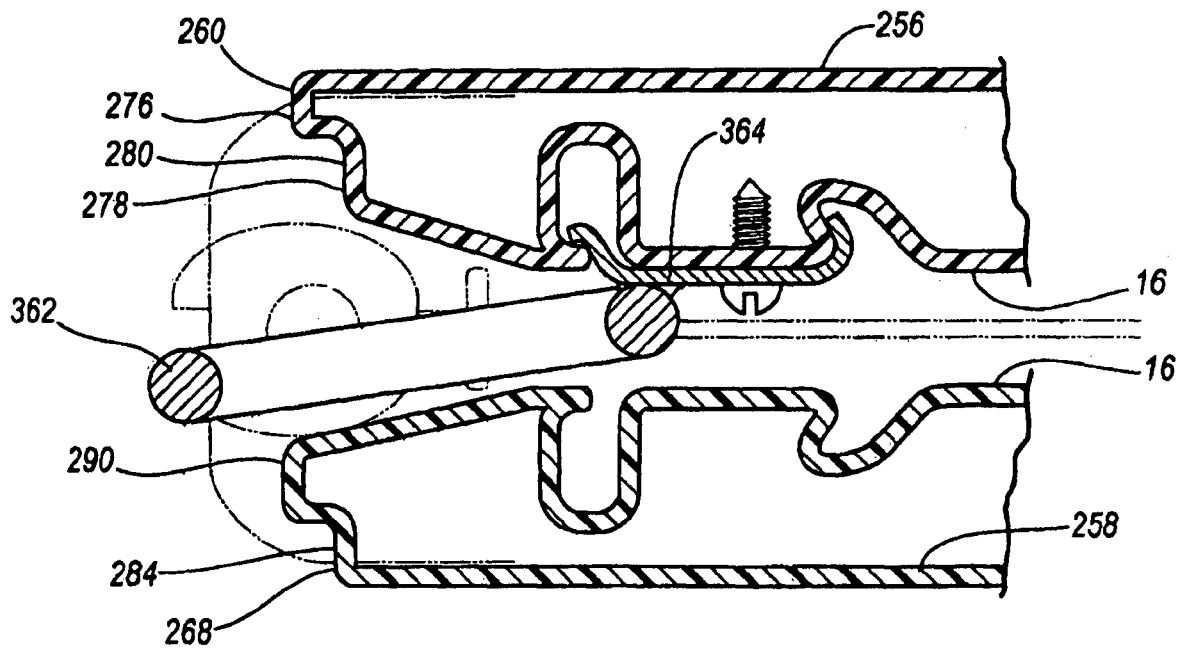
FIG. 6B is a cross-sectional side view of the central fold joint of the table top of the table shown in FIG. 1 with the table top being folded.
Figure 8:
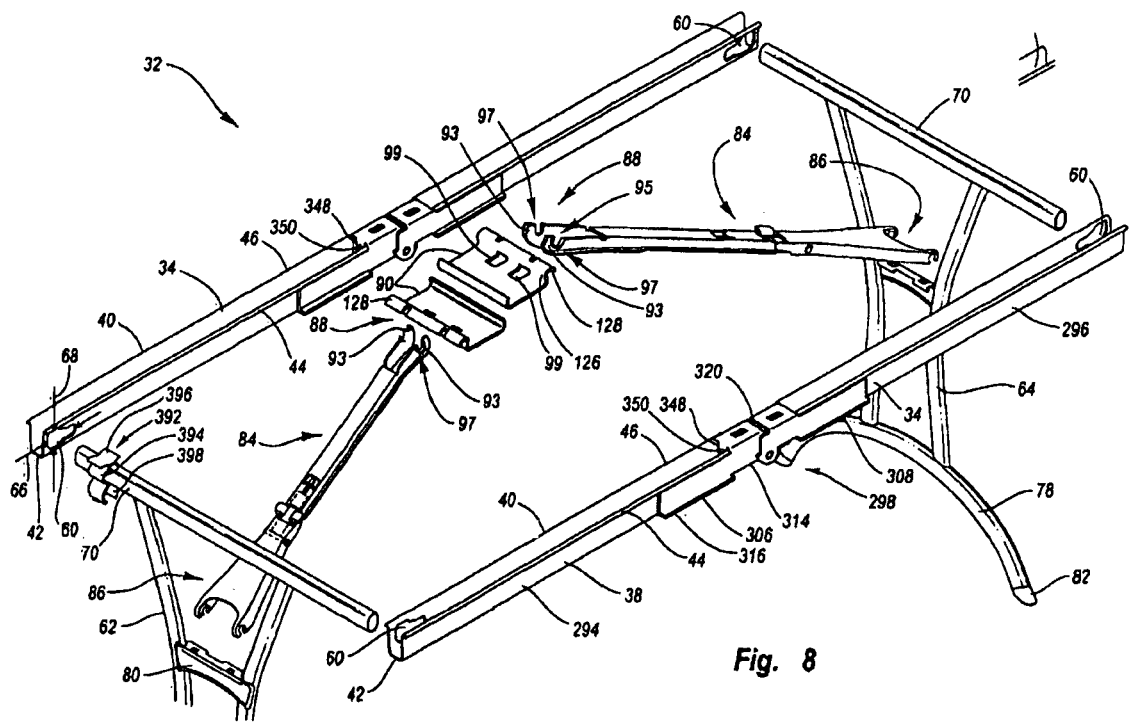

When table 12 is in the unfolded position (FIG. 6A), handle 362 projects from table top section 256 so as to extend below adjacent table top section 258. Accordingly, when table 10 is moved into the folded position as depicted in FIG. 6B, a portion of handle 362 freely projects beyond the inside edges 260 and 262 of table top sections 256 and 258. As a result, handle 362 can be easily grasped by a user without interference from the table top sections 256, 258. Although not required, it is also noted that the portion of lower surface 16 extending from inside edges 260, 262 toward bracket 364 of both table top sections 256, 258 is outwardly flared so as to further increase access to handle 362. Handle 362 makes it easy for an individual to grasp onto and transport table 10 when in the folded position. Furthermore, by placing handle 362 adjacent to the inside edges as opposed to one of the outside edges, it is not necessary to secure the table top sections 256, 258 together during use of the handle 362 since the table top sections 256, 258 are held together by gravity. In addition, handle 362 is out of the way and thus not obstructive when table 10 is in the unfolded position. In alternative embodiments, it is appreciated that handle 362 need not be positioned adjacent to one of inside edges 260 or 262. Rather, handle 362 can be mounted adjacent to any of the perimeter edges.

As depicted in FIG. 8, the side rails 34 of the frame 32 include openings 60 that are sized and configured to allow legs 62, 64 to be attached to the table 10. The legs 62, 64 are sized and configured to support the table top 12 above a surface such as a floor and the legs may be adjustable in length. The legs 62, 64 are preferably disposed between the side rails 34 of the frame and the openings 60 are preferably located near the ends of the side rails 34 in generally aligned pairs. It will be appreciated that the openings 60 could be positioned in any desired locations depending, for example, the configuration of the legs 62, 64 and/or the frame 32.

The openings 60 preferably have a non-circular configuration such as oval, oblong, egg-shaped, kidney-shaped, key-shaped, etc., which is sized and configured to receive a portion of the legs 62, 64. The openings 60 include a length 66 that is generally aligned with the longitudinal length of the side rails 34 and a height 68 that is generally aligned with the height of the side rails 34. It will be appreciated that one or more bushings, sleeves, bearings, and the like may be used in conjunction with openings 60 to facilitate the connection of the legs 62, 64 to the frame 32.

The legs 62, 64 can be selectively moved between a collapsed position (FIGS. 7 and 12) in which the legs are positioned near the table top 12 for storage and transport and an extended position (FIGS. 8 and 13) in which the legs extend away from the table top 12. Each leg 62, 64 includes a connecting rod 70 that is sized and configured to be inserted into the openings 60 in the side rails 34 of the frame 32. The rotation of the connecting rod 70 within the opening 60 allows the legs 62, 64 to move between the extended and collapsed positions relative to the table top 12.

As best seen in FIGS. 2A and 7, the lower surface 16 of the table top 12 includes receiving channels 72 that are sized and configured to receive at least a portion of the legs 62, 64 in the collapsed position. The receiving channels 72 advantageously receive at least a portion of the legs 62, 64 to decrease the height of the table 10 in the collapsed position. This allows more tables 10 to be stacked and stored in a limited amount of space, and this may facilitate shipping and transportation of the tables. As shown in the accompanying figures, one or more depressions 30 are preferably located in the receiving channels 72 so that the consistent pattern and arrangement of depressions is maintained. It will be appreciated, however, that depressions 30 do not have to be formed in the receiving channels 72 and receiving channels do not have to be formed in the table top 12.

Returning to FIG. 8, the connecting rod 70 preferably has a non-circular cross-sectional configuration and the openings 60 in the side rails 34 of the frame 32 also preferably have a non-circular configuration. For example, the openings 60 and the connecting rod 70 may have a configuration that is oval, oblong, egg-shaped, kidney-shaped, key-shaped, etc. Desirably, the non-circular opening 60 and the non-circular cross-sectional configuration of the connecting rod 70 are sized and configured such that the connecting rod 70 is not securely held within the openings 60 when the legs 62, 64 are in the collapsed position. Thus, in the collapsed position, one or more small gaps or spaces are located between connecting rod 70 and the opening 60 so that the connecting rod 70 can move slightly within the openings 60. Advantageously, this allows the legs 62, 64 to be more easily connected to the side rails 34 because of the larger clearance.

Additionally, because there is some movement or "play" between the legs 62, 64 and the side rails 34 when the legs 62, 64 are in the collapsed position, that may allow the legs 62, 64 to fold flatter such that the legs 62, 64 contact and/or are generally parallel to the lower surface 16 of the table top 12. Further, the movement of the legs 62, 64 within the openings 60 may allow the legs 62, 64 to be positioned in the desired collapsed position even if, for example, there is some slight imperfection in the table 10 or if a portion of the table 10 has expanded or contracted due to temperature. Accordingly, the tables 10 may be more easily manufactured and assembled because of the greater tolerances, and the tables 10 may fold flatter to facilitate stacking of the tables 10.

When the legs 62, 64 are in the extended position, however, the connecting rod 70 is preferably securely held within the openings 60 to rigidly and securely attach the legs 62, 64 to the table top 12. In particular, when the connecting rod 70 is rotated within the openings 60 to the extended position, the connecting rod 70 and openings 60 are sized and configured such that there is no or very little movement or play between the connecting rod 70 and the openings 60. Thus, the legs 62, 64 desirably do not shake or wobble in the extended position.

Figure 12:
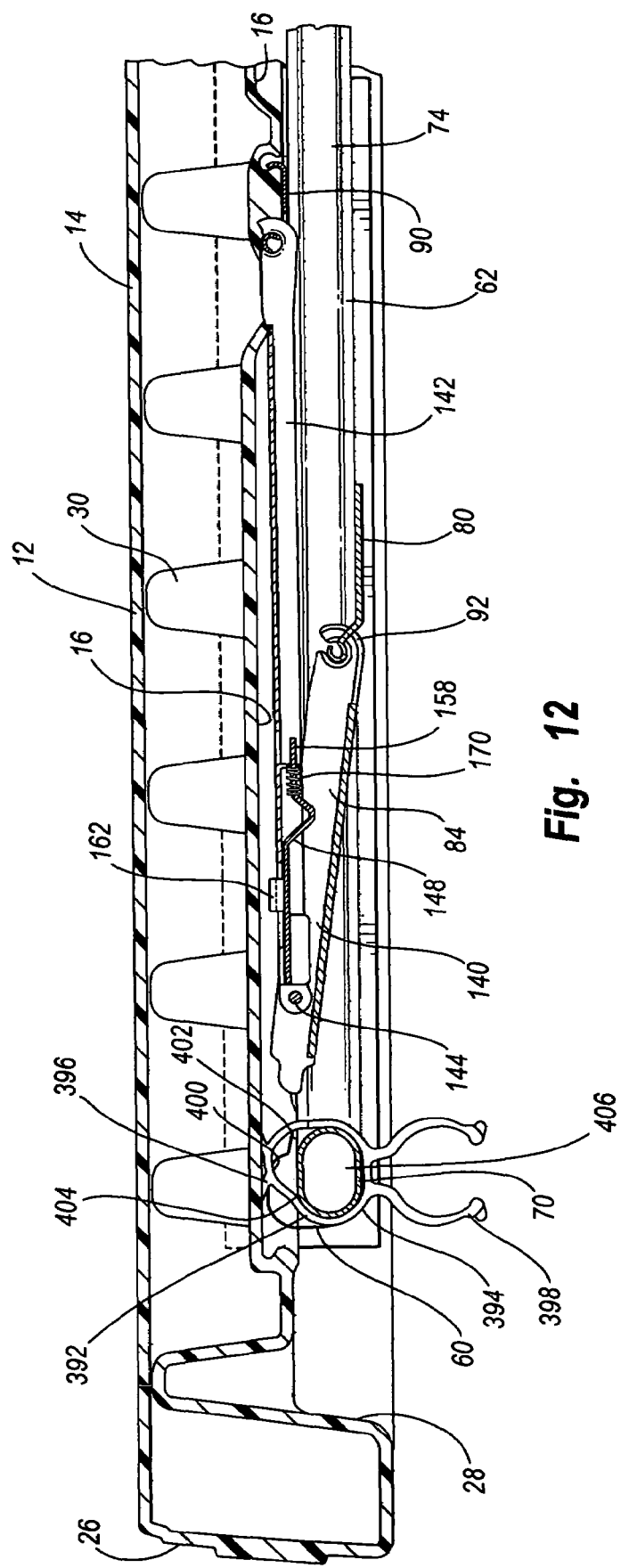
FIG. 12 is an enlarged, cross-sectional side view of a portion of the table shown in FIG. 1, illustrating the leg and the support brace in the collapsed position.
Figure 13:
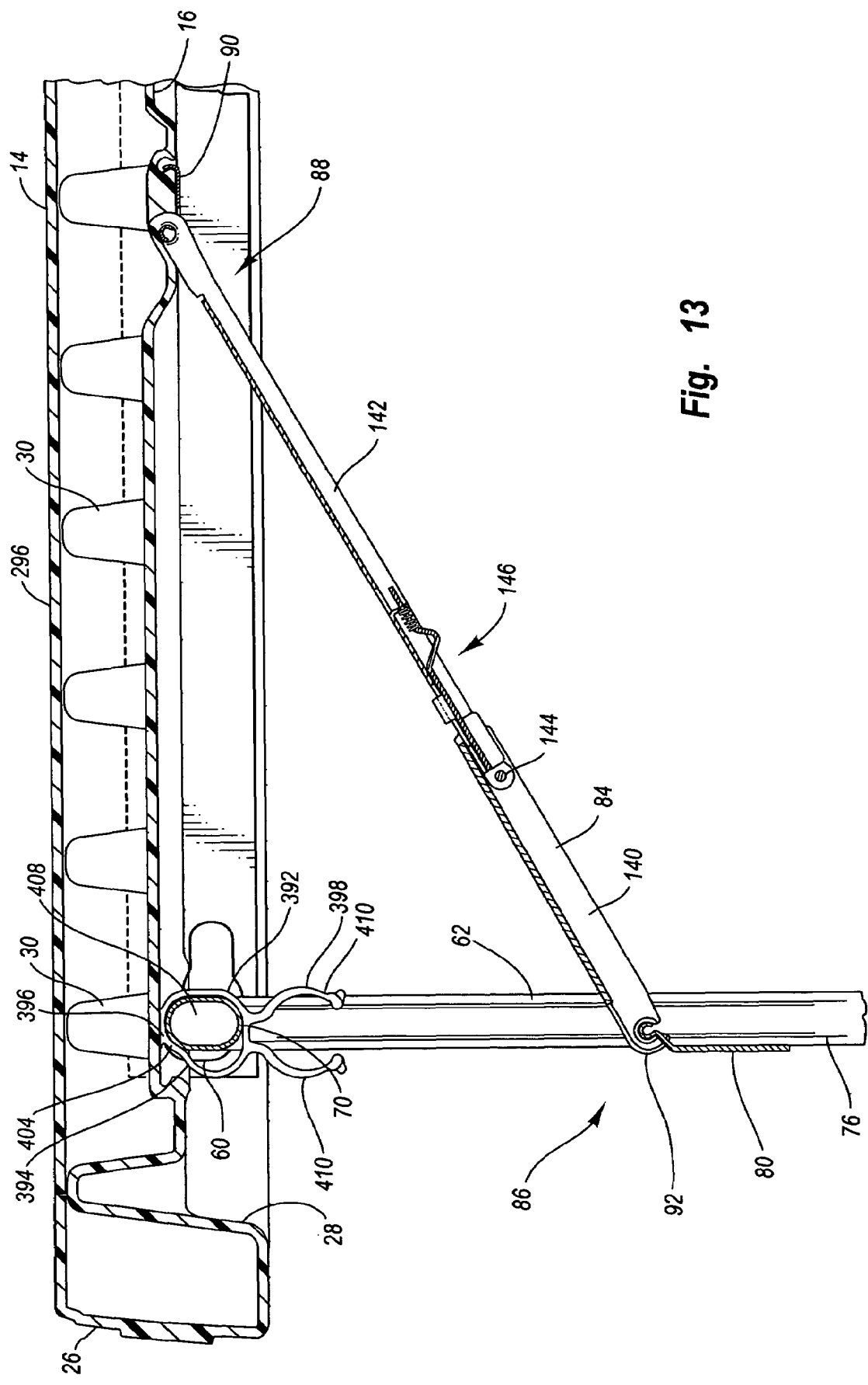
FIG. 13 is an exploded, cross-sectional side view of a portion of the table shown in FIG. 1, illustrating the leg and the support brace in the extended position.

For example, the openings 60 in the side rail 34 may have a height of about 0.94 ($^{15}/_{16}$) inches and an overall length of about 1.5 inches, and the connecting rod 70 may have an oval configuration with a height of about 0.94 ($^{15}/_{16}$) inches and a width of about 0.75 (¾) inches. Advantageously, these sizes and configurations allow the connecting rod 70 to be relatively easily inserted into the openings 60 and the connecting rod 70 can move slightly within the openings 60 when the legs 62, 64 are in the collapsed position. In particular, as perhaps best seen in FIG. 12, the connecting rod 70 can move within the opening 60 because there are gaps or spaces between the connecting rod 70 and the opening 60. On the other hand, when the legs 62, 64 are in the extended position, the connecting rod 70 is securely held within the opening 60. As shown in FIG. 13, the upper and lower ends of the connecting rod 70 engage the upper and lower portions of the opening 60 when the legs 62, 64 are in the extended position.

It will be appreciated that the openings 60 and connecting rod 70 can have other suitable sizes and configurations depending, for example, upon the size and/or intended use of the table 10. It will also be appreciated that other suitable combinations of the openings 60 and connecting rod 70 may be utilized, such as the combination of generally circular openings and non-circular connecting rods, or non-circular openings and generally circular connecting rods. Further, it will be appreciated that the legs 62, 64 may be attached to the frame 32 or table top 12 by other suitable types of devices and mechanisms.

Returning to FIG. 3, the legs 62, 64 are attached to or include the connecting rod 70. Legs 62, 64 further include a pair of elongated support members 74, 76 and a foot portion 78. Advantageously, the two separate elongated support members 74, 76 may help prevent twisting or torque on the connection of the support members 74, 76 to the connecting rod 70 and the foot portion 78. Additionally, while the elongated support members 74, 76 are preferably welded to the connecting rod 70 and the foot portion 78, the support members 74, 76 may be connected to the connecting rod 70 and foot portion 78 by any suitable method or device.

The elongated support members 74, 76 preferably have a generally curved configuration. In particular, the upper portions of the elongated support members 74, 76 are preferably spaced apart to provide a secure attachment of the support members 74, 76 to the connecting rod 70, the middle portions of the elongated support members 74, 76 are preferably more closely spaced together, and the lower portions of the elongated support members 74, 76 are spaced apart to provide a secure connection to the foot portion 78. The foot portion 78 preferably has an upwardly extending curved section and feet 82 may be connected to the ends of the foot portion. A connecting member 80 is preferably disposed near the middle portion of the elongated support members 74, 76 to help maintain the support members 74, 76 in the desired positions.

The connecting rod 70, elongated support members 74, 76 and foot portion 78 of the legs 62, 64 are desirably constructed from hollow metal tubes because the metal tubes are relatively lightweight and strong. The hollow metal tubes forming the connecting rod 70, elongated support members 74, 76 and foot portion 78 desirably have a generally oval configuration to provide increased strength. Advantageously, the oval configuration may also be used to create a thinner profile for the legs 62, 64, which may create a thinner profile for the table 10 when the legs 62, 64 are in the collapsed position.

It will be appreciated that the legs 62, 64 may be constructed from other materials with the suitable characteristics and the legs 62, 64 may have other shapes and configurations depending, for example, upon the intended use of the table 10. For example, the legs 62, 64 may include only a single elongated support member or multiple elongated support members, and the legs 62, 64 may be constructed as a single component or multiple components that are connected together. It will further be appreciated that the legs 62, 64 need not be in pivotal engagement with frame 32 or the table top 12 to be collapsible. For example, the legs 62, 64 may be detachably connected to the table top 12 such that when it is desired to collapse the table 10 for storage, the legs 62, 64 are detached from the table top 12. Other suitable embodiments for connecting legs 62, 64 to a table top 12 are disclosed in Assignee's U.S. patent application Ser. No. 10/408,917, file Apr. 8, 2003 entitled Pivotal Connection of a Table Leg to a Frame, which is hereby incorporated by reference in its entirety.

Depicted in FIG. 8, support brace 84 is used to support each leg 62, 64 in the extended position. Each support brace 84 includes a first end 86 that is attached to a corresponding leg 62, 64 and a second end 88 that is attached to the table top 12 by a mounting member or bracket 90. Each support brace 84 is preferably pivotally connected to the corresponding leg 62, 64 and the bracket 90 to allow the leg 62, 64 to be moved between the extended and collapsed positions. It will be appreciated that while the legs 62, 64 are in the extended or collapsed positions, the support braces 84 are also in a corresponding extended or collapsed position. Advantageously, the support braces 84 can be connected to the legs 62, 64 and the brackets 90 without the use of mechanical fasteners such as screws, rivets or bolts. Significantly, the table 10 may be built more quickly because fewer components may be required to assemble the table 10 and no mechanical fasteners are needed to attach the support braces 84 to the legs 62, 64 or the table top 12. It will be appreciated, however, that one or more mechanical fasteners may be used to connect the support braces 84 to the legs 62, 64 and/or the table top 12.

Figure 15:
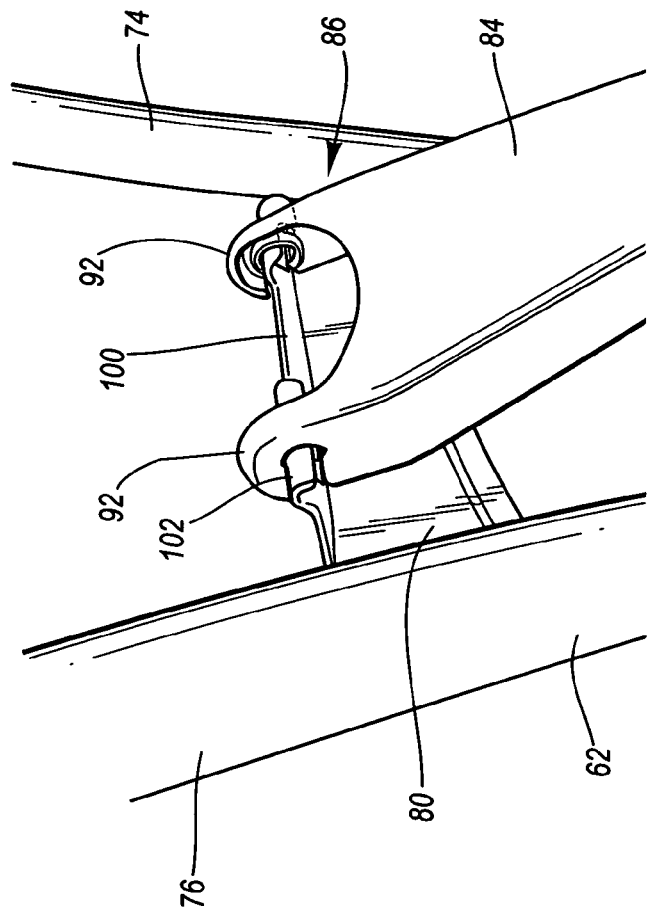
FIG. 15 is an enlarged, exploded top perspective view of a portion of the table shown in FIG. 1, illustrating the connection of the support brace to the leg.
Figure 14:
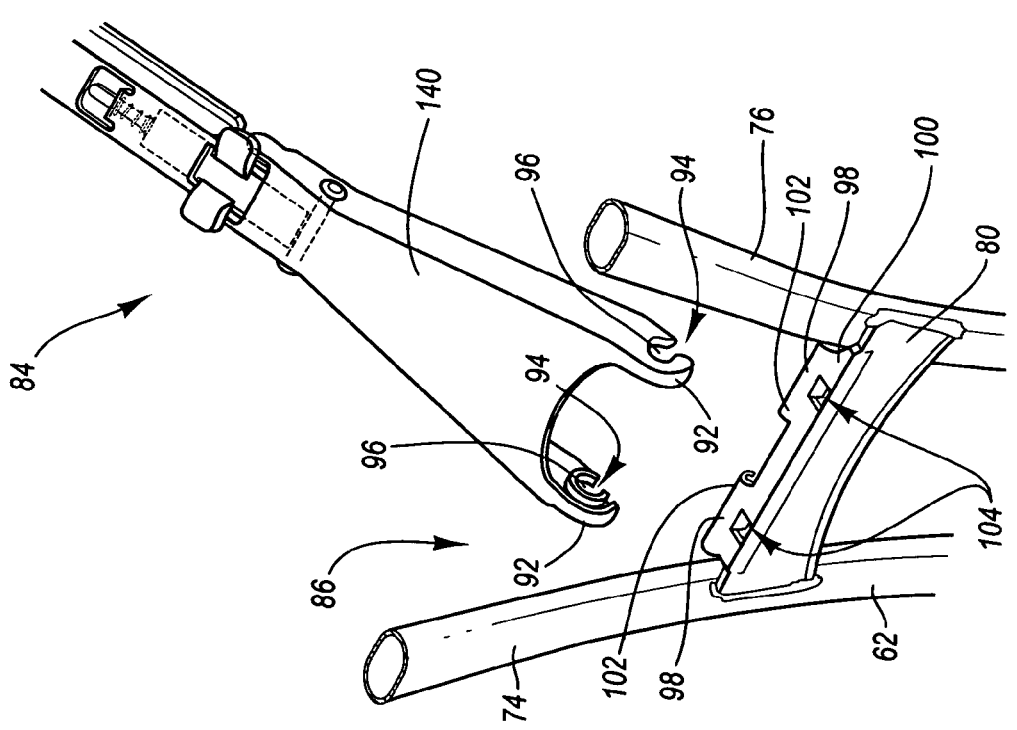
FIG. 14 is an enlarged, exploded top perspective view of a portion of the table shown in FIG. 1, illustrating a portion of the leg and a portion of the support brace.
Figure 16:
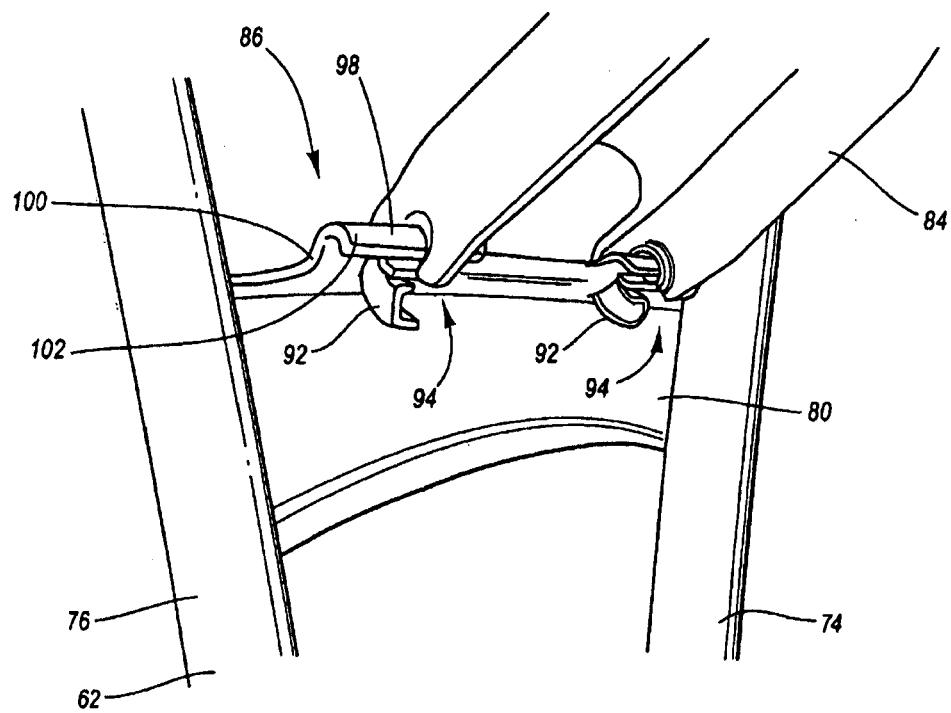
FIG. 16 is an enlarged, exploded bottom perspective view of a portion of the table shown in FIG. 1, illustrating the connection of the support brace to the leg.
Figure 23:
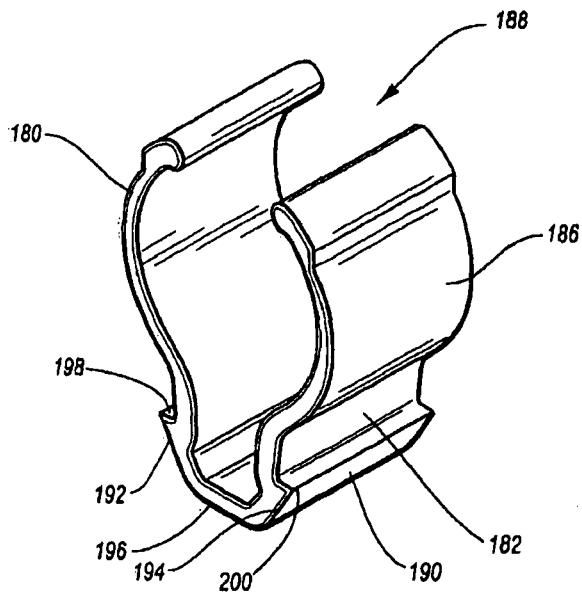
Figure 25:
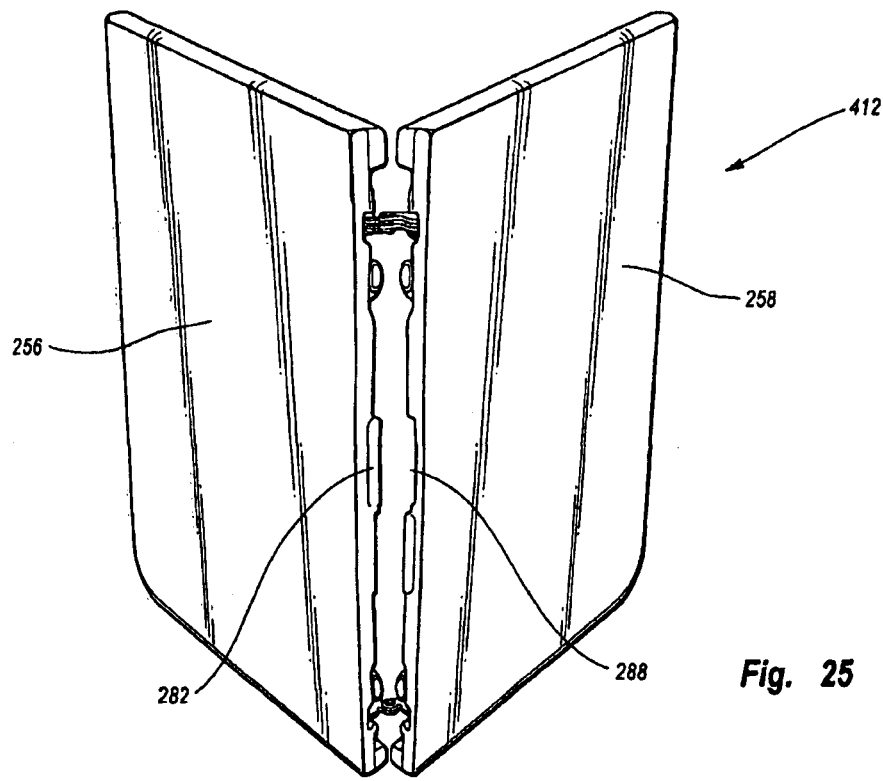

In greater detail, as best seen in FIGS. 14-16, the first end 86 of each support brace 84 includes two curved arms 92 and each curved arm has an opening 94 that leads to a generally circular interior portion 96. The two generally circular interior portions 96 are generally aligned along the same axis and disposed at the end 86 of the support brace 84. The generally circular interior portions 96 are sized and configured to receive corresponding receiving portions 98 formed in the connecting member 80. In particular, the receiving portions 98 include a flange 100 with rounded ends 102 and corresponding openings 104. The support braces 84 are connected to the leg 62, 64 by disposing the rounded ends 102 of the flange 100 within the generally circular interior portions 96 of the curved arms 92. In addition, the curved arms 92 of the support braces 84 are disposed within the openings 104 in the connecting member 80. Advantageously, when the support braces 0.84 are connected to the legs 62, 64 and the table top 12, the support braces 84 cannot be inadvertently disconnected from the legs 62, 64. While this connection of the support braces 84 to the leg 62, 64 does not require that use of any mechanical fasteners, it will be appreciated that mechanical fasteners may be used to connect the support braces 84 to the legs 62, 64.

In order to attach the support braces 84 to the legs 62, 64, the two generally circular interior portions 96 of the curved arms 92 are coaxially aligned with the rounded ends 102 of the flange 100. The rounded ends 102 of the flange 100 are then inserted into the generally circular interior portions 96 of the support braces 84 and the arms 92 are inserted into the openings 104 in the flange. Significantly, when the second end 88 of the support braces 84 are attached to the table top 12, the first end 86 of the support braces 84 cannot be disconnected from the leg 62, 64. This helps create a strong and secure table 10 because the support braces 84 cannot be unintentionally disconnected from legs 62, 64 when the table 10 is assembled. However, when the second end 88 of the support braces 84 is disconnected from the table 10, then the first end 86 of the support braces 84 can be disconnected from the leg 62, 64. This allows the table 10 to be quickly and easily assembled, and it allows the table to be quickly and easily disassembled.

The brackets 90 (FIG. 7) are connected to the lower surface 16 of the table top 12 by bracket mounting portions 110 (FIG. 2A) that allow the brackets 90 to be connected to the table top 12 by a snap, friction or interference fit. Advantageously, the connection of the brackets 90 to the table top 12 does not require the use of mechanical fasteners such as bolts or screws, which desirably expedites the manufacturing or assembly process, but fasteners may be used if desired. Additionally, because screws, bolts or other types of mechanical fasteners are not required to attach the brackets 90 to the table top 12, no holes or other types of stress concentrations are formed in the table top. Thus, the strength and structural integrity of the table top 12 is not diminished by drilling or forming holes in the table top 12. In addition, because the brackets 90 are preferably not glued to the lower surface 16 of table top 12, the table top 12 is not weakened or damaged by adhesive. Thus, strength and integrity of the table top 12 may be retained because the brackets 90 are not screwed, bolted or bonded to bottom surface 16 of the table top 12. Further, the connection of the brackets 90 to the table top 12 without using mechanical fasteners or adhesives may facilitate assembly of the table 10 by the retailer or consumer.

The bracket mounting portions 110 are sized and configured to retain the brackets 90 in generally fixed positions and to prevent the unintended removal of the brackets from the table top 12. Advantageously, the brackets 90 engage a relatively large portion of the table top 12 so that forces applied to the brackets 90 are distributed over a large area. This provides an improved and more secure connection of the brackets 90 to the table top 12 because forces are distributed over a much larger area than brackets 90 attached to a table top only by mechanical fasteners. Additionally, the connection of the brackets 90 to the table top 12 by the bracket mounting portions 110 may be less likely to fail than conventional brackets attached to a table top by mechanical fasteners because of the larger engagement area.

As best seen in FIG. 17, the bracket 90 includes a main body portion 112 with a first end 114 and a second end 116. The first end 114 of the bracket 90 includes an engaging portion 118 with a rounded flange 120 and an edge 122. The second end 116 of the bracket 90 includes a retaining portion 124 with a first angled portion 126 and a second angled portion 128. The first angled portion 126 is preferably disposed at an angle less than about 90° with respect to the main body portion 112 of the bracket 90 so that it is angled towards the first end 114 of the bracket 90. As discussed below, the engaging portion 118 and the retaining portion 124 are sized and configured to securely attach the bracket 90 to bracket mounting portion 110 by a snap, friction or interference fit. Additionally, the bracket 90 is preferably directly attached to the table top 12 because the bracket mounting portions 110 are desirably integrally formed in the table top 12 as part of a unitary, one-piece structure. It will be appreciated, however, that the bracket 90 does not have to be directly attached to the table top 12 and the bracket does not have to be attached to the table top 12 by the bracket mounting portions 10.

The bracket mounting portion 110 includes a first recess 130 and a second recess 132 that are sized and configured to receive the first end 114 and the second end 116 of the bracket 90, respectively. In particular, the first recess 130 is disposed towards the middle of the table top 12 and the first recess 130 preferably has a length that is approximately the same as the length of the first end 114 of the bracket 90. A protrusion or lip 134 projects into an upper portion of the first recess 130 and it is sized and configured to fit within the inner portion of the rounded flange 120 on the first end 114 of the bracket 90. The second recess 132 is disposed towards the end of the table top 12 and it has a length that is approximately the same as the length of the second end 116 of the bracket 90. A protrusion or lip 136 extends into an upper portion of the second recess 132 and it is sized and configured to contact or abut at least a portion of the first downwardly extending portion 126 on the second end 116 of the bracket 90. The distance from the first edge 122 on the first end 114 of the bracket 90 to the innermost part of the first downwardly extending portion 126 on the second end 116 of the bracket 90 is preferably smaller than the distance from the protrusion 134 extending into the first recess 130 to the protrusion 136 extending into the second recess 132 of the bracket mounting portion 110. This allows the bracket 90 to be connected to the bracket mounting portion 110 by a snap, friction or interference fit.

In order to connect the bracket 90 to the table top 12, the engaging portion 118 on the first end 114 of the bracket 90 is inserted into the first recess 130 of the bracket mounting portion 110 such that the rounded flange 120 and the edge 122 engage a portion of the table top 12. In particular, the edge 122 preferably engages a portion of the first recess 130 and/or the protrusion 134 and the rounded flange 120 contacts or abuts at least a portion of the protrusion. The second end 116 of the bracket 90 is then inserted into the second recess 132 of the bracket mounting portion 110. As the retaining portion 124 on the second end 116 of the bracket 90 is inserted into the second recess 132, the first angled portion 126 and/or the protrusion 136 deflects or deforms to allow the second end of the bracket to be inserted into the second recess 132. Once the second end 116 of the bracket 90 is inserted into the second recess 132, the first angled portion 126 and/or the protrusion 136 resiliently or elastically returns to there original positions to secure the second end of the bracket 90 in a fixed position. Accordingly, the bracket 90 is preferably connected to the bracket mounting portion 110 of the table top 12 by a snap, friction or interference fit, and this allows the bracket 90 to be securely connected to the table top 12 without the use of fasteners. It will be appreciated, however, that fasteners or adhesives could also be used to secure the bracket 90 to the table top 12 if desired.

The rounded flange 120 on the first end 114 of the bracket 90 preferably has a radius of curvature that generally corresponds to the radius of curvature of the protrusion 134 to help secure the bracket 90 to the bracket mounting portion 110. Similarly, the first angled portion 126 on the second end 116 of the bracket 90 preferably has a radius of curvature that generally corresponds to the radius of curvature of the protrusion 136. This provides a large contact area between the bracket 90 and the bracket mounting portion 110. Additionally, the edge 122 on the first end 114 of the bracket 90 is preferably sharp so that it engages and bites into the softer, blow-molded plastic material of the table top 12 to allow the bracket 90 to be securely connected to the table top. Significantly, the engagement of the first end 114 and the second end 116 of the bracket 90 to the first recess 130 and the second recess 132 of the bracket mounting member 110, respectively, provides a large contact area that allows forces or loads on bracket to be distributed over a large area, which helps provide a secure and durable connection of the support brace 84 to the table top 12.

As seen in FIG. 2A, the bracket mounting portions 110 are formed in the lower surface 16 of the table top 12 and one or more depressions 30 may be formed in the bracket mounting portions 110 so that a generally consistent, uniform pattern of depressions is formed in the table top 12. Significantly, all or only a portion of the depressions 30 may be formed in the bracket mounting portions 110 in order to maintain the generally uniform pattern of depressions. Advantageously, the uniform pattern of depressions 30 may help create a table top 12 with increased strength, structural integrity and generally uniform characteristics. One skilled in the art will appreciate that the depressions 30 could have other suitable arrangements and depressions do not have to be formed in the bracket mounting portions 110.

As discussed above, the second end 88 of each support brace 84 is connected to a corresponding bracket 90. As best seen in FIGS. 8 and 17, the second end 88 of each support brace 84 includes two curved arms 93 and each curved arm 93 has an opening 95 that leads to a generally circular interior portion 97. The two generally circular interior portions 97 are generally aligned along the same axis and disposed near the end of the support braces 84. The generally circular interior portions 97 are sized and configured to be connected to the second end 116 of the brackets 90. In particular, the generally circular interior portions 97 are sized and configured to receive a portion of the first angled portion 126 and the second angled portion 128 of the brackets 90. In addition, the curved arms 93 of the support braces 84 are configured to be disposed within openings 99 in the second end 116 of the brackets 90. Advantageously, when the support braces 84 are connected to the legs 62, 64 and the table top 12, the support braces 84 cannot be inadvertently disconnected from the brackets 90. While this connection of the support braces 84 to the brackets 90 does not require that use of any mechanical fasteners, it will be appreciated that mechanical fasteners may be used to connect the support braces 84 to the brackets 90.

In order to attach the support braces 84 to the brackets 90, the two generally circular interior portions 97 of the curved arms 93 are coaxially aligned with the first angled portion 126 and the second angled portion 128 on the second end 116 of the brackets 90. The first angled portion 126 and the second angled portion 128 are then inserted into the generally circular interior portions 97 of the support brace 84 and the curved arms 93 are inserted into the openings 99 in the second end 116 of the brackets 90. Significantly, when the support braces 84 are connected to the brackets 90 and the brackets 90 is connected to the table top 12, the support braces 84 cannot be disconnected from the brackets 90. This helps create a strong and secure table 10 because the support braces 84 cannot be unintentionally disconnected from brackets 90 when the table 12 is assembled. However, when the brackets 90 are disconnected from the table top 12, then the second end 88 of the support braces 84 can be disconnected from the bracket 90. This allows the table 10 to be quickly and easily assembled and disassembled.

As discussed above, the first end 86 of the support braces 84 may be pivotally connected to the legs 62, 64 and the second end 88 of the support braces 84 may be pivotally connected to the brackets 90. One skilled in the art, however, will appreciate that the ends 86, 88 of the support braces 84 do not have to be pivotally connected to the legs 62, 64 or the brackets 90. Other suitable embodiments for connecting the support braces to the legs and/or the table top are disclosed in Assignee's U.S. patent application Ser. No. 10/409,469, filed Apr. 8, 2003 entitled Pivotal Connection of a Support Brace to a Table Leg and Table Top, which is hereby incorporated by reference in its entirety.

As best seen in FIGS. 19-21, each support brace 84 includes a first arm 140 that is pivotally connected to a second arm 142 by a pin 144. The pivotal connection of the first and second arms 140, 142 allows each support brace 84 to move between the extended position and the collapsed position. When each support brace 84 is in the collapsed position, the legs 62, 64 are also in the collapsed position. Similarly, when each support brace 84 is in the extended position, the legs 62, 64 are also in the extended position. While the support braces 84 preferably pivot to allow the legs 62, 64 to be moved between the extended position and the collapsed position, it will be understood that the support braces 84 do not require the pivotal connection of the first arm 140 and the second arm 142, and the support braces 84 could have other suitable arrangements and/or configurations.

A locking mechanism 146 is preferably used to secure each support brace 84 in the extended position, which consequently also secures the legs 62, 64 in the extended position. Advantageously, the locking mechanism 146 can secure the legs 62, 64 in the extended position regardless of the position or orientation of the table 10. Thus, the legs 62, 64 will not move from the extended position to the collapsed position even if the table 10 is turned on its side or upside-down. In addition, the locking mechanism 146 is preferably biased to remain in the locked position and the locking mechanism positively locks the support braces 84 and the legs 62, 64 in the extended position. Further, the locking mechanism 140 preferably requires the user to intentionally unlock the mechanism to allow the support brace 84 and the legs 62, 64 to move into the collapsed position. Thus, the support brace 84 and the legs 62, 64 can be positively held in the extended position by the locking mechanism 146.

As seen in FIGS. 19-21, the locking mechanism 146 includes an elongated body 148 that is generally sized and configured to fit within the second arm 142 of the corresponding support brace 84. In particular, the second arm 142 of the support brace 84 has a generally U-shaped configuration with two opposing sidewalls 150, 152 and the elongated body 148 of the locking mechanism 146 is generally disposed between the sidewalls and towards the end of the second arm nearest the first arm 140. The elongated body 148 of the locking mechanism 146 includes a first end 154 that is sized and configured to engage the pin 144 and a second end 156 with an elongated extension 158. Two outwardly extending tabs or flanges 160, 162 are disposed between the ends 154, 156 of the locking mechanism 146 and the tabs extend through an opening 164 in the second arm 142 of the support brace 84. The elongated extension 158 on the second end 156 of the locking mechanism 146 extends through an opening 166 in a flange 168 extending from the second arm 142 of the support brace 84. A biasing member such as a spring 170 is disposed about the elongated extension 158 and the biasing member is positioned between the flange 168 and the elongated body 148 of the locking mechanism 146.

The locking mechanism 146 is movable relative to the second arm 142 between a locked position in which the elongated body 148 is disposed proximate the end of the second arm nearest the first arm 140, and an unlocked position in which the elongated body 148 is disposed inwardly from the end of the second arm and away from the first arm. The spring 170 is desirably sized and configured to bias the locking mechanism 146 into the locked position. In this locked position, the first end 154 of the elongated body 148 contacts the pin 144 and the outwardly extending tabs 160, 162 are disposed towards the end of the second arm 142 of the support brace 84. In the unlocked position, the first end 154 of the elongated body 148 is spaced apart from the pin 144 and the outwardly extending tabs 160, 162 are spaced away from the end of the second arm 142 of the support brace 84. One skilled in the art will appreciate that other suitable types of biasing mechanisms may be used to bias the locking mechanism 146 into the locked position.

The first and second arms 140, 142 of the support brace 84 are generally aligned and at least a portion of the arms overlap when the support brace 84 is in the extended position. In particular, the first arm 140 of the support brace 84 includes two extensions 172, 174 and the extensions are generally parallel to and overlap portions of the sidewalls 150, 152 of the second arm 142 when the support brace 84 is in the extended position. When the locking mechanism 146 is in the locked position, the locking mechanism maintains the extensions 172, 174 in the generally parallel and overlapping position with the sidewalls 150, 152 of the second arm 142. Specifically, the outwardly extending tabs 160, 162 engage the extensions 172, 174 to prevent the first arm 140 from moving relative to the second arm 142. Thus, the outwardly extending tabs 160, 162 prevent the first arm 140 from pivoting relative to the second arm 142, and that maintains the support braces 84 and the legs 62, 64 in the extended position.

On the other hand, when the support braces 84 are in the collapsed position, the extensions 172, 174 do not overlap portions of the sidewalls 150, 152 of the second arm 142 of the support braces 84. In contrast, as best seen in FIG. 12, the extensions 172, 174 are spaced away from the second arm 142 of the support brace 84 and at least a portion of the second arm may be disposed inside the body of the first arm 140 to form a small, compact arrangement. Advantageously, the support brace 84 does not significantly protrude from the lower surface 16 of the table top 12 in the collapsed position. This allows a table 10 with a relatively small height when the legs 62, 64 are in the collapsed position to be constructed, if desired.

When the locking mechanism 146 is in the unlocked position, the locking mechanism 146 does not secure the support brace 84 in the extended position. In contrast, the locking mechanism 146 allows the first and second arms 140, 142 of the support brace 84 to freely move with respect to each other. In particular, as shown in FIG. 21, when the user moves the locking mechanism 146 into the unlocked position, the outwardly extending tabs 160, 162 no longer engage the extensions 172, 174 and that allows the first and second arms 140, 142 of the support brace 84 to freely rotate. Desirably, when the user releases the locking mechanism 146, the spring 170 causes the locking mechanism 146 to return to its locked position.

As best seen in FIGS. 12, 20 and 121, the extensions 172, 174 have a curved front surface 176 and a generally straight rear surface 178 to positively secure the locking mechanism 146 in the locked position, and to allow the support brace 84 to be moved from the collapsed position to the extended position without the user unlocking the locking mechanism 146. In particular, the curved front surfaces 176 of the extensions 172, 174 are sized and configured to engage the outwardly extending tabs 160, 162 of the locking mechanism 146 when the support brace 84 is moved from the collapsed position to the extended position. Specifically, the curved front surfaces 176 engage the outwardly extending tabs 160, 162 and push the locking mechanism 146 into the unlocked position. When the support brace 84 is in the extended position and the first and second arms 140, 142 are generally aligned, the curved front surface 176 of the extensions 172, 174 no longer engage the tabs 160, 162 and the spring 170 returns the locking mechanism 146 to the locked position. Thus, the locking mechanism 146 allows the support brace 84 to be moved from the collapsed position to the extended position without requiring the user to unlock the locking mechanism.

The generally straight rear surfaces 178 of the extensions 172, 174 prevent the locking mechanism 146 from being inadvertently unlocked and allowing the support braces 84 to move from the extended position to the collapsed position. In particular, the generally straight rear surfaces 178 of the extensions 172, 174 engage the generally planar lower surfaces of the tabs 160, 162, and this engagement of the extensions and tabs prevents the support braces 84 from moving from the extended position to the collapsed position. In order to allow the support braces 84 to move from the extended position to the collapsed position, the user must intentionally unlock the locking mechanism 146, and this allows the support braces and the legs 62, 64 to be collapsed.

Significantly, the locking mechanism 146 is lightweight and includes few moving parts. In particular, the locking mechanism 146 is preferably constructed from metal and it can be stamped or formed into the desired configuration. Additionally, the second arm 140 is preferably constructed from metal and the opening 164, opening 166 and flange 168 can be stamped or formed into the desired configuration. While the first arm 140, second arm 142 and the locking mechanism 146 are preferably unitary components, it will be appreciated that these components may be constructed from multiple parts that are connected together. Further, these components may have other suitable configurations and arrangements depending, for example, upon the size and/or intended use of the table 10.

In operation of the locking mechanism 146, when the second arm 142 is in the collapsed position and being rotated into the extended position, the curved front surfaces 176 of the extensions 172, 174 engage the outwardly extending tabs 160, 162. The rotation of the second arm 142 relative to the first arm 140 causes the extensions 172, 174 to push the outwardly extending tabs 160, 162 and the locking member 146 into the unlocked position. When the support braces 84 are in the extended position, the extensions 172, 174 no longer engage the outwardly extending tabs 160, 162 and the spring 170 forces the locking member 146 into the locked position. Alternatively, instead of the extensions 172, 174 moving the locking mechanism 146 into the unlocked position while the support braces 84 are being moved from the collapsed position to the extended position, the user may manually move the locking mechanism into the unlocked position. In order to move the support braces 84 and legs 62, 64 from the extended position to the collapsed position, the user slides the locking mechanism 146 into the unlocked position, as shown in FIG. 21, which allows the second arm 142 to rotate relative to the first arm 140. Once the arms 140, 142 are not longer in the extended position, the user can release the locking mechanism 146 and position the legs 62, 64 in the collapsed position. Other suitable types of locking mechanisms for retaining table legs in an extended position are disclosed in Assignee's U.S. patent application Ser. No. 10/408,949, filed Apr. 8, 2003 entitled Table Leg Locking Mechanism, which is hereby incorporated by reference in its entirety.

As depicted in FIG. 8, a retainer 392 is used to help secure table 10 in the folded position. Retainer 392 is mounted to one of connecting rods 70. Specifically, retainer 392 comprises a tubular body 394 having a flange 396 mounted on one side and a clip 398 mounted on a side opposing the flange 396. As depicted in FIG. 12, body 394 has an interior surface 400 that bounds an opening 402. Connecting rod 70 extends through opening 402 such that flange 396 is disposed adjacent to or against lower surface 16 of table top 12. In the embodiment depicted, flange 396 has a substantially flat plate-like configuration. Flange 396 is configured such that forces tending to rotate retainer 392 about connecting rod 70 are countered by flange 396 biasing against lower surface 16 of table top 12. As such, flange 396 assists in preventing rotation of retainer 392 about connecting rod 70.

As illustrated, opening 402 is larger than the transverse cross section of connecting rod 70. Furthermore, opening 402 is not round but is rather non-symmetrical. Opening 402 has a configuration that allows connecting rod 70 to selectively rotate within opening 402 yet retain flange 396 adjacent to lower surface 16 of table top 12. More specifically, opening 402 of body 394 has a generally L-shaped configuration which includes a horizontal channel 406 (FIG. 12) and a vertical channel 408 (FIG. 12) which have a common overlapping section. Channels 406 and 408 each have a transverse cross section that is substantially complementary to the transverse cross section of connecting rod 70. An inside corner 404 of body 402 partially separates channels 406 and 408.

As previously discussed, in the embodiment depicted each connecting rod 70 has a substantially elliptical transverse cross sectional configuration. When legs 62, 64 are in the collapsed position as shown in FIG. 12, connecting rod 70 is horizontally disposed within horizontal channel 406. Although a gap is formed between connecting rod 70 and the upper end of body 402, inside corner 404 holds retainer 392 relatively stationary relative to connecting rod 70 so that flange 396 is retained adjacent to lower surface 16 of table top 12. As legs 62, 64 are rotated to the extended position, connecting rod 70 rotates into vertical channel 408 (FIG. 13). Retainer 392 is comprised of a resiliently deformable material, such as plastic. As such, inside corner 404 flexes outward and then resiliently rebounds as legs 62, 64 are moved between the extended and collapsed positions. Again, during rotation of connection rod 70, flange 396 biases against table top 12 to prevent rotation of retainer 392.

When table top 12 is moved into the folded position, the other connection rod 70 not disposed within body 394 is snap fit into clip 398. That is, clip 398 comprises a pair of resiliently deformable rounded arms 410 that project from body 394. Arms 410 bound a gap between the free ends thereof. As retention rod 70 is advanced into the gap so as to bias against arms 410, arms 410 flex outwardly and then resiliently snap fit around retention rod 70, thereby releasably engaging with the retention rod 70.

It is appreciated that one or more retainers 392 can be used. Because retainer 392 is prevented from rotating, retainer 392 is always properly aligned for engagement with the other connection rod 70. Retainer 392 releasably holds together table top sections 256, 258 at the ends opposite of hinge assemblies 298 when table top 12 is in the folded position. As a result of this secure coupling, folded table 10 can be more easily carried, transport, and stored without unintentional unfolding. Another advantage of retainer 392 is that it is mounted to table 10 without the use of mechanical fasteners which can potentially slow production and weaken the structure. Alternatively, mechanical fasteners can be used to secure retainer 392. In yet other embodiments, it is appreciated that retainer 392 is not required or that retainer 392 can be replaced with other connecting structures.

It is appreciated that retainer 392 can have a variety of different configurations. For example, flange 396 can comprise one or more flanges that can come in a variety of different sizes, shapes, and configurations. The function of flange 396 is simply to help prevent rotation of retainer 392 so that clip 398 is always properly aligned. It is also appreciated that opening 402 of body 394 can have a variety of different configurations. Such shapes can depend on the transverse cross sections of connection rods 70. For example, where connection rod 70 has round transverse cross section, opening 402 can be round and thus symmetrical.

Figure 24:
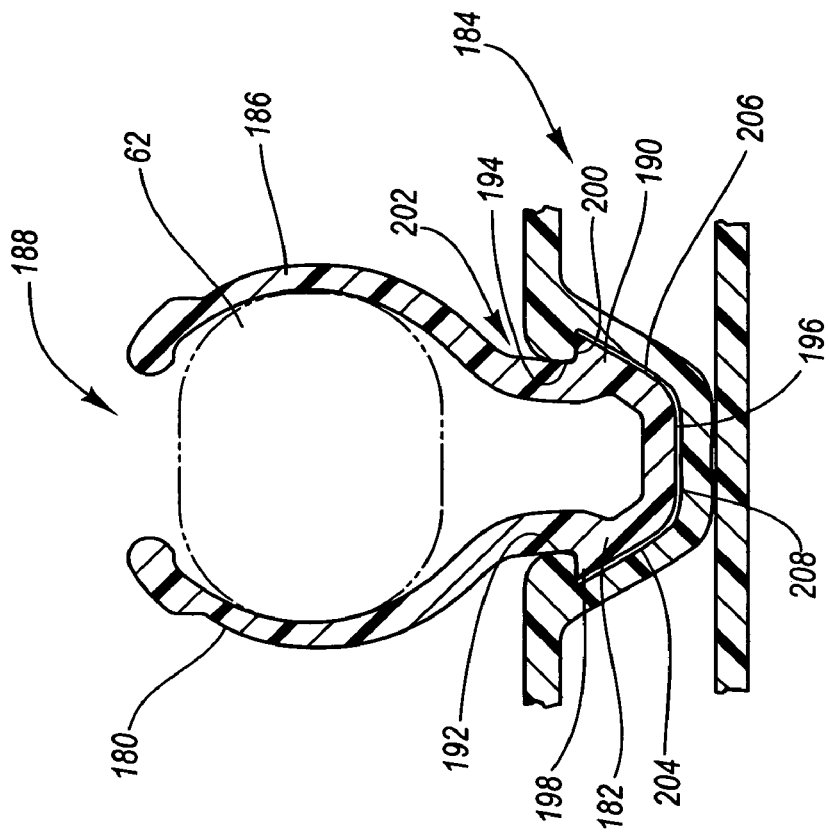
FIG. 24 is an enlarged, cross-sectional side view of the clip shown in FIG. 22, illustrating the clip connected to the lower surface of the table top.
Figure 23:
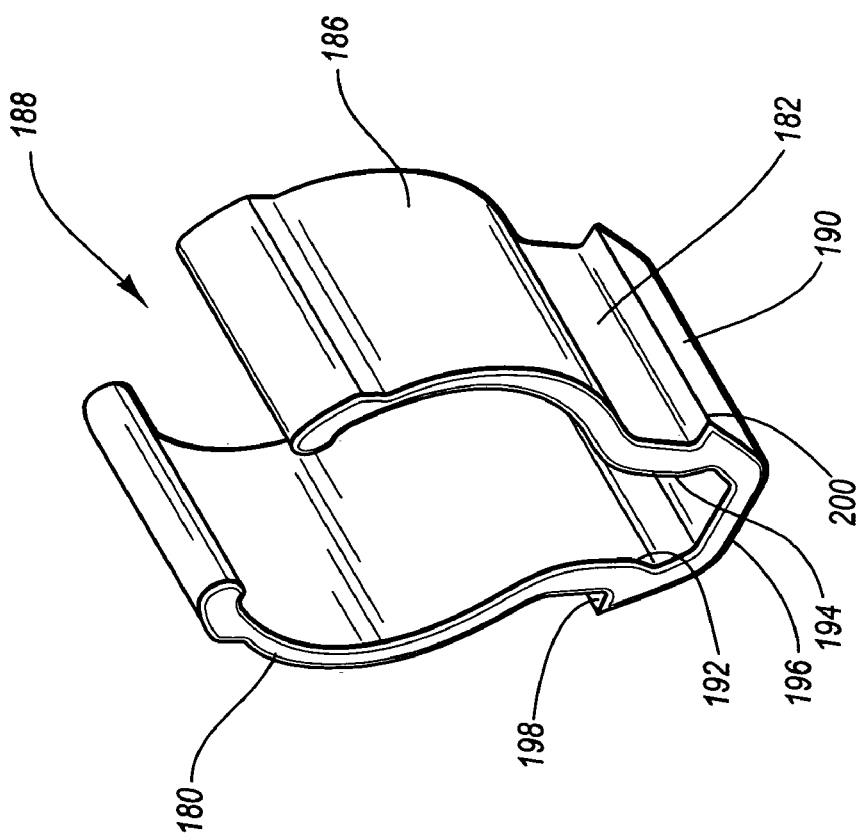
FIG. 23 is an enlarged, perspective view of the clip shown in FIG. 22.

As shown in FIGS. 23-24, one or more clips 180 are desirably attached to the table top 12 and the clips are sized and configured to hold the legs 62, 64 in the collapsed or storage position. In particular, as seen in FIG. 7, the clips 180 receive and retain the legs 62, 64 such that the legs 62, 64 are generally parallel to and proximate the lower surface 16 of the table top 12. Desirably, at least a portion of the legs 62, 64 are located within the channels 72 formed in the lower surface 16 of the table top 12 so that the height of the table top 12 can be minimized when the legs 62, 64 are in the collapsed position. As shown in FIG. 7, a single clip 180 may be used to receive and retain each leg 62, 64 in the collapsed position. It will be appreciated, however, that any suitable number of clips 180 may be used to retain the legs 62, 64 in the collapsed position. It will also be appreciated that the table 10 does not require the clip 180 to secure the legs 62, 64 in the collapsed position and other suitable devices may be used to secure the legs in the collapsed position. For example, one or more securing members as disclosed in Assignee's U.S. Pat. No. 6,530,331, entitled Portable Folding Utility Table with Integral Receiving Members, which is hereby incorporated by reference in its entirety, may be used to secure the legs in the collapsed position.

Figure 22:
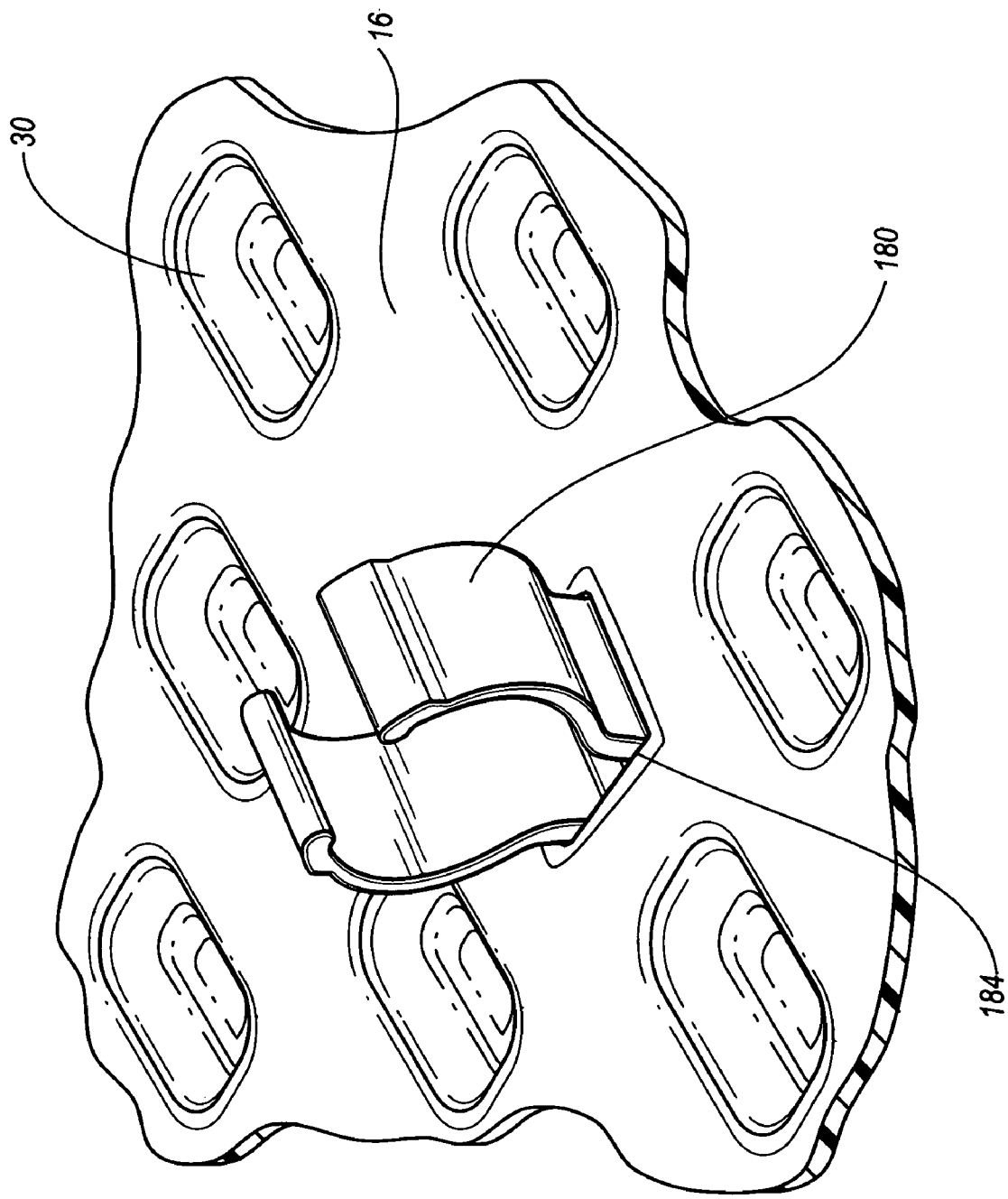
FIG. 22 is an enlarged, top perspective view of a portion of the table shown in FIG. 1, illustrating a leg receiving clip connected to the lower surface of the table top.

Turning to FIGS. 22-24, the clip 180 includes a body 182 that is sized and configured to be inserted into a corresponding receiving portion 184 formed in the table top 12. In one embodiment receiving portion 184 has the same general size and shape as one of the depressions 30. Thus, while the receiving portion 184 may be placed in any suitable location, it is desirably positioned so that it does not interrupt or disturb the generally uniform pattern of depressions 30. Accordingly, the receiving portion 184 may allow the table top 12 to be constructed with generally uniform characteristics, such as generally consistent strength and structural integrity, because the receiving portion may act or function similar to one of the depressions 30.

The clip 180 includes a leg receiving portion 186 that is sized and configured to receive and retain a leg 62, 64 of the table 10. The leg receiving portion 186 preferably receives and retains the leg 62, 64 in a snap, friction or interference fit. In particular, the leg receiving portion 186 includes an opening 188 that is smaller than the corresponding portion of the leg 62, 64 that is intended to be received by the receiving portion. Thus, when the leg 62, 64 is inserted into the opening 188, the clip 180 deforms to increase the size of the opening and allow the leg to be inserted into the leg receiving portion 186. The clip 180 then elastically or resiliently returns to its original position to receive and retain the leg 62, 64 within the leg receiving portion 186.

The clip 180 also includes a retaining portion 190 that allows the clip to be connected to the table top 12. The retaining portion 190 has a generally U-shaped configuration with opposing sidewalls 192, 194 and a lower surface 196. The opposing sidewalls 192, 194 include outwardly extending projections 198, 200, respectively, that are sized and configured to securely connect the clip 180 to the table top 12. In particular, the receiving portion 184 formed in the table top 12 includes an opening 202 that is desirably sized smaller than at least a portion of the width of the retaining portion 190 of the clip 180. When the retaining portion 190 of the clip 180 is inserted into the opening 202, the retaining portion and/or the opening deform or deflect to allow the retaining portion to be inserted into the receiving portion 184. The opening 202 and/or the retaining portion 190 then resiliently or elastically return to there original positions to secure the clip 180 within the receiving portion 184.

Additionally, the receiving portion 184 includes opposing sidewalls 204, 206 and a bottom surface 208 and at least a portion of these surfaces are intended to contact corresponding portions of the clip 180. Specifically, the sidewalls 204, 206 of the receiving portion 184 are designed to contact the sidewalls 192, 194 of the retaining portion 190 of the clip 180, and the projections 198, 200 are intended to bite into and engage the sidewalls of the receiving portion. The relatively large contact area between the retaining portion 190 of the clip 180 and the receiving portion 184 in the table top 10, and the engagement of the projections 198, 200 with the sidewalls 204, 206 of the receiving portion, allows the clip to be securely connected to the table top 12.

Advantageously, the clips 180 can be quickly and easily connected to the table top 12, which may speed the manufacturing process. The clips 180 also allow the legs 62, 64 to be secured in the collapsed position regardless of the position or orientation of the table 10. In addition, the clips 180 may be disconnected from the table top 12, if desired. Significantly, the clips 180 can be attached to the table top 12 without the use of mechanical fasteners such as screws or bolts, but mechanical fasteners may be used to attach the clips to the table top if desired. Further, it will be appreciated that the clips 180 may have other suitable sizes and configurations depending, for example, upon the size and configuration of the receiving portion 184 formed in the table top 12. Other suitable embodiments for the clip are disclosed in Assignee's U.S. patent application Ser. No. 10/409,259, filed Apr. 8, 2003 entitled Table with Frame That Can Be Attached to the Table Top without Mechanical Fasteners, which was previously incorporated by reference in its entirety.

Figure 25:
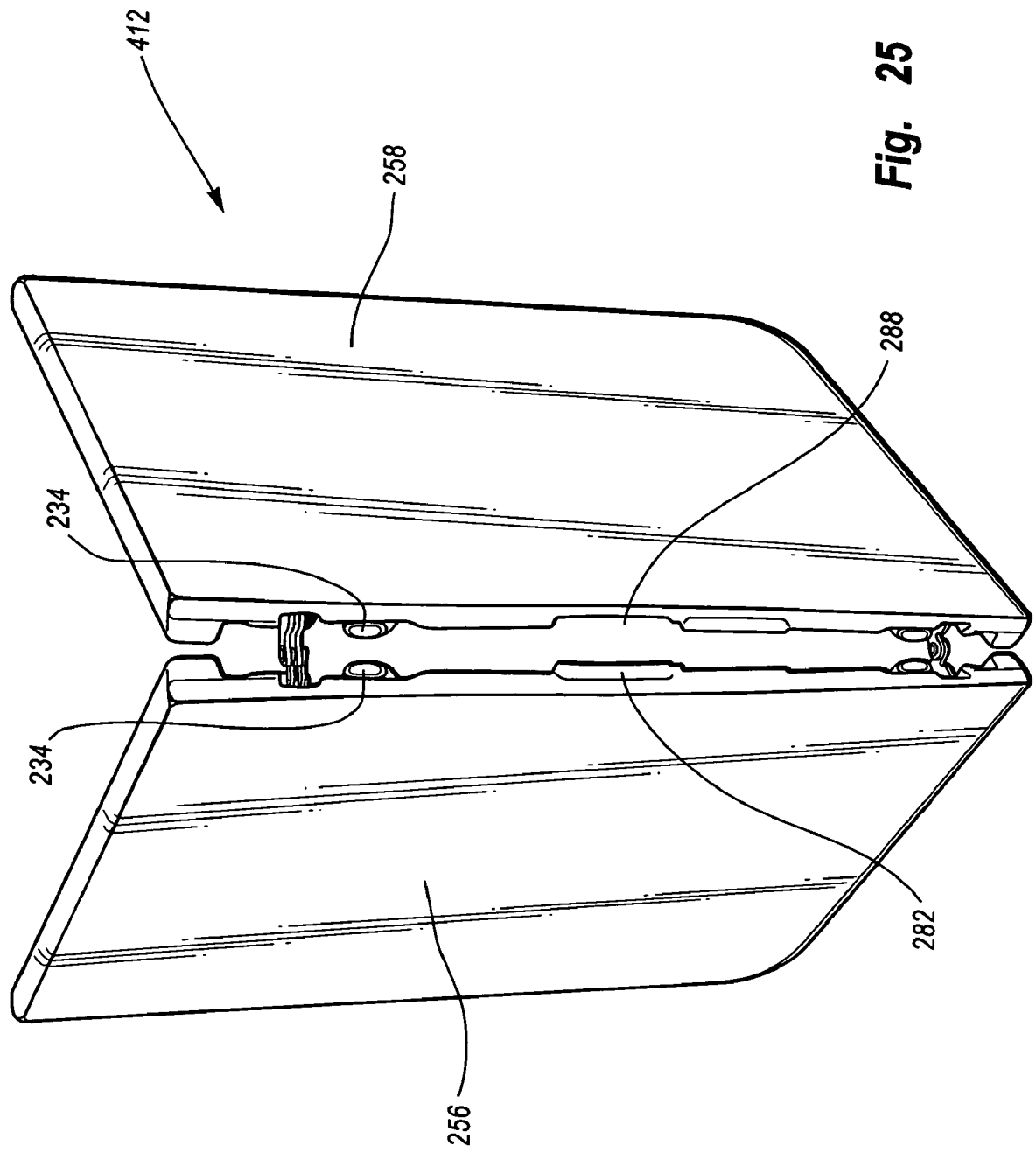
FIG. 25 is a perspective view of another embodiment of a table in a partially folded position.
Figure 26:
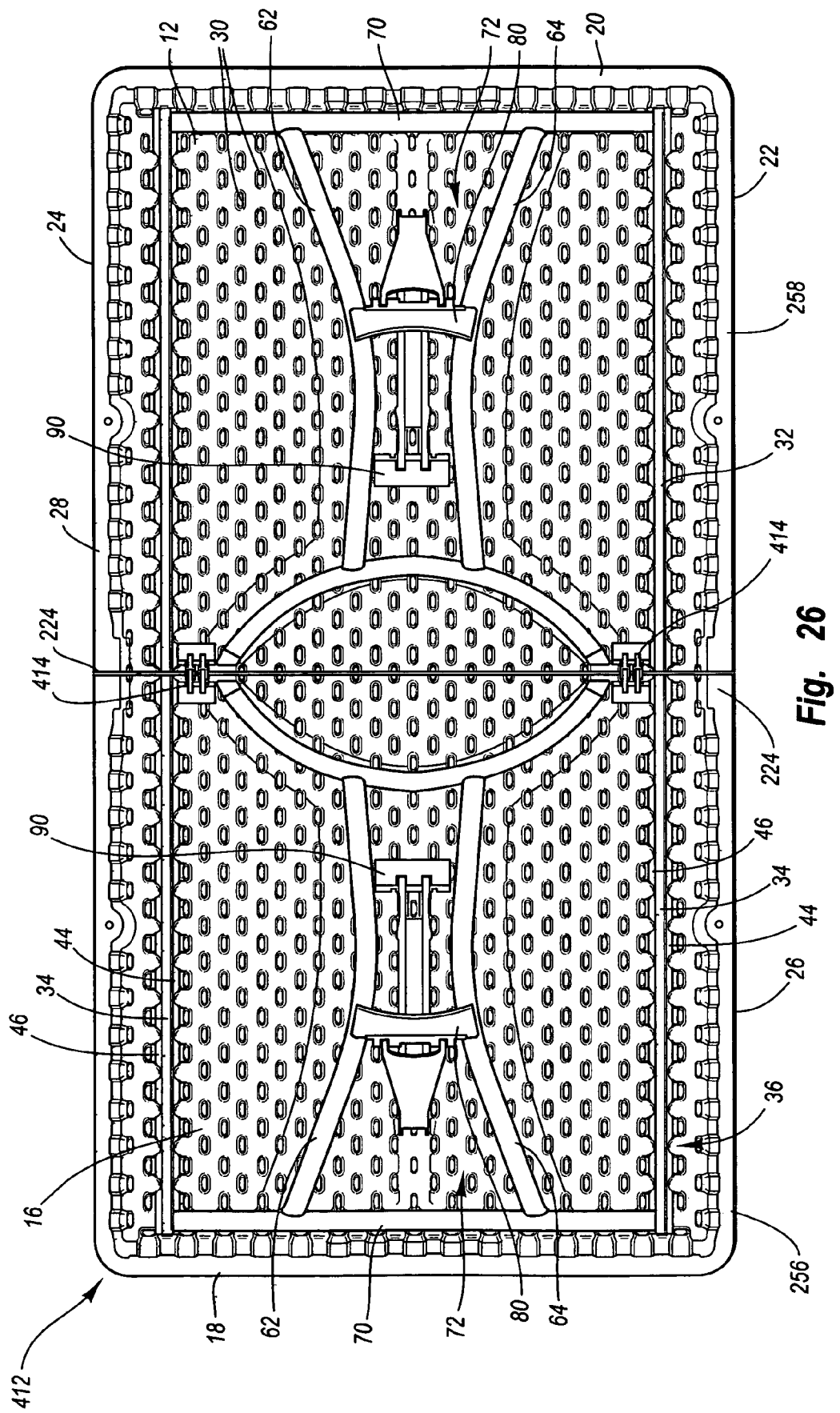
FIG. 26 is bottom view of the table shown in FIG. 25.
Figure 3:
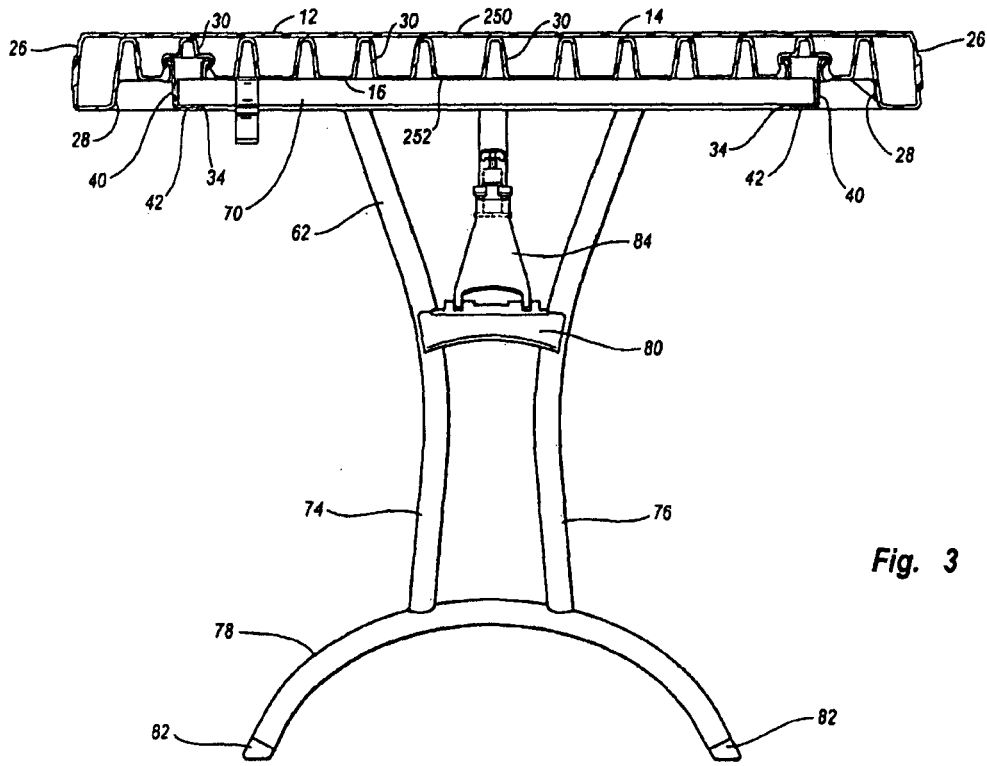

Finally, depicted in FIGS. 25 and 26 is an alternative embodiment of a table 412 wherein like elements are identified by like reference characters. Table 10 includes table top sections 256 and 258. However, in contrast to having the hinge assemblies connected to the frame, table 10 comprises hinge assemblies 414 that are connected directly to table top sections 256 and 258 at a distance spaced apart from frame 32.

Although this invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. A foldable table comprising:
    a table top comprising a first table top section and a second table top section, the first table top section and the second table top section being generally aligned in the same plane when the table top is in an unfolded position, the first table top section being positioned at least proximate the second table top section when the table top is in a folded position;
    a first hinge assembly hingedly connecting the first table top section to the second table top section such that the table top can selective move between the folded position and the unfolded position, the first hinge assembly comprising:
        a first bracket connected to the first table top section, the first bracket including a curved outer surface and a receiving portion;
        a second bracket connected to the second table top section, the second bracket including an elongated first arm and an elongated second arm; and
        a locking mechanism selectively locking the table top in the unfolded position, the locking mechanism including an elongated body disposed between the elongated first arm and the elongated second arm of the second bracket, the locking mechanism including a latch plate with an outer edge that engages the curved outer surface of the first bracket when the table top is moved between the folded and unfolded positions, the latch plate being disposed in the receiving portion when the locking mechanism locks the table top in the unfolded position; and
    one or more support assemblies connected to the table top, the support assemblies being movable between an extended position and a collapsed position relative to the table top.

2. A foldable table as in claim 1, further comprising a handle disposed in the elongated body of the locking mechanism, the handle being at least partially disposed between the elongated first arm and the elongated second arm of the second bracket.

3. A foldable table as in claim 1, further comprising a spring biasing the latch plate into the receiving portion.

4. A foldable table as in claim 1, wherein the receiving portion of the first bracket is a notch.

5. A foldable table as in claim 1, wherein the first bracket includes two curved outer surfaces and two receiving portions.

6. A foldable table as in claim 1, further comprising a handle formed by a portion of the elongated body disposed between the elongated first arm and the elongated second arm of the second bracket.

7. A foldable table as in claim 1, further comprising a frame mounted to the table top, the first hinge assembly being integrally formed with or connected to the frame.

8. A foldable table as in claim 1, further comprising a second hinge assembly hingedly connecting the first table top section to the second table top section, the second hinge assembly being spaced apart from the first hinge assembly.

9. A foldable table comprising:
a table top comprising a first table top section and a second table top section, the first table top section and the second table top section being generally aligned in the same plane when the table top is in an unfolded position, the first table top section being positioned at least proximate the second table top section when the table top is in a folded position;
a first hinge assembly hingedly connecting the first table top section to the second table top section such that the table top can selectively move between a folded position and an unfolded position, the first hinge assembly comprising:
a first bracket attached to the first table top section, the first bracket including an elongated body and a latching portion, the latching portion including a curved outer surface with a radius of curvature and a receiving portion, the latching portion including a receiving portion;
a second bracket attached to the second table top section, the second bracket including an elongated body and a latching portion with a curved outer surface with a radius of curvature, the radius of curvature of the curved outer surface of the first bracket being generally equal to the radius of curvature of the curved outer surface of the second bracket; and
a locking mechanism including an elongated body that is disposed generally parallel to the elongated body of the second bracket, the locking mechanism including a latch plate that is disposed in the receiving portion of the first bracket when locking mechanism is in a locked position and the table top is in the unfolded position; and
one or more support assemblies connected to the table top, the support assemblies being movable between an extended position and a collapsed position relative to the table top.

10. A foldable table as in claim 9, further comprising a spring biasing the locking mechanism into the locked position.

11. A foldable table as in claim 9, wherein the receiving portion includes a notch and the latch is removably received within the notch when the table top is in the unfolded position.

12. A foldable table as in claim 9, wherein the latching portion of the first bracket includes two curved outer surfaces and two receiving portions; and wherein the latching portion of the second bracket includes two curved outer surfaces and two receiving portions.

13. A foldable table as in claim 12, wherein a portion of the locking mechanism is disposed between the latching portion of the first bracket and the latching portion of the second bracket.

14. A foldable table as in claim 9, wherein the second bracket comprises a first arm that terminates at an end face, a latching head projects from the first arm and terminates at the arched bearing surface, a portion of the latching head having the bearing surfaced formed thereon projects beyond the end face of the first arm so as to form a catch, the catch at least partially bounding the notch.

15. A foldable table as in claim 9, further comprising:
the first table top section having a bottom surface and an inside edge;
the second table top section having an inside edge adjacent to the inside edge of the first table top section; and
a handle mounted to the bottom surface of the first table top section and extending between the inside edge of the first table top section and the inside edge of the second table top section when the table top is in the folded position.

16. A foldable table comprising:
a first table top section including a top surface, a bottom surface, an inside edge and an opposing outside edge;
a second table top section including a top surface, a bottom surface, an inside edge and an opposing outside edge, the second table top section being hingedly mounted to the first table top section such that the first table top section and the second table top section can selectively move between a folded position and an unfolded position, the inside edge of the first table top section being disposed directly adjacent to the inside edge of the second table top section when the table top sections are in the unfolded position, the inside edge of the first table top section being spaced apart from the inside edge of the second table top section when the table top sections are in the folded position;
a handle mounted to the bottom surface of the first table top section so that a first end of the handle is disposed between and projects beyond the inside edge of the first table top section and the inside edge of the second table top section when the table top sections are in the folded position, the first end of the handle being disposed below a lower portion of the inside edge of the first table top section and a lower portion of the inside edge of the second table top section when the table top sections are in the unfolded position;
a first support assembly connected to the first table top section, the first support assembly being movable between an extended position and a collapsed position relative to the table top; and
a second support assembly connected to the second table top section, the second support assembly being movable between an extended position and a collapsed position relative to the table top.

17. A foldable table as in claim 16, wherein the handle is secured in a fixed position in the bottom surface of the first table top section.

18. A foldable table as in claim 16, further comprising a bracket mounted to the bottom surface of the table, the handle being mounted to the bracket.

19. A foldable table as in claim 18, wherein the handle projects from the bracket at a downward angle when the table top of the first table top section and the table top of the second table top section are horizontally disposed.

20. A foldable table as in claim 16, wherein the handle projects beyond the inside edge of the first table top section at a downwardly extending angle.

21. A foldable table as in claim 16, further comprising:
a first hinge assembly coupling the first table top section to the second table top section; and
means for directly locking the first hinge assembly when the table top sections are in the unfolded position.

22. A foldable table as in claim 16, further comprising:
a first tongue projecting from the inside edge of the first table top section; and
a first groove recessed on the inside edge of the second table top section and configured to receive the first tongue, the first tongue being received within the first groove when the table top sections are in the unfolded position.

23. A foldable table comprising:
a first table top section including a top surface, a bottom surface and an inner surface;
a second table top section having a top surface, a bottom surface and an inner surface, the second table top section being hingedly mounted to the first table top section such that the first table top section and the second table top section can selectively move between a folded position and an unfolded position; and a handle mounted to the bottom surface of the first table top section in a fixed position, the handle including a first end that is disposed between and projects beyond the inner surface of the first table top section and the inner surface of the second table top section when the table top sections are in the folded position, the first end of the handle being disposed below a lower portion of the inside edge of the first table top section and a lower portion of the inside edge of the second table top section when the table top sections are in the unfolded position, a second end of the handle being connected to the bottom surface of the first table top section.

24. A foldable table as in claim 23, further comprising:
a first hinge coupling the first table top section to the second table top section; and
a latch engaging with the first hinge so as to releasably lock the first hinge when the table top sections are in the unfolded position.

25. A foldable table in claim 24, further comprising a frame mounted to the first table top section, the first hinge being integrally formed with or connected to the frame.

26. A foldable table comprising:
a first table top section including a top surface, a bottom surface, an inside edge, an outside edge, and a hollow interior portion disposed between the top surface, the bottom surface and the inside edge, a first tongue projecting from the inside edge of the first table top section, the tongue including an upper surface, a lower surface and a hollow interior portion disposed between the upper surface and the lower surface, the first table top section and the first tongue being integrally formed as part of a unitary, one-piece structure, the hollow interior portion of the tongue being in direct communication with the hollow interior portion of the first table top section; and
a second table top section including a top surface, a bottom surface, an inside edge, an outside edge, and a hollow interior portion disposed between the top surface, the bottom surface and the inside edge, a first groove disposed in the inside edge of the second table top section and being configured to receive the first tongue, the groove including an upper surface, a lower surface and a hollow interior portion disposed between the upper surface and the lower surface, the second table top section and the groove being integrally formed as part of a unitary, one-piece structure, the hollow interior portion of the groove being in direct communication with the hollow interior portion of the second table top section, the second table top section being hingedly connected to the first table top section such that the first table top section and the second table top section can selectively move between a folded position and an unfolded position, the first tongue being received within the first groove when the table top sections are in the unfolded position.

27. A foldable table as in claim 26, further comprising:
a plurality of tongues projecting from the inside edge of the first table top section; and
a plurality of corresponding grooves disposed in the inside edge of the second table top section.

28. A foldable table as in claim 26, further comprising:
a plurality of tongues and grooves formed on the inside edge of the first table top section; and a plurality of corresponding tongues and grooves formed on the inside edge of the second table top section.

29. A foldable table as in claim 26, further comprising:
the inside edge of the first table top section comprising a substantially flat and linear first upper edge portion extending along the length of the inside edge adjacent to the top surface and a first lower edge portion extending along the length of the inside edge adjacent to the bottom surface, the first tongue being formed on the first lower edge portion; and
the inside edge of the second table top section comprising a substantially flat and linear second upper edge portion extending along the length of the inside edge adjacent to the top surface and a second lower edge portion extending along the length of the inside edge adjacent to the bottom surface, the first groove being formed on the second lower edge portion.

30. A foldable table as in claim 26, further comprising a handle mounted to the bottom surface of the first table top section so that the handle projects between the inside edge of the first table top section and the inside edge of the second table top section when the table top sections are in the folded position.

31. A foldable table as in claim 26, further comprising:
a first hinge coupling the first table top section to the second table top section; and
a latch engaging with the first hinge so as to releasably lock the first hinge when the table top sections are in the open position.

32. A table comprising:
a first table top section including an upper portion, a lower portion and an inner portion;
a second table top section including an upper portion, a lower portion and an inner portion, the inner portion of the first table top section being disposed at least proximate the inner portion of the second table top section when the table is in an unfolded position, the inner portion of the first table top section being spaced apart from the inner portion of the second table top section when the table is in a folded position;
a first hinge assembly connecting the first table top section and the second table top section, the first hinge assembly comprising:
a first bracket connected to the first table top section, the first bracket including a bearing surface and a catch formed in the bearing surface;
a second bracket connected to the second table top section; and
a latch that is movable relative to the second bracket between a locked position in which the latch engages the catch of the first bracket to secure the first hinge assembly in a locked position and an unlocked position in which the latch does not engage the catch of the first bracket and the first hinge assembly is in an unlocked position;
a second hinge assembly connecting the first table top section and the second table top section, the second hinge assembly comprising:
a first bracket connected to the first table top section, the first bracket including a bearing surface and a catch formed in the bearing surface;
a second bracket connected to the second table top section; and
a latch that is movable relative to the second bracket between a locked position in which the latch engages the catch of the first bracket to secure the first hinge assembly in a locked position and an unlocked position in which the latch does not engage the catch of the first bracket and the first hinge assembly is in an unlocked position;

a first support assembly connected to the first table top section and being movable between an extended position and a collapsed position relative to the table top; and a second support assembly connected to the second table top section and being movable between an extended position and a collapsed position relative to the table top.

33. The table as in claim 32, wherein the first hinge assembly includes a spring biasing the latch against the bearing surface of the first bracket; and wherein the second hinge assembly includes a spring biasing the latch against the bearing surface of the second bracket.

34. The table as in claim 32, wherein the catch in the first bracket of the first hinge assembly is a notch and the latch is disposed within the notch when the first hinge assembly is in the locked position; and wherein the catch in the first bracket of the second hinge assembly is a notch and the latch is disposed within the notch when the second hinge assembly is in the locked position.

35. The table as in claim 32, wherein the first hinge assembly further comprises a pin connecting the first bracket and the second bracket; and wherein the second hinge assembly further comprises a pin connecting the first bracket and the second bracket.

36. The table as in claim 32, further comprising a handle mounted to the lower portion of the first table top section in a generally fixed position, the handle being at least partially disposed between the inner portion of the first table top section and the inner portion of the second table top section when the table top is in the folded position.

37. The table as in claim 32, further comprising a handle mounted to the bottom surface of the first table top section and extending beyond the inside edge of the first table top section and the inside edge of the second table top section when the table top is in the folded position.

38. The table as in claim 32, further comprising a first outwardly extending portion projecting from the inner portion of the first table top section; and further comprising a first receiving portion in the inner portion of the second table top section, the first receiving portion being sized and configured to receive the first outwardly extending portion when the table is in the unfolded position.

39. The table as in claim 32, further comprising a retainer that is sized and configured to retain the table in the folded position, the retainer comprising:

a body including a opening that is sized and configured to receive a portion of a frame connected to the first table top section;

a flange projecting outwardly from the body, the flange being sized and configured to engage a portion of the first table top section; and an outwardly extending portion that is sized and configured to receive a portion of a frame connected to the second table top section when the table is in the folded position.

40. A table comprising:

a first table top section including an upper portion, a lower portion and an inner portion;

a second table top section including an upper portion, a lower portion and an inner portion, the inner portion of the first table top section being disposed at least proximate the inner portion of the second table top section when the table is in an unfolded position, the inner portion of the first table top section being spaced apart from the inner portion of the second table top section when the table is in a folded position;

a hinge assembly connecting the first table top section and the second table top section, the hinge assembly comprising:

a first bracket connected to the first table top section, the first bracket including a bearing surface and a catch formed in the bearing surface;

a second bracket connected to the second table top section;

a pin connecting the first bracket and the second bracket;

a latch that is movable relative to the second bracket between a locked position in which the latch engages the catch of the first bracket to secure the first hinge assembly in a locked position and an unlocked position in which the latch does not engage the catch of the first bracket and the first hinge assembly is in an unlocked position; and a spring that is sized and configured to bias the latch against the bearing surface of the first bracket;

a first support assembly connected to the first table top section and being movable between an extended position and a collapsed position relative to the table top; and a second support assembly connected to the second table top section and being movable between an extended position and a collapsed position relative to the table top.

41. The table as in claim 40, further comprising a handle mounted to the lower portion of the first table top section in a generally fixed position, the handle being at least partially disposed between the inner portion of the first table top section and the inner portion of the second table top section when the table top is in the folded position.

42. The table as in claim 40, further comprising a handle mounted to the bottom surface of the first table top section and extending beyond the inside edge of the first table top section and the inside edge of the second table top section when the table top is in the folded position.

43. The table as in claim 40, further comprising a retainer that is sized and configured to retain the table in the folded position, the retainer comprising:

a body including a opening that is sized and configured to receive a portion of a frame connected to the first table top section;

a flange projecting outwardly from the body, the flange being sized and configured to engage a portion of the first table top section; and an outwardly extending portion that is sized and configured to receive a portion of a frame connected to the second table top section when the table is in the folded position.

* * * * *

UNITED STATES PATENT AND TRADEMARK OFFICE
CERTIFICATE OF CORRECTION

PATENT NO. : 7,640,870 B2
APPLICATION NO. : 10/843037
DATED : January 5, 2010
INVENTOR(S) : Strong et al.

It is certified that error appears in the above-identified patent and that said Letters Patent is hereby corrected as shown below:

Drawings
Sheet 3, Figure 2B, replace with figure depicted below wherein references to items 44 and 46 have been corrected

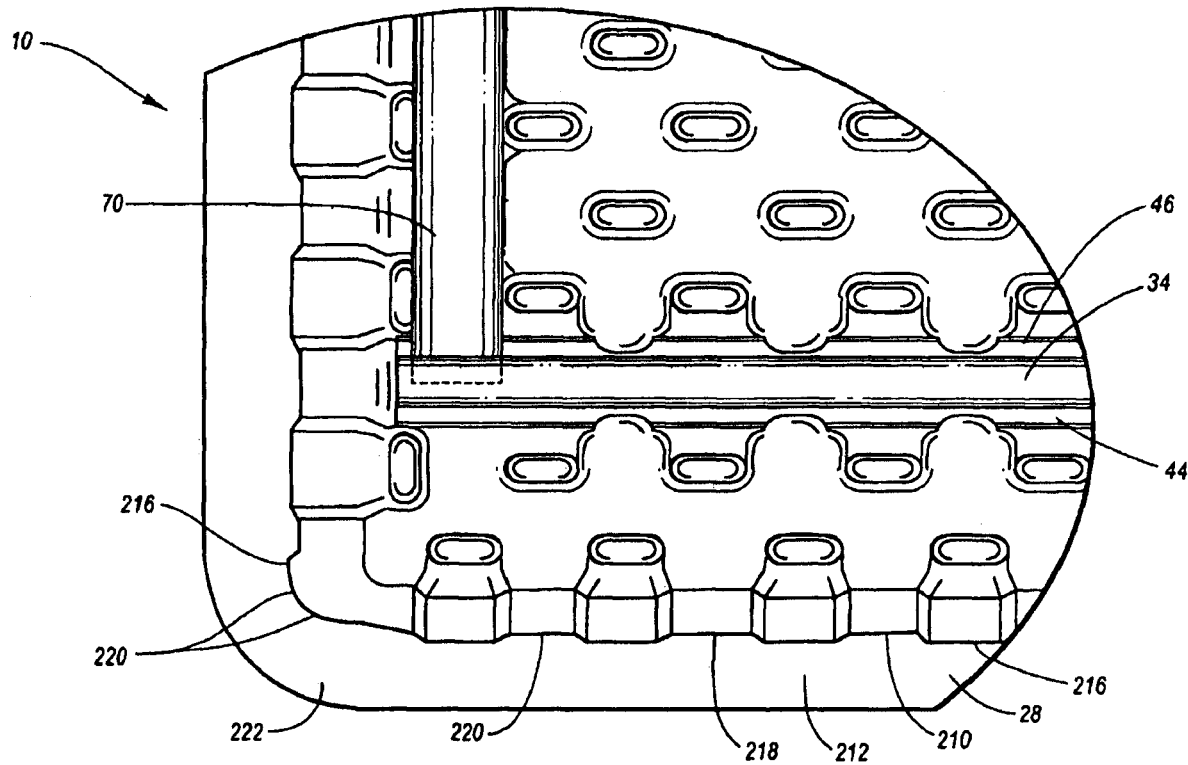
Fig. 2B

Signed and Sealed this

Twenty-second Day of June, 2010

David J. Kappos
*Director of the United States Patent and Trademark Office*

Sheet 4, Figure 3, replace with figure depicted below, wherein reference to number 24 has been removed Sheet 7, Figure 6A, replace with figure depicted below wherein reference number 368 has been adjusted to properly indicate the front end of bracket 364 rather than the bottom wall 252 of mounting portion 376

Sheet 7, Figure 6B, replace with figure depicted below where reference number 262 has been removed

CERTIFICATE OF CORRECTION (continued)
U.S. Pat. No. 7,640,870 B2

Sheet 8, Figure 7, replace with figure depicted below wherein references 62 and 64 have been adjusted to properly identify separate legs

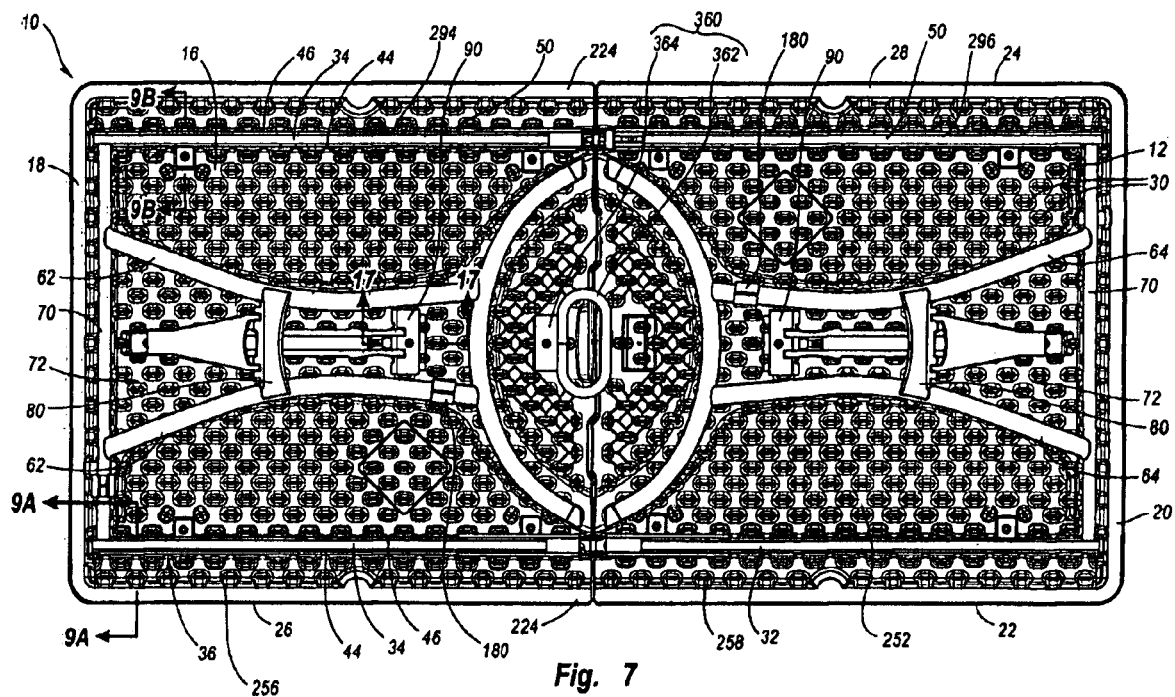

Fig. 7

Sheet 9, Figure 8, replace with figure depicted below wherein items 314 and 316 have been corrected (they were reversed) and items number 60 on items 294 and 296 in the foreground have been updated to include the openings Sheet 10, Figure 9A, replace with figure depicted below wherein item 52 has been corrected - originally, one of the edges was incorrectly marked as item 24

Sheet 10, Figure 9B, replace with figure depicted below wherein item 52 has been corrected - originally, one of the edges was incorrectly marked as item 24

Sheet 12, Figure 11B, replace with figure depicted below wherein the numbering of handle 344 has been corrected - originally, the numbering indicated that it was latch 334 itself, rather than a piece thereof Sheet 14, Figure 13, replace with figure depicted below wherein item number 296 has been corrected to properly indicate the second rail portion, rather than the upper surface of the table Sheet 16, Figure 16, replace with figure depicted below wherein the numbering for support member 74 has been corrected - originally, it was marked as receiving channel 72

Sheet 20, Figure 23, replace with figure depicted below wherein items 192 and 194 have been adjusted to point to the outer surface of clip 180, rather than the interior surface of opening 188

Sheet 21, Figure 25, replace with figure depicted below wherein references to items 234 have been removed Sheet 22, Figure 26, replace with figure depicted below wherein references 62 and 64 have been adjusted to properly identify separate legs

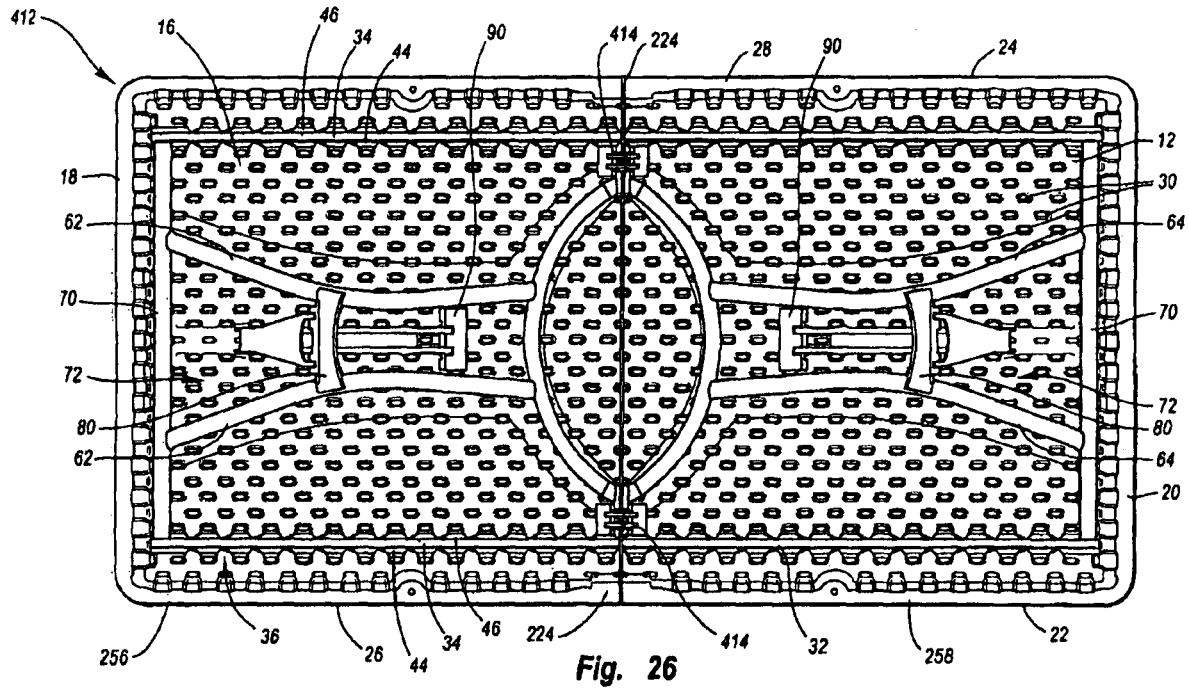
Fig. 26

Column 1
Line 43, change "relative" to --relatively--
Line 44, change "may not be a problematic for" to --may not be problematic for--

Column 2
Lines 10-11, change "that there no convenient" to --that there are no convenient--
Line 55, change "maybe" to --may be--

Column 3
Line 13, change "gasp" to --grasp--

Column 4
Line 22, change "simply" to --simplify--
Line 45, change "enlarge" to --enlarged--
Line 52, change "Fig. 1 is" to --Fig. 1 in--
Line 54, change "Fig. 1 is" to --Fig. 1 in--

Column 6
Line 50, change "have to rounded" to --have to be rounded--
Lines 64-65, change "table top 12 is lighter weight that conventional" to --table top 12 is a lighter weight than conventional--

Column 7
Line 28, change "comprises" to --comprise--
Lines 46-47, change "a bottom surface upper wall" to --a bottom surface of the upper wall--

Column 9
Line 23, change "there" to --their--

Column 11
Line 25, change "folded" to --unfolded--
Line 32, change "insides" to --inside--

Column 12
Line 61, change "attached" to --attach--
Line 62, change "distributed" to --distribute--

Column 15
Line 19, change "238" to --328--
Line 25, change "A pin 322 is" to --A pin 332 is--
Line 27, change "322" to --332--
Line 29, change "322" to --332--

Column 16
Line 8, change "latching heads 322" to --latching head 322--
Line 12, change "position is prevented" to --position are prevented--
Lines 16-17, change "but is also enable table" to --but also enables table--
Line 45, change "324" to --334--
Line 46, change "344" to --334--

Column 17
Line 2, change "344" to --334--
Line 56, change "262" to --268--
Line 60, change "262" to --268--

Column 18
Line 5, change "262" to --268--

Column 21
Line 9, change "0.84" to --84--

Column 22
Line 64, change "there" to --their--

Column 23
Line 42, change "17" to --18--
Line 59, change "require that use" to --require the use--

Column 26
Line 7, change "121" to --21--

Column 27
Line 41, change "12" to --13--

Column 28
Line 12, change "transport" to --transported--

Column 29
Line 29, change "there" to --their--
Line 64, change "Table 10" to --Table 412--
Line 66, change "Table 10" to --Table 412--

Column 30
Line 20, change "selective" to --selectively--
Line 39, remove [and]

Column 31
Line 31, change "when locking mechanism" to --when the locking mechanism--
Line 57, change "surfaced" to --surface--

Column 33
Line 23, change "folding table in claim" to --folding table as in claim--

Column 35
Line 51, change "including a opening" to --including an opening--

Column 36
Line 50, change "including a opening" to --including an opening--

UNITED STATES PATENT AND TRADEMARK OFFICE
CERTIFICATE OF CORRECTION

PATENT NO. : 7,640,870 B2  Page 1 of 1
APPLICATION NO. : 10/843037
DATED : January 5, 2010
INVENTOR(S) : Strong et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1223 days.

Signed and Sealed this

Sixteenth Day of November, 2010

David J. Kappos
*Director of the United States Patent and Trademark Office*